(12) United States Patent
Hugot et al.

(10) Patent No.: US 10,422,923 B2
(45) Date of Patent: Sep. 24, 2019

(54) SYSTEMS AND METHODS FOR MODELING FRACTURE NETWORKS IN RESERVOIR VOLUMES FROM MICROSEISMIC EVENTS

(71) Applicant: EMERSON PARADIGM HOLDING LLC, Houston, TX (US)

(72) Inventors: Alexandre Hugot, Houston, TX (US); Jean-Claude Dulac, Sugarland, TX (US)

(73) Assignee: EMERSON PARADIGM HOLDING LLC, Houston, TX (US)

( * ) Notice: Subject to any disclaimer, the term of this patent is extended or adjusted under 35 U.S.C. 154(b) by 1023 days.

(21) Appl. No.: 14/485,018

(22) Filed: Sep. 12, 2014

(65) Prior Publication Data
US 2015/0276979 A1    Oct. 1, 2015

Related U.S. Application Data

(60) Provisional application No. 61/971,648, filed on Mar. 28, 2014.

(51) Int. Cl.
| | | |
|---|---|---|
| G01V 1/30 | (2006.01) | |
| E21B 43/26 | (2006.01) | |
| G01V 99/00 | (2009.01) | |

(52) U.S. Cl.
CPC ............ *G01V 99/005* (2013.01); *E21B 43/26* (2013.01); *G01V 1/301* (2013.01); *G01V 2210/1234* (2013.01); *G01V 2210/646* (2013.01)

(58) Field of Classification Search
None
See application file for complete search history.

(56) References Cited

U.S. PATENT DOCUMENTS

| | | |
|---|---|---|
| 4,964,099 A | 10/1990 | Carron |
| 4,991,095 A | 2/1991 | Swanson |
| (Continued) | | |

FOREIGN PATENT DOCUMENTS

| | | |
|---|---|---|
| AU | 2002329615 | 7/2002 |
| CA | 2455810 | 7/2005 |
| (Continued) | | |

OTHER PUBLICATIONS

Cotesta, L., Kaiser, P. K., Cai, M., & Vorauer, A. (Jan. 2007). Application of Scientific Visualisation—Stress Control on Permeability Anisotropy in Moderately Fractured Rock. In 1st Canada-US Rock Mechanics Symposium. American Rock Mechanics Association. (Year: 2007).*

(Continued)

*Primary Examiner* — Bijan Mapar
(74) *Attorney, Agent, or Firm* — Pearl Cohen Zedek Latzer Baratz LLP

(57) ABSTRACT

A system and method for receiving data associated with a set of microseismic events and a fracture network, the data associated with each microseismic event including a location where, and a time when, the microseismic event was recorded by one or more sensors. Each microseismic event in the set may be added to a fracture network in chronological order of the time when the microseismic event was recorded. Each microseismic event may be added by connecting the event to the fracture network by a fracture according to a connection criterion. A stimulated rock volume may be generated that is defined by an iso-surface of points having a constant distance to the fracture network, wherein the fracture network includes a plurality of microseismic events in the set and a plurality of fractures connecting the plurality of microseismic events according to the connection criterion.

23 Claims, 42 Drawing Sheets

(56) References Cited

U.S. PATENT DOCUMENTS

| | | |
|---|---|---|
| 5,465,323 A | 11/1995 | Mallet |
| 5,475,589 A | 12/1995 | Armitage |
| 5,586,082 A | 12/1996 | Anderson et al. |
| 5,594,807 A | 1/1997 | Liu |
| 5,671,136 A | 9/1997 | Willhoit |
| 5,844,799 A | 12/1998 | Joseph et al. |
| 5,995,907 A | 11/1999 | Van Bemmel et al. |
| 6,018,498 A | 1/2000 | Neff et al. |
| 6,106,561 A | 8/2000 | Farmer |
| 6,138,076 A | 10/2000 | Graf et al. |
| 6,151,555 A | 11/2000 | Van Bemmel et al. |
| 6,246,963 B1 | 6/2001 | Cross et al. |
| 6,278,949 B1 | 8/2001 | Alam |
| 6,353,577 B1 | 3/2002 | Orban et al. |
| 6,597,995 B1 | 7/2003 | Cornu et al. |
| 6,725,174 B2 | 4/2004 | Bouts et al. |
| 6,771,800 B2 | 8/2004 | Keskes et al. |
| 6,778,909 B1 | 8/2004 | Popovici et al. |
| 6,791,900 B2 | 9/2004 | Gillard et al. |
| 6,820,043 B2 | 11/2004 | Mallet et al. |
| 6,847,737 B1 | 1/2005 | Kouri et al. |
| 6,850,845 B2 | 2/2005 | Stark |
| 6,889,142 B2 | 5/2005 | Schonewille |
| 6,904,169 B2 | 6/2005 | Kalevo et al. |
| 7,024,021 B2 | 4/2006 | Dunn et al. |
| 7,089,166 B2 | 8/2006 | Malthe-Sorenssen et al. |
| 7,126,340 B1 | 10/2006 | Ameen et al. |
| 7,187,794 B2 | 3/2007 | Liang et al. |
| 7,227,983 B1 | 6/2007 | Christian et al. |
| 7,248,539 B2 | 7/2007 | Borgos et al. |
| 7,280,918 B2 | 10/2007 | Williams |
| 7,412,363 B2 | 8/2008 | Callegari |
| 7,418,149 B2 | 8/2008 | Dinh et al. |
| 7,446,765 B2 | 11/2008 | Dugge |
| 7,480,205 B2 | 1/2009 | Wei et al. |
| 7,523,024 B2 | 4/2009 | Endres et al. |
| 7,561,992 B2 | 7/2009 | Leflon et al. |
| 7,660,481 B2 | 2/2010 | Schaap et al. |
| 7,711,532 B2 | 5/2010 | Dulac et al. |
| 7,742,875 B2 | 6/2010 | Li et al. |
| 7,744,534 B2 | 6/2010 | Chalana et al. |
| 7,844,402 B2 | 11/2010 | Klein et al. |
| 7,869,954 B2 | 1/2011 | Lennert et al. |
| 7,970,593 B2 | 6/2011 | Roggero et al. |
| 8,010,294 B2 | 8/2011 | Dorn et al. |
| 8,065,088 B2 | 11/2011 | Dorn et al. |
| 8,150,663 B2 | 4/2012 | Mallet |
| 8,274,859 B2 | 9/2012 | Maucec et al. |
| 8,600,708 B1 | 12/2013 | Mallet et al. |
| 8,711,140 B1 | 4/2014 | Mallet |
| 8,743,115 B1 | 6/2014 | Mallet et al. |
| 2001/0036294 A1 | 11/2001 | Keskes et al. |
| 2002/0032550 A1 | 3/2002 | Ward et al. |
| 2003/0023383 A1 | 1/2003 | Stark et al. |
| 2003/0216897 A1 | 11/2003 | Endres et al. |
| 2004/0260476 A1 | 12/2004 | Borgos et al. |
| 2004/0267454 A1 | 12/2004 | Granjeon |
| 2005/0114831 A1 | 5/2005 | Callegari et al. |
| 2005/0216197 A1 | 9/2005 | Zamora et al. |
| 2006/0004522 A1 | 1/2006 | Cacas |
| 2006/0025976 A1* | 2/2006 | Kennon ............... G06F 17/5018 703/10 |
| 2006/0122780 A1 | 6/2006 | Cohen et al. |
| 2008/0232694 A1 | 9/2008 | Sulatycke |
| 2008/0273421 A1 | 11/2008 | Koren et al. |
| 2009/0122060 A1 | 5/2009 | Porat et al. |
| 2009/0157322 A1 | 6/2009 | Levin |
| 2010/0156920 A1 | 6/2010 | Shin et al. |
| 2010/0245347 A1 | 9/2010 | Dorn et al. |
| 2011/0015910 A1 | 1/2011 | Ran et al. |
| 2011/0054857 A1 | 3/2011 | Moguchaya |
| 2011/0115787 A1 | 5/2011 | Kadlec |
| 2011/0120702 A1 | 5/2011 | Craig |
| 2012/0037379 A1 | 2/2012 | Hilliard et al. |
| 2012/0072116 A1 | 3/2012 | Dorn et al. |
| 2012/0318500 A1 | 12/2012 | Urbancic et al. |
| 2013/0144532 A1 | 6/2013 | Williams et al. |
| 2013/0204598 A1 | 8/2013 | Mallet |
| 2013/0215712 A1* | 8/2013 | Geiser ............... G01V 1/288 367/9 |
| 2013/0231903 A1 | 9/2013 | Li et al. |
| 2013/0262052 A1 | 10/2013 | Mallet et al. |
| 2014/0076543 A1 | 3/2014 | Ejofodomi et al. |
| 2014/0207430 A1* | 7/2014 | Li ............... E21B 41/00 703/2 |

FOREIGN PATENT DOCUMENTS

| | | |
|---|---|---|
| GB | 2444506 A | 6/2008 |
| GB | 2444167 B | 3/2011 |
| RU | 2145100 | 1/2000 |
| WO | WO 99/41676 | 8/1999 |
| WO | WO 03/009003 A1 | 1/2003 |
| WO | WO 03/050766 | 6/2003 |
| WO | WO 2006/007466 A2 | 1/2006 |
| WO | WO 08/005690 | 1/2008 |
| WO | WO 2011/077227 | 6/2011 |
| WO | WO 2013/028237 | 2/2013 |

OTHER PUBLICATIONS

Svensson, U. (2001). A continuum representation of fracture networks. Part I: Method and basic test cases. Journal of Hydrology, 250(1-4), 170-186. (Year: 2001).*

Urbancic, T., & Baig, A. (Feb. 2014). Enhancing recovery in shales through stimulation of pre-existing fracture networks. In SPE Hydraulic Fracturing Technology Conference. Society of Petroleum Engineers. (Year: 2014).*

U.S. Appl. No. 14/059,099, filed Oct. 21, 2013, Mallet et al.
U.S. Appl. No. 14/065,713, filed Oct. 29, 2013, Mallet et al.
U.S. Appl. No. 14/189,505, filed Feb. 25, 2014, Mallet.
U.S. Appl. No. 13/862,680, filed Apr. 15, 2013, Tertois, et al.
U.S. Appl. No. 14/260,760, filed Apr. 24, 2014, Mallet, et al.
U.S. Appl. No. 61/896,760, filed Oct. 29, 2013, Dulac, et al.
U.S. Appl. No. 14/211,744, filed Mar. 14, 2014, Mallet.
Bakker, "Image Structure Analysis for Seismic Interpretation," doctoral thesis, publicly defended on Jun. 4, 2002.
Carr et al., "Reconstruction and Representation of 3D Objects with Radial Basis Functions," ACM SIGGRAPH 2001, ACM Press New York, Computer Graphics Proceedings, pp. 67-76, 2001 (ISBN 1-58113-374-X).
Caumon et al. "Building and Editing a Sealed Geological Model," Mathematical Geology, vol. 36, No. 4, May 2004; pp. 405-424.
Caumon et al., "Elements for Stochastic Structural Perturbation of Stratigraphic Models," Proc. Petroleum Geostatistics, Sep. 10-14, 2007.
Chiles et al., "Modelling the Geometry of Geological Units and its Uncertainty in 3D From Structural Data: The Potential-Field Method," Orebody Modelling and Strategic Mine Planning, pp. 313-320, Nov. 22-24, 2004.
Cignoni et al., "Multiresolution Representation and Visualization of Volume Data," IEEE Transactions on Visualizations and Computer Graphics; 3(4), Oct.-Dec. 1997; pp. 352-369.
Claerbout, "Fundamentals of Geophysical Data Processing with Applications to Petroleum Prospecting," Blackwell Scientific Publications, 1985.
Clawson et al., "The Value of 3D Seismic Attributes for Illuminating Deep Water Deposits by Seismic Forward Modeling of the Brushy Canyon Formation," 2003 SEG Annual Meeting, Oct. 26-31, 2003, Dallas, Texas (only Abstract submitted).
Courrioux et al., "3D Volumetric modelling of Cadomian Terranes (Northern Brittany, France): an automatic method using Voronoi diagrams," Tectonophysics 331(1-2), Feb. 2001, pp. 181-196.
Cremeens et al., "On Chronostratigraphy, Pedostratigraphy, and Archaeological Context," Soil Science Society of America, 1995.
Cuisenaire, "Distance Transformations: Fas Algorithms and Applications to Medical Image Processing," Laboratoire de Telecommunications et Teledetection; Oct. 1999.

(56) References Cited

OTHER PUBLICATIONS

Davies, "Conditioning Poorly Sampled Gathers for Pre and Post Stack Analysis," Journal of Conference Abstracts, 2002, vol. 7, No. 2, pp. 142-143.
De Groot et al., "How to create and use 3D Wheeler transformed seismic volumes," SEG/New Orleans 2006 Annual Meeting, pp. 1038-1042.
Dorn, "Chapter 13, Interpreting 3-D Seismic Data," The Leading Edge, Sep. 1998, p. 1261-1272.
Dulac, "Advances in chrono-stratigraphic interpretation modeling," First Break, vol. 27, Oct. 2009.
Durand-Riard et al., "Balanced restoration of geological volumes with relaxed meshing constraints," Computers and Geosciences, vol. 36, No. 4, pp. 441-452, Nov. 17, 2010.
EAGE Daily News, "Paradigm is Redefining Interpretation," 2011 EAGE Conference & Exhibition, May 2011.
Egan et al., "Three-Dimensional Modelling and Visualisation in Structural Geology: New Techniques for the Restoration and Balancing of Volumes," Proceedings of GIG Conference on Geological Visualisation—the Intelligent Picture?, British Geological Survey, Oct. 1996.
Escalona et al., Sequence-stratigraphic analysis of Eocene clastic foreland basin deposits in central Lake Maracaibo using high-resolution well correlation and 3-D seismic data, AAPG Bulletin, vol. 90, No. 4, pp. 581-623 (Apr. 2006) (only Abstract submitted).
Frank et al., "3D-reconstruction of Complex Geological Interfaces from Irregularly Distributed and Noisy Point Data," Computers & Geosciences 33 (2007) 932-943.
Frank, "Advanced Visualization and Modeling of Tetrahedral Meshes," Doctorat de l'Institut National Poly technique de Lorraine; pp. 1-140; 2006.
"Geomodeling Releases VisualVoxAT™ 6.2 Software—Introducing the Geobody Paintbrush," New Release, Sep. 24, 2007, printed from http://www.geomodeling.com/news_22.htm; on Oct. 5, 2009.
Gibbons, "Seismic Applications Overview," Society of Petroleum Engineers, Aug. 2003, 9 pages.
GoCAD Suite 2.5 2007 User Guide: Parts 1-12, published Sep. 15, 2007.
Harris et al., "Fault Seal Risk Volumes—A New Tool for the Assessment of Reservoir Compartmentalisation" 71st EAGE Conference & Exhibition—Amsterdam, The Netherlands, Jun. 8-11, 2009.
Jayr et al., "The Need for a Correct Geological Modelling Support: the Advent of the UVT-Transform," First Break, vol. 26, Oct. 2008, pp. 73-79.
Jentzsch et al., "Kinematic subsidence modelling of the Lower Rhine Basin," Netherlands Journal of Geosciences, vol. 81, No. 2, pp. 231-239 (2002).
Jones, "Data structures for three-dimensional spatial information systems in geology," Int. J. Geographical Information Systems, 3(1), 1989, pp. 15-30.
Labrunye et al., "New 3D flattened space for seismic interpretation," SEG Houston 2009 International Exposition and Annual Meeting, pp. 1132-1136.
Ledez, "Modelisation D'Objets Naturals par Formulation Implicite," Ecole Nationale Superieure de Geologie; Oct. 28, 2003; pp. 1-158, see English Abstract.
Lee et al., "Pitfalls in Seismic Data Flattening," The Leading Edge, Feb. 2001, pp. 161-164.
Lepage, "Generation de Maillages Tridimensionnels Pour la Simulation des Phenomenes Physiques en Geosciences," Ecole National Superieure de Geologie; Oct. 28, 2003; pp. 1-224, see English Abstract.
Lessenger et al., "An Inverse Stratigraphic Simulation Model: Is stratigraphic Inversion Possible?" Energy Exploration & Exploitation, vol. 14, No. 6, pp. 627-637 (1996) (only Abstract submitted).
Ligtenberg et al., "Sequence Stratigraphic Interpretation in the Wheeler Transformed (Flattened) Seismic Domain," EAGE 68th Conference & Exhibition—Vienna, Austria, Jun. 12-15, 2006.
Liwanag, "Reservoir Characterisation, Introducing geological processes in reservoir models," GEO ExPro Oct. 2005, pp. 28-32.
Lixin, "Topological relations embodied in a generalized tri-prism (GTP) model for a 3D geoscience modeling system," Computers & Geosciences 30(4), May 2004, pp. 405-418.
Lomask et al., "Flattening Without Picking," Geophysics, vol. 71, No. 4, pp. P13-P20, Jul.-Aug. 2006.
Lomask et al., "Flattening Without Picking," Stanford Exploration Project, Report 112, Nov. 11, 2002, pp. 141-150.
Lomask et al., "Update on Flattening Without Picking," Stanford Exploration Project, Report 120, May 3, 2005, pp. 137-159.
Lomask, "Flattening 3-D Seismic Cubes Without Picking," Jan. 8, 2004.
Mallet, "Discrete Smooth Interpolation in Geometric Modelling," Journal of Computer Aided Design, 24(4), 1992, pp. 178-191.
Mallet, "Numerical Earth Models," 2008 EAGE Publications, ISBN 978-90-73781-63-4, p. 147-157.
Mallet, "Space-time Mathematical Framework for Sedimentary Geology," Journal of Mathematical Geology, vol. 36, No. 1, Jan. 2004, pp. 1-32.
Mallet, Geomodeling (Book chapter); Chapter 6; Oxford University Press; cover and preface pages and pp. 244-315, 2002.
Mallet, *Geomodeling*, Oxford University Press, Sep. 22, 2004 (ISBN 0-19-514460.0).
Mitchum et al., "Seismic Stratigraphy and Global Changes of Sea Level, Part 6: Stratigraphic Interpretation of Seismic Reflection Patterns in Depositional Sequences," received Jan. 6, 1977, accepted Jun. 13, 1977, pp. 117-133.
Monsen et al., "Geological process controlled interpretation based on 3D Wheeler diagram generation," SEG/San Antonio 2007 Annual Meeting, pp. 885-889.
Moretti et al., "KINE3D: a New 3D Restoration Method Based on a Mixed Approach Linking Geometry and Geomechanics," Oil & Gas Science and Techonology, Rev. IFP, vol. 61 (2006), No. 2, pp. 277-289.
Moyen et al., "3D-Parameterization of the 3D Geological Space—The Geochron Model," 9th European Conference on the Mathematics of Oil Recovery, Geological Modelling I, Aug. 30, 2004.
Moyen, "Paramétrisation 3D de L'espace en Géologie Sédimentaire: Le Modèle Geochron Thèse," Doctorat de l'Institut National Polytechnique de Lorraine, Jun. 9, 2005 (original text in French and English translation).
Müller et al. "3D Restoration and mechanical properties," from structure.harvard.edu/projects/restoration, Harvard University Structural Geology and Earth Resources Group, 2005, accessed on Aug. 21, 2012.
O'Malley et al., "Towards Robust Structure-Based Enhancement and Horizon Picking in 3-D Seismic Data," Proceedings of the 2004 IEEE Computer Society Conference on Computer Vision and Pattern Recognition (CVPR '04), 2004, vol. 2, pp. 482-489.
OpendTect Workflows Documentation version 4.2, dGB Beheer B.V., dGB Earth Sciences, Copyright © 2002-2010.
Oyedele, "3-D High Resolution Seismic Imaging of Middle-Late Quaternary Depositional Systems, Southeast Green Canyon, Sigsbee Escarpment, Gulf of Mexico," Thesis presented to the Faculty of the Dept. of Geosciences at the University of Houston, Aug. 2005.
Paradigm™ SKUA™ 2009 User Guide: Part V Seismic Interpretation Modeling, Feb. 3, 2009.
Rouby et al., "3-D Restoration of Complexly Folded and Faulted Surfaces Using Multiple Unfolding Mechanisms," AAPG Bulletin, vol. 84, No. 6, pp. 805-829 (Jun. 2000).
Rumpf et al., "A Continuous Skeletonization Method Based on Level Sets," Joint EUROGRAPHICS—IEEE Symposium on Visualization, pp. 151-157 (2002).
Saito, "New Algorithms for Euclidean Distance Transformation of an n-Dimensional Digitized Picture with Applications," Pattern Recognition, 27(11) 1994; pp. 1551-1565.
Samson et al., "Quantifying the Impact of Structural Uncertainties on Gross-Rock Volume Estimates", SPE 1996, pp. 381-392.
Smith et al., "SUSAN—A New Approach to Low Level Image Processing," International Journal of Computer Vision, 1997, vol. 23, Iss. 1, pp. 45-78.

(56) References Cited

OTHER PUBLICATIONS

Souche, "Integration of fault models into unstructured grids and geo-chronological space," 24th GOCAD Meeting, Jun. 2004.
Stark, "Generation of a 3D seismic 'Wheeler Diagram' from a high resolution Age Volume," pp. 782-786, submitted to the 75th Annual SEG Convention, Nov. 6-11, 2005, Houston, TX.
Stark, "Relative Geologic Time (Age) Volumes—Relating Every Seismic Sample to a Geologically Reasonable Horizon," The Leading Edge, Sep. 2004, pp. 928-932.
Terraspark Geosciences, "Geoscience Interpretation Visualization Consortium (GIVC)," http://terraspark.com/GIVC.consort, accessed on May 11, 2006.
Tertois et al., "Editing faults within tetrahedral volume models in real time," In Jolley, S.J., Barr, D., Walsh, J.J. et al. (Eds), Structurally Complex Reservoirs, London, UK: Geological Society of London, Special Publications 2007; v. 292; p. 89-101 (doi: 10.1144/SP292.5).
Tertois et al., Real-time Tetrahedral Volume Editing Accounting for Discontinuities; Ninth International Conference on Computer Aided Design and Computer Graphics (CAD/CG 2005) 2005 IEEE; pp. 1-6).
Tertois, "Création et édition de modèles géologiques par Champs de potential: Application au modele GeoChron—Thèse," Institut National Polytechnique de Lorraine, Jun. 21, 2007.
Tertois, Preserving Geological Information During Real-Time Editing of Faults in Tetrahedral Models; Int. Assoc. for Mathematic Geology Xith International Congress Universite de Liege—Belgium; 2006; S14-24; pp. 1-4.
Thomsen et al., "Towards a balanced 3D Kinematic Model of a Faulted Domain—the Bergheim Open Pit Mine, Lower Rhine Basin," Netherlands Journal of Geoscience, vol. 81, No. 2, pp. 241-250 (2002).
Thore et al., Integration of Structural Uncertainties into Reservoir grids construction—70th EAGE Conference & Exhibition—Rome, Italy, Jun. 9-12, 2008.
Trudgill et al., "Integrating 3D Seismic Data with Structural Restorations to Elucidate the Evolution of a Stepped Counter-Regional Salt System, Eastern Louisiana Shelf, Northern Gulf of Mexico," pp. 165-176. (2004).
Wen et al., "Use of Border Regions for Improved Permeability Upscaling," Mathematical Geology, 35(5), Jul. 2003; pp. 521-547.
Wood et al., "Applying Sequence Stratigraphy and Seismic Stratal Slice Technology in the Gulf of Mexico," GASTIPS, Lang et al. (Eds.), Winter 2003, vol. 9, No. 1, pp. 10-21.
Zeng et al., High-frequency Sequence Stratigraphy from Seismic Sedimentology: Applied to Miocene, Vermilion Block 50, Tiget Shoal Area Offshoure Louisiana, AAPG Bulletin, Feb. 2004, vol. 88, No. 2, pp. 153-174 (only Abstract submitted).
Zeng et al., "Interpretive Advantages of 90 Degree-Phase Wavelets: Part 2—Seismic Applications, " Geophysics, SEG, vol. 70, No. 3, May 2005-Jun. 2005. pp. C-17-C-24.
Zeng et al., "Seismic Frequency Control on Carbonate Seismic Stratigraphy: A Case Study of the Kingdom Abo Sequence, West Texas," AAPG Bulletin, vol. 87, Issue No. 2, pp. 273-293 (2003) (only Abstract submitted).
Zeng et al., "Stratal Slicing of Miocene-Pliocene Sediments in Vermilion Block 50-Tiger Shoal Area, Offshore Louisiana," The Leading Edge, Offshore Technology Special Section, vol. 20, No. 4, Apr. 2001, pp. 408-418.
Zeng et al., "Stratal Slicing, Part I: Realistic 3-D Seismic Model," Geophysics, Seg, vol. 63, No. 2, Mar. 1998-Apr. 1998, pp. 502-513.
Zeng et al., "Stratal Slicing, Part II: Read 3-D Seismic Data," Geophysics, vol. 63, No. 2 (Mar.-Apr. 1998); pp. 514-522.
Zeng et al., "Three-D Seismic Facies Imaging by Stratal Slicing of Miocene-Pliocene Sediments in Vermilion Block 50-Tiger Shoal Area, Offshore Louisiana," Secondary Gas Recovery, AAPG 2000.
Zeng, "From Seismic Stratigraphy to Seismic Sedimentology: A Sensible Transition," GCAGS Transactions, vol. 51, pp. 413-420 (2001) (only Abstract submitted).
Zeng, "Stratal Slicing: Benefits and Challenges," The Leading Edge 29, 1040 (Sep. 2010).
Zeng et al., "Stratal Slicing and Seismic Facies Imaging," Bureau of Economic Geology, The University of Texas at Austin, 1998. (only Abstract submitted).
Notice of Allowance issued for U.S. Appl. No. 11/628,559, dated Dec. 24, 2009.
Office Action issued for U.S. Appl. No. 11/628,559, dated Jun. 24, 2009.
Notice of Allowance issued for U.S. Appl. No. 12/791,370, dated Jul. 22, 2013.
Office Action issued for U.S. Appl. No. 12/791,370, dated Nov. 26, 2012.
Office Action issued for U.S. Appl. No. 14/059,099, dated Jun. 16, 2014.
Notice of Allowance issued for U.S. Appl. No. 12/791,352 dated Dec. 6, 2013.
Office Action issued for U.S. Appl. No. 12/791,483, dated Aug. 17, 2012.
Office Action issued for U.S. Appl. No. 12/909,981 dated Aug. 19, 2013.
Notice of Allowance issued for U.S. Appl. No. 12/909,981 dated Jan. 27, 2014.
International Search Report issued for PCT International Application No. PCT/IB2004/002030, dated Jan. 25, 2005.
Office Action issued for U.S. Appl. No. 14/065,713, dated Jun. 19, 2014.
Office Action issued for U.S. Appl. No. 14/211,744, dated Jun. 3, 2014.
Office Action issued for U.S. Appl. No. 14/260,760, dated Jul. 9, 2014.
Extended European Search Report issued by the European Patent Office for Application No. EP 15 16 0901 dated Aug. 28, 2015.

* cited by examiner

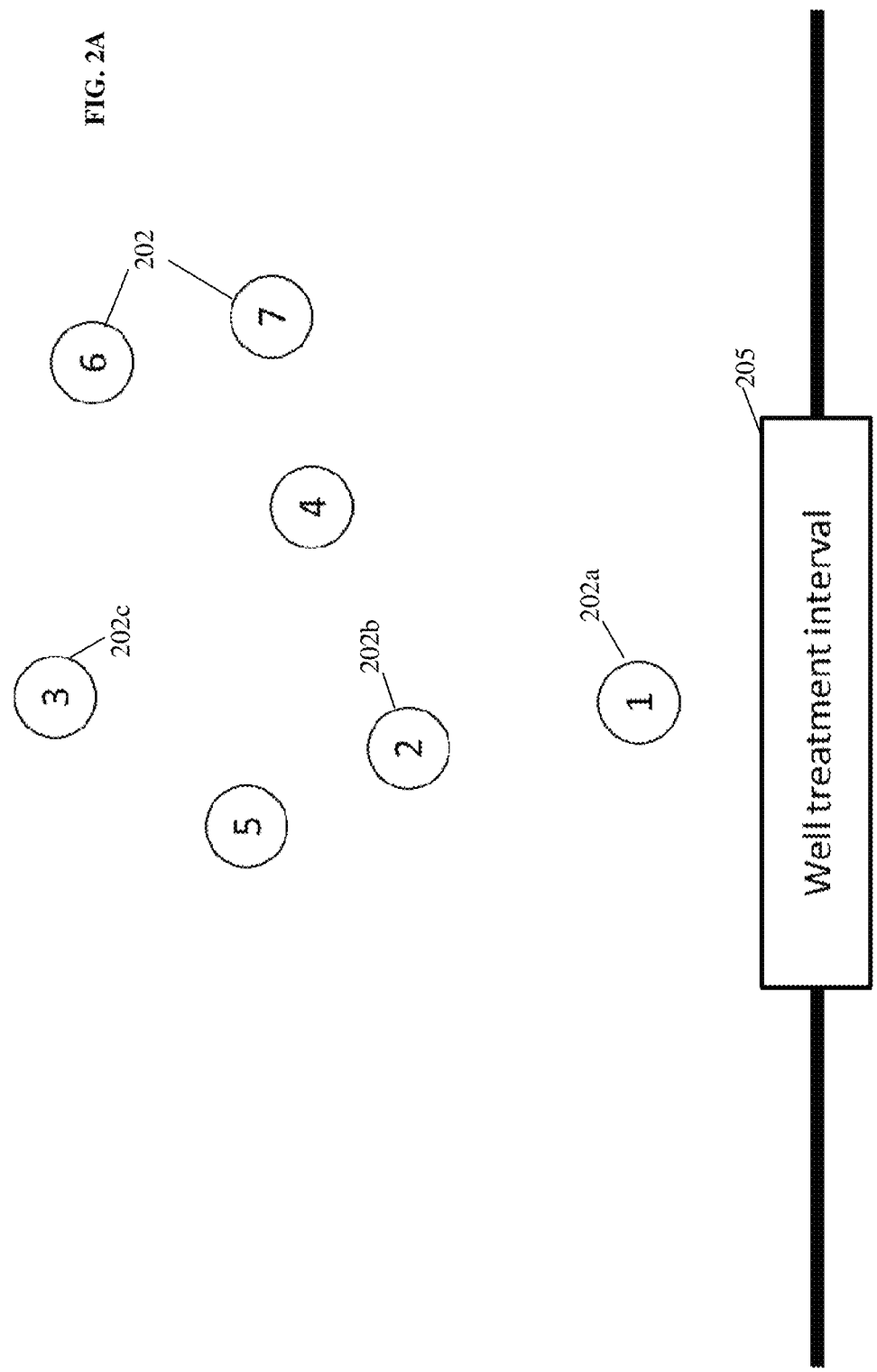

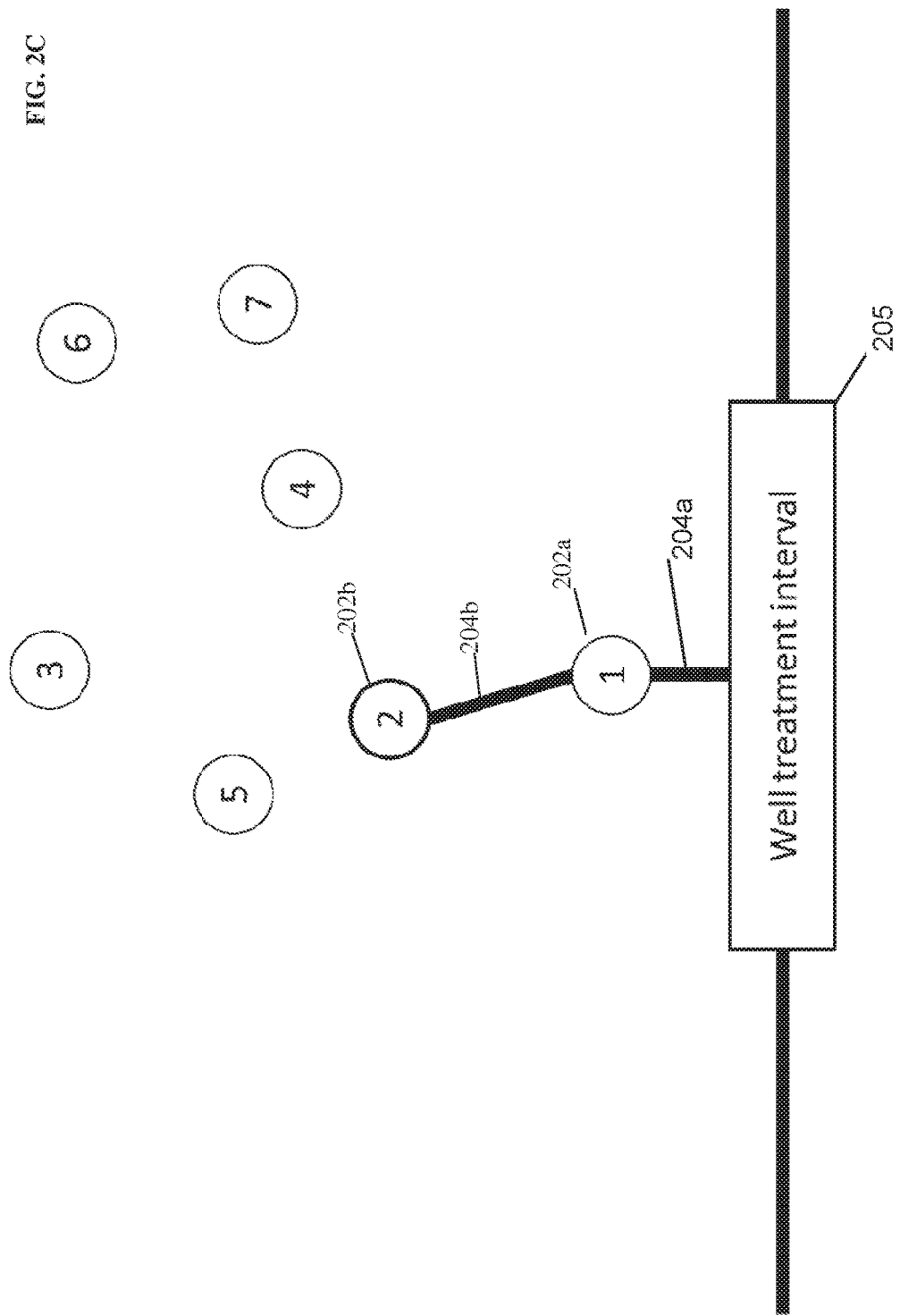

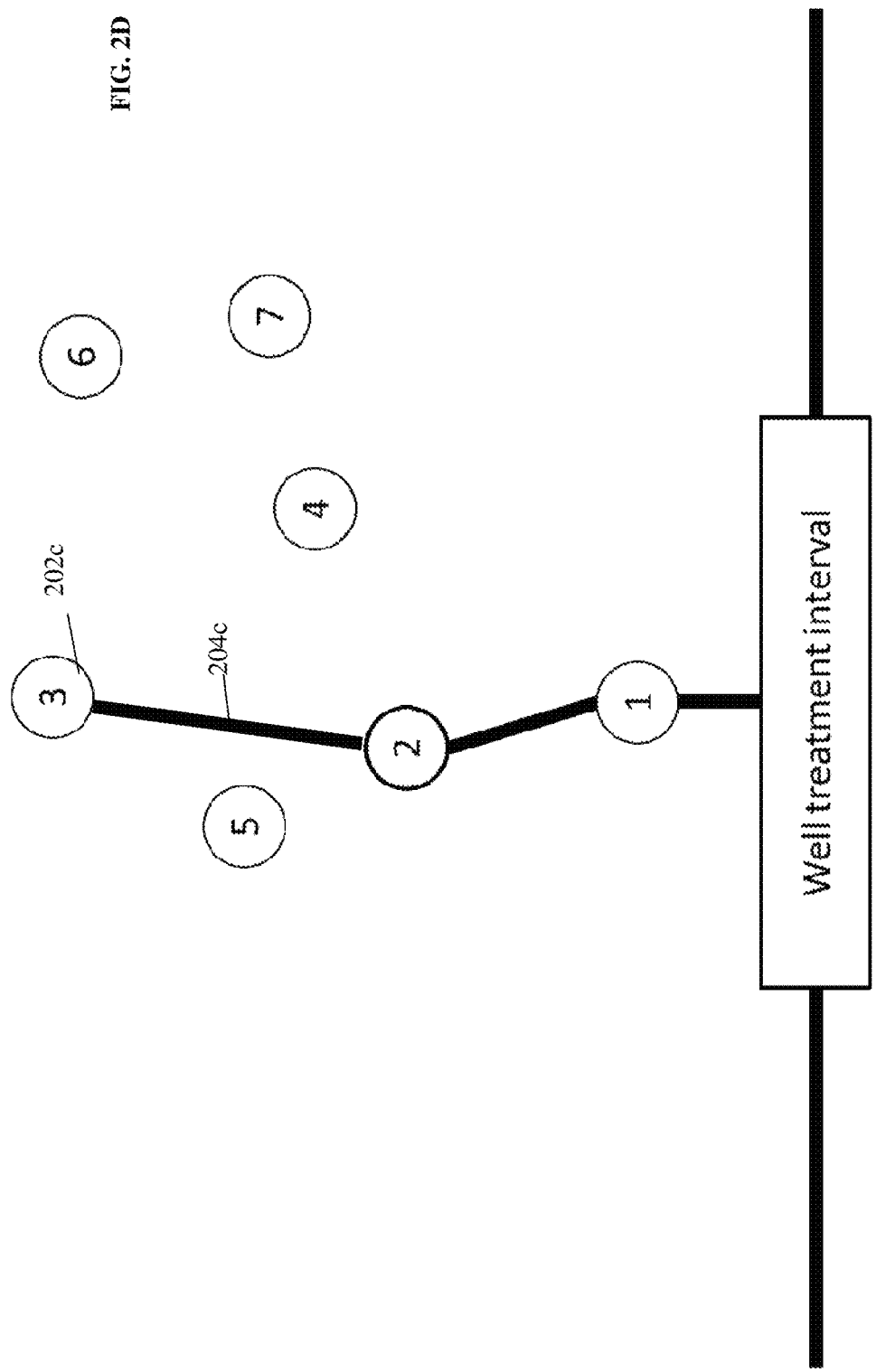

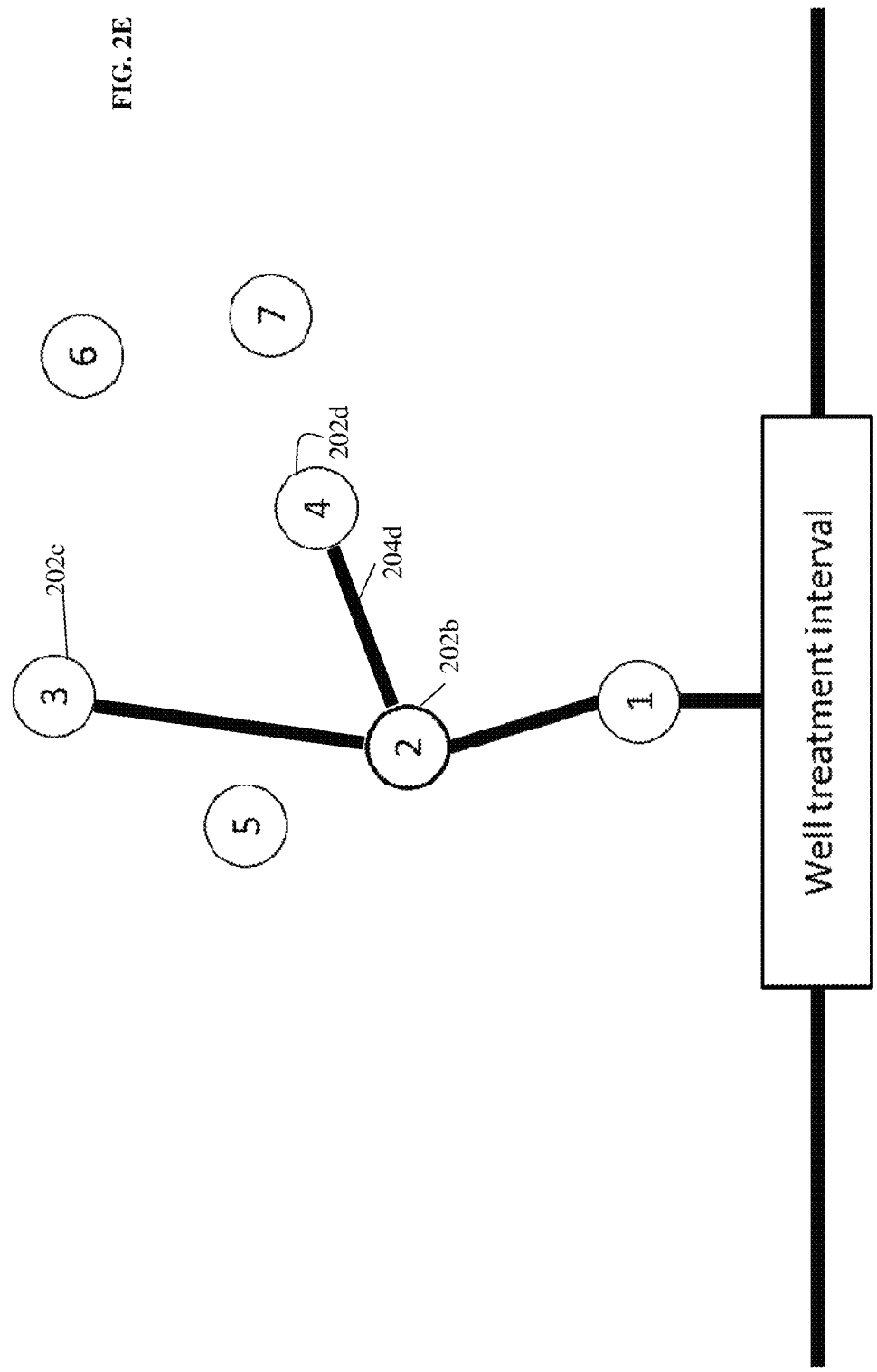

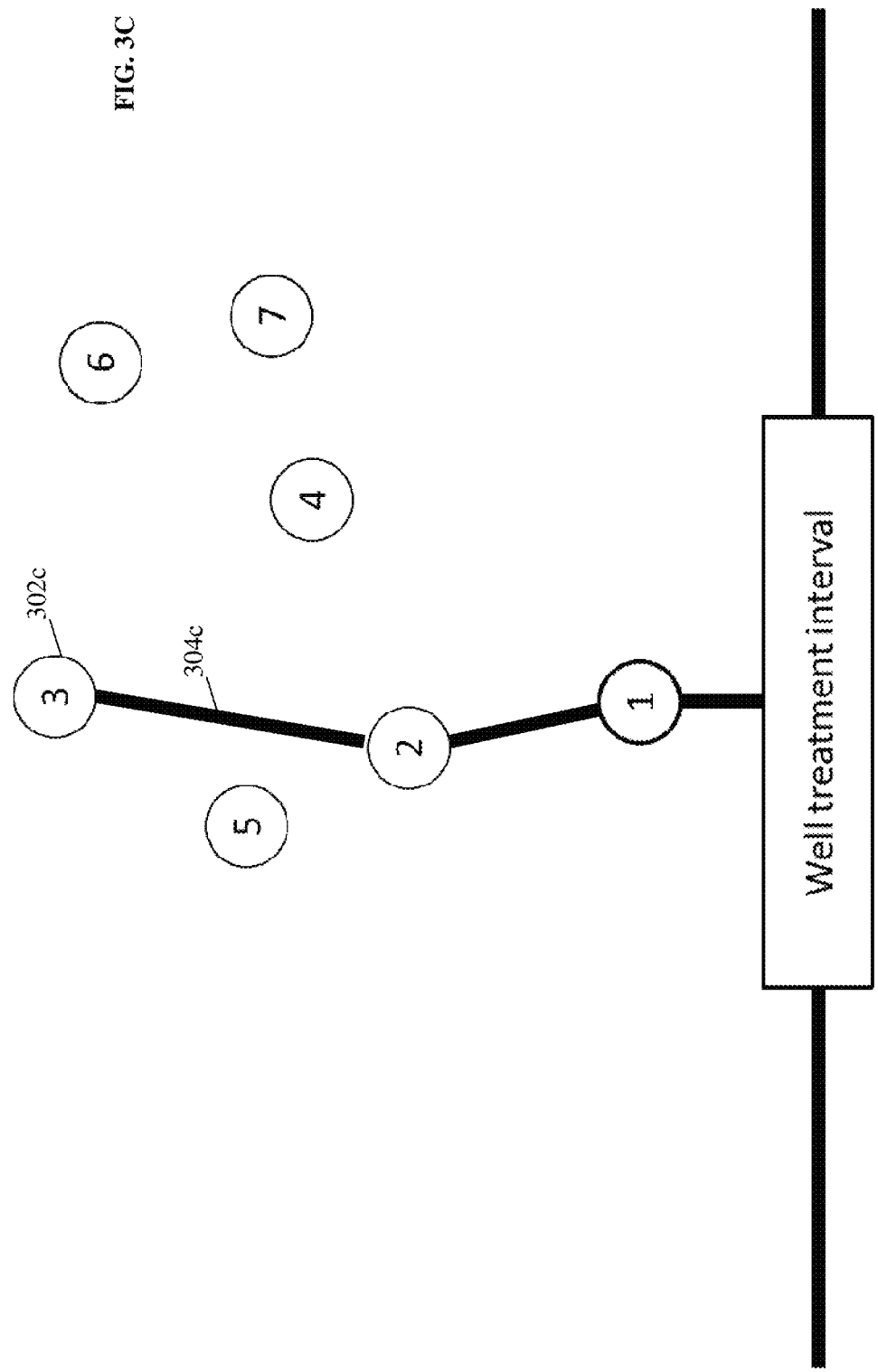

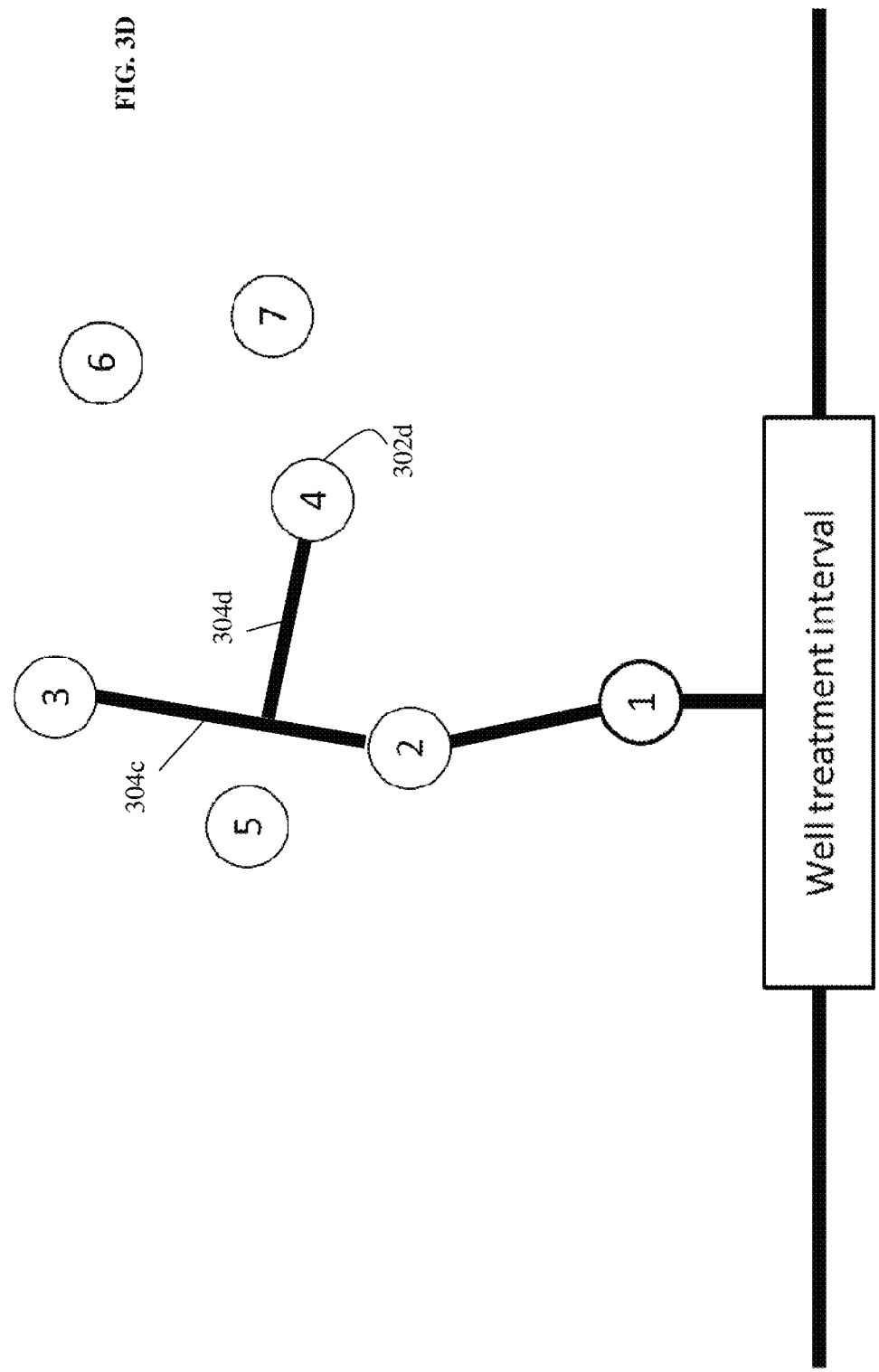

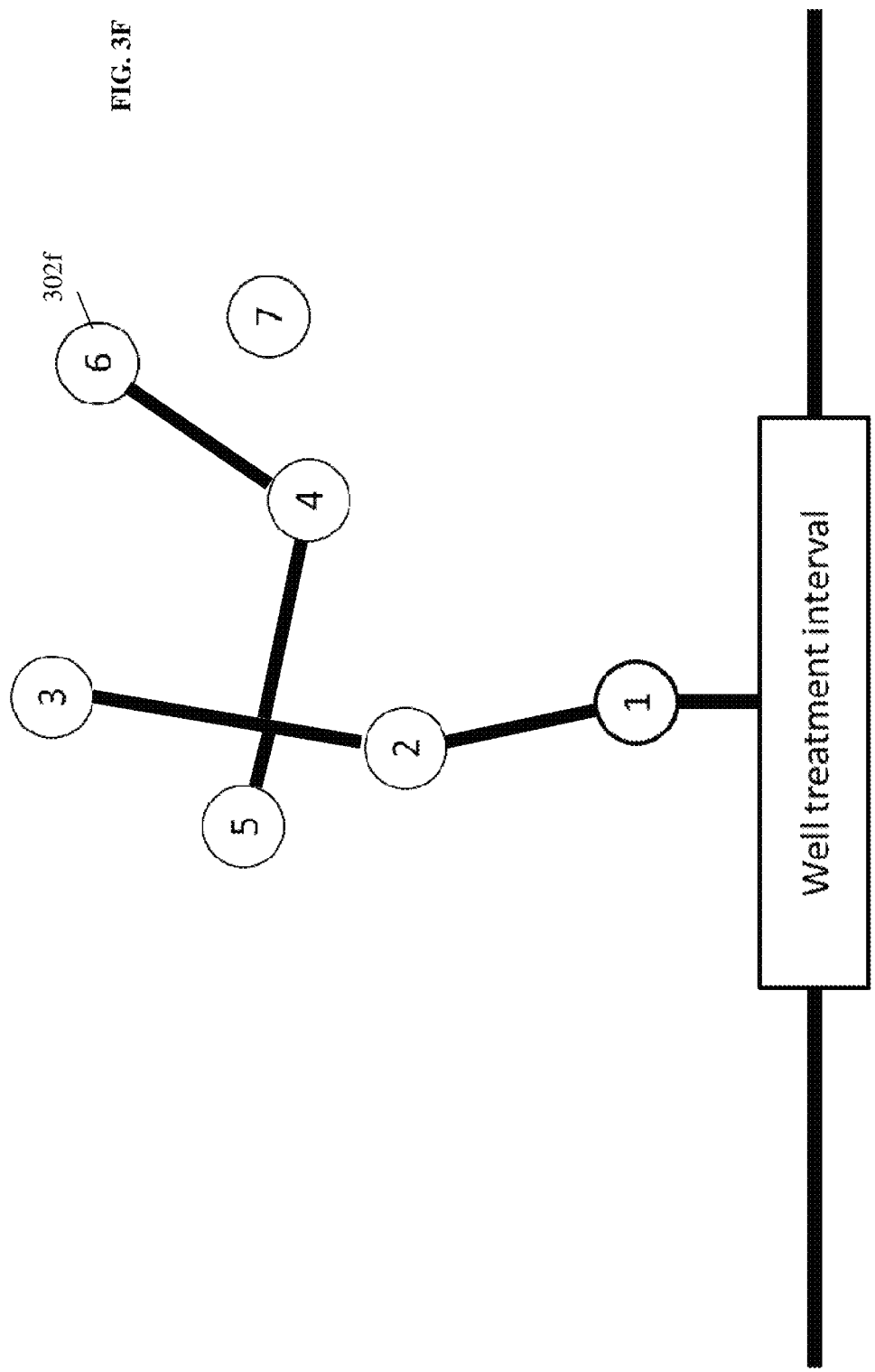

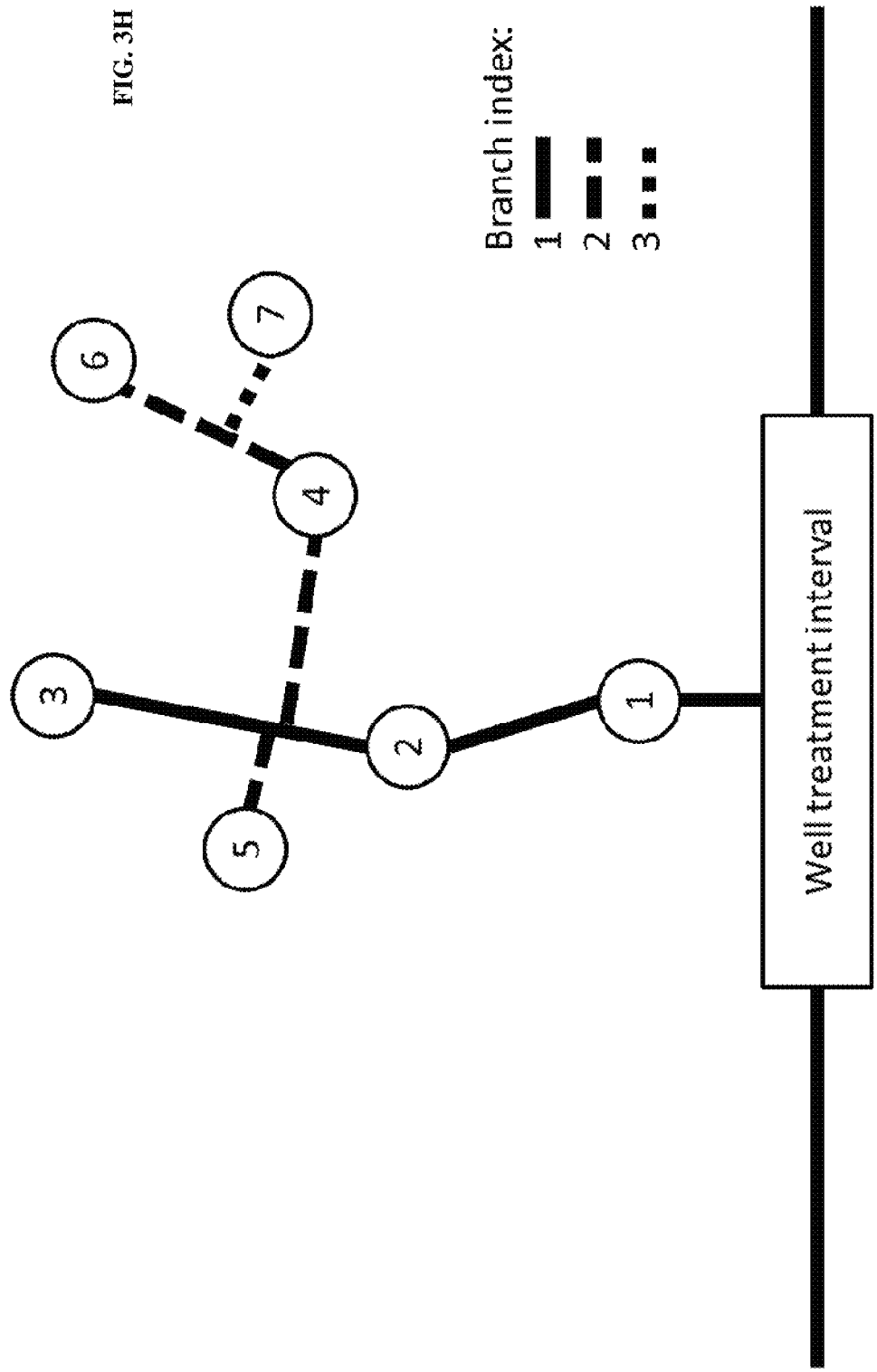

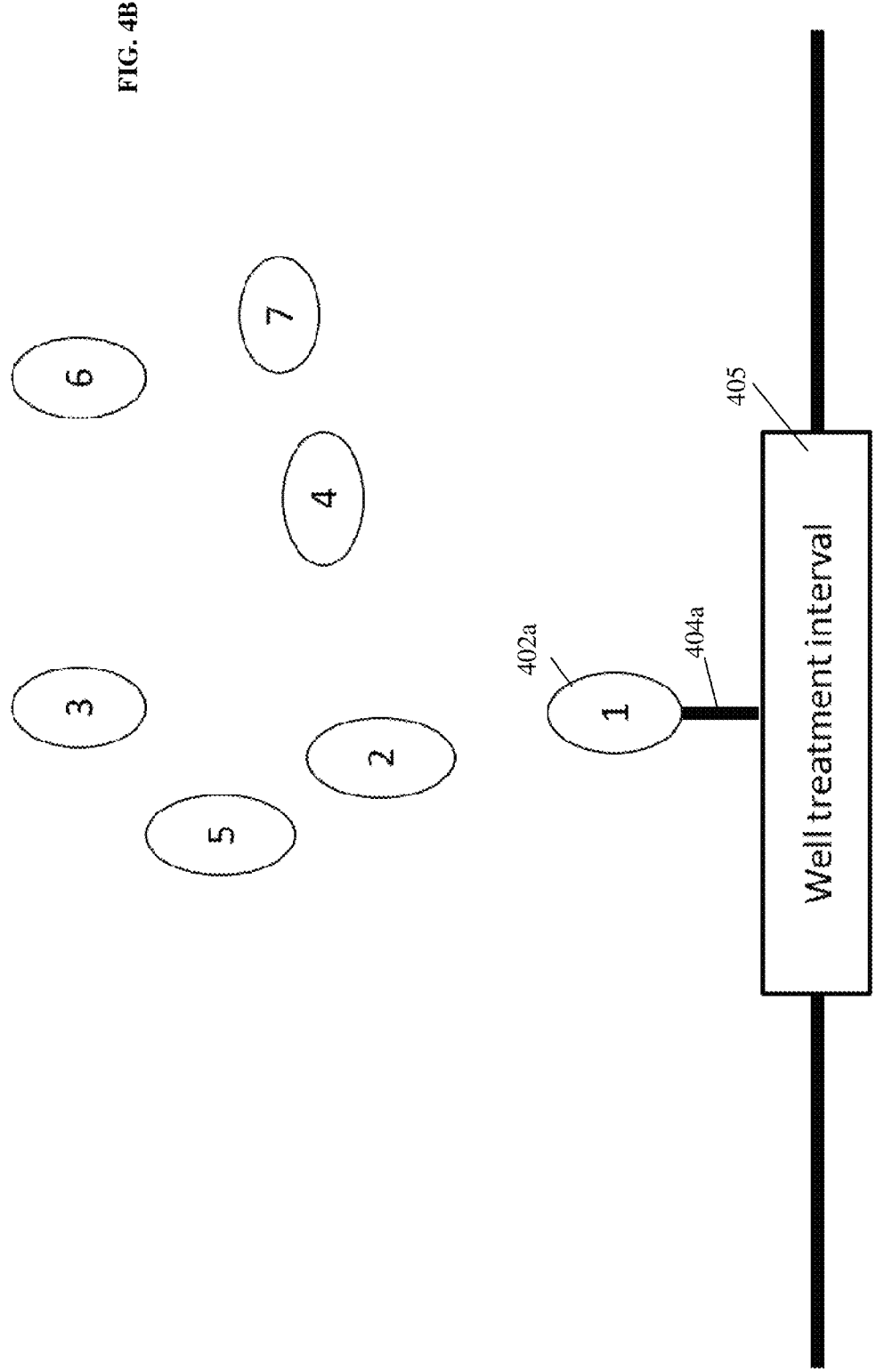

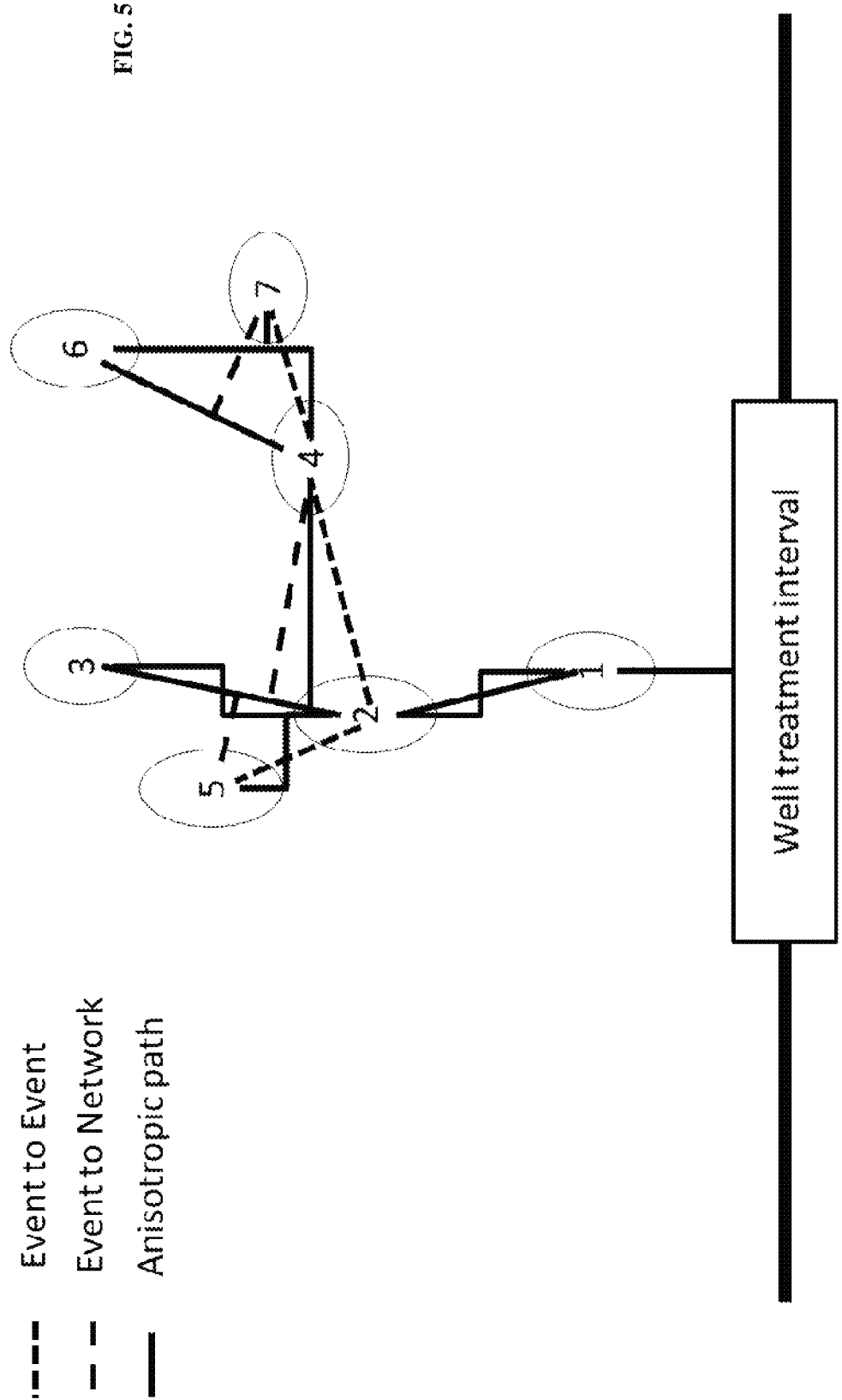

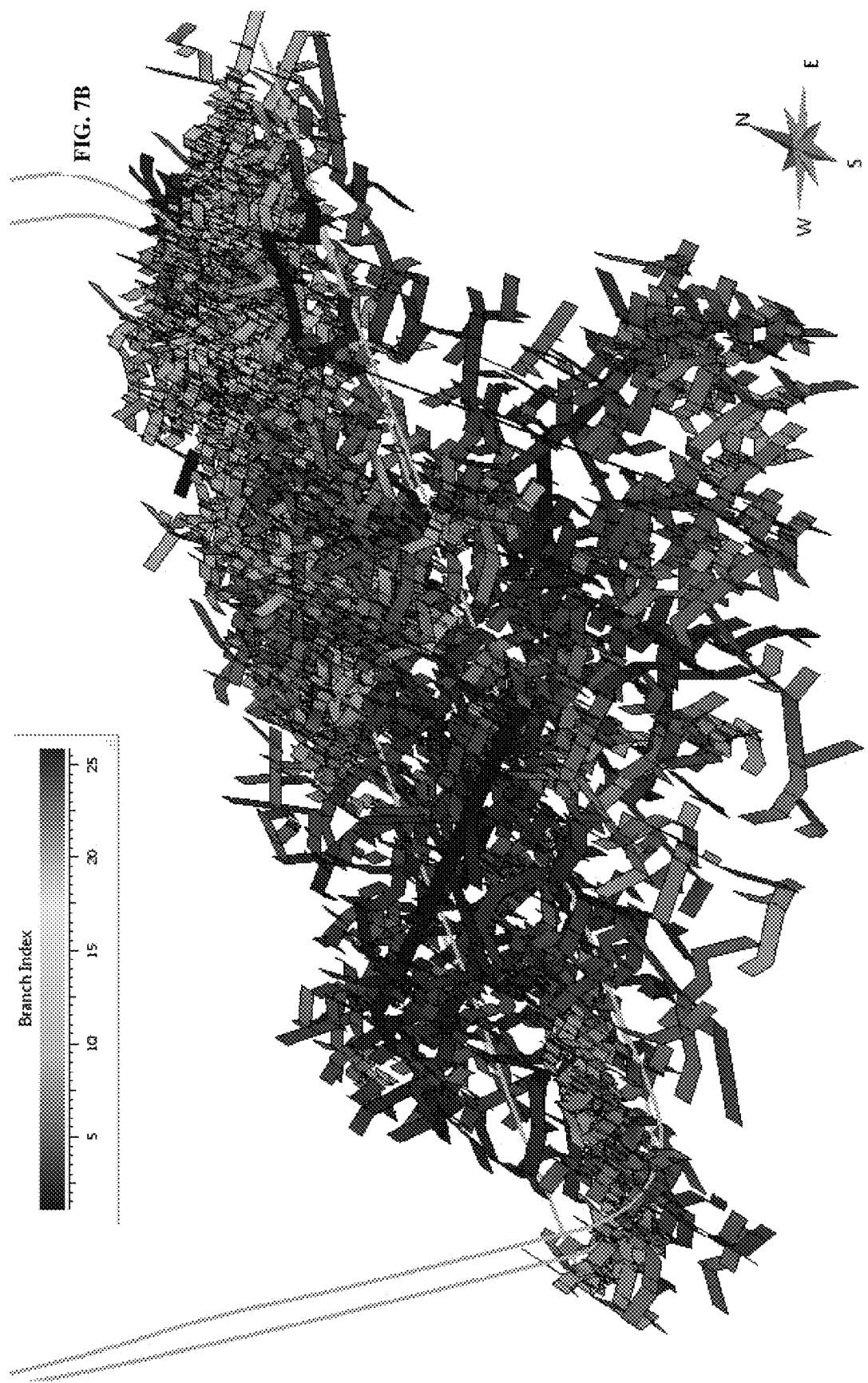

FIG. 9A
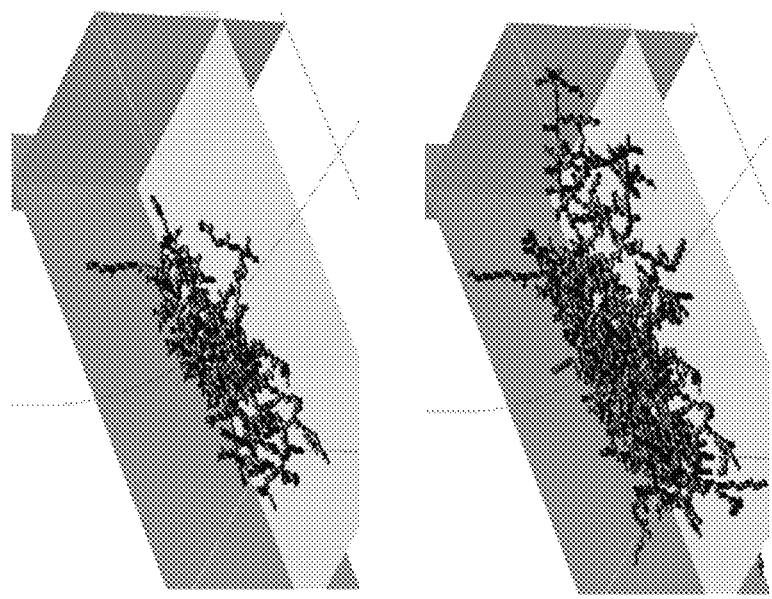
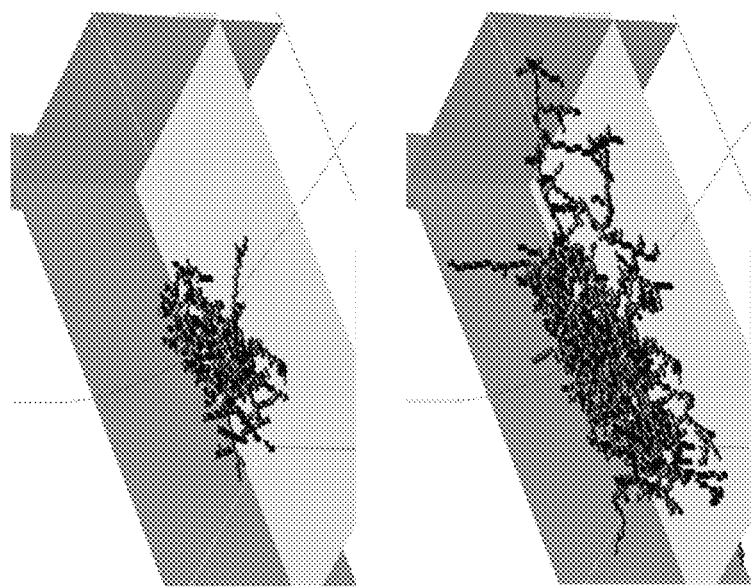

FIG. 10B
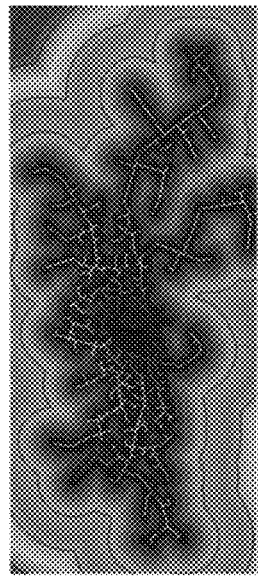
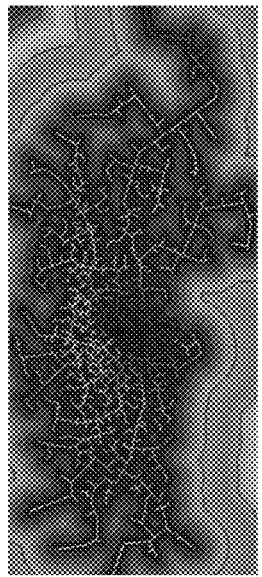
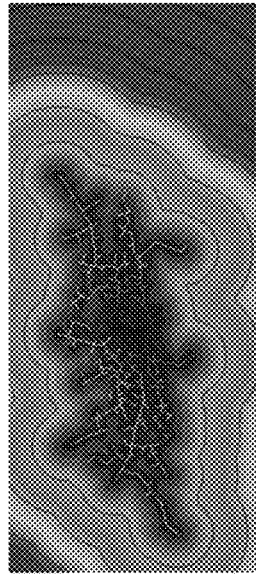
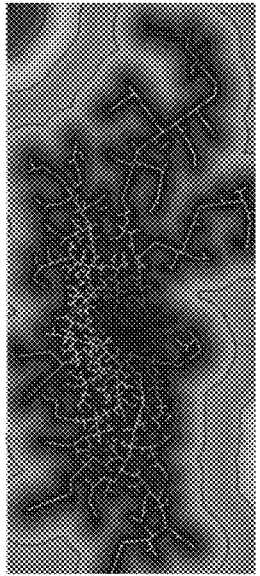

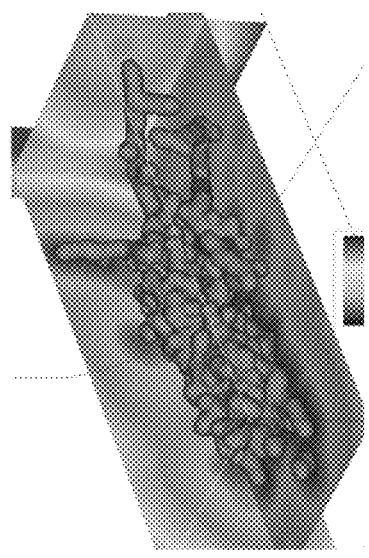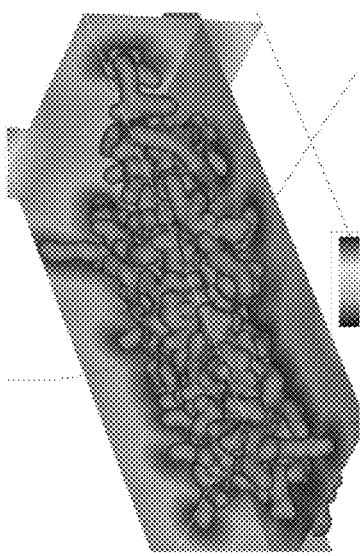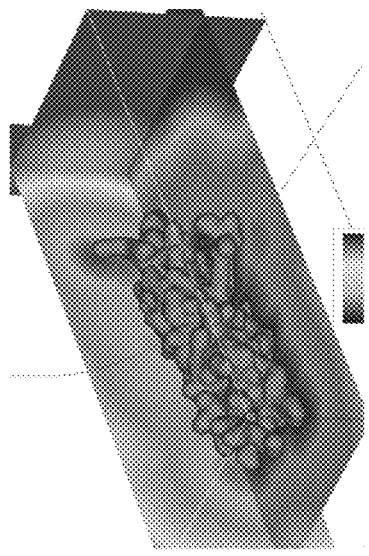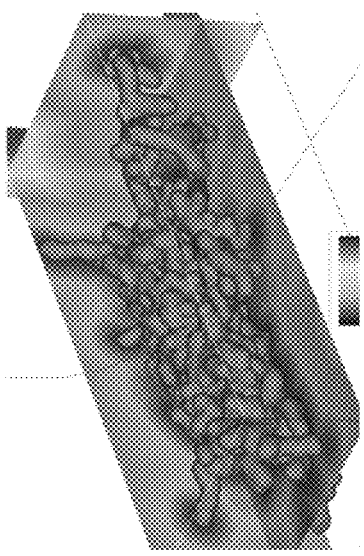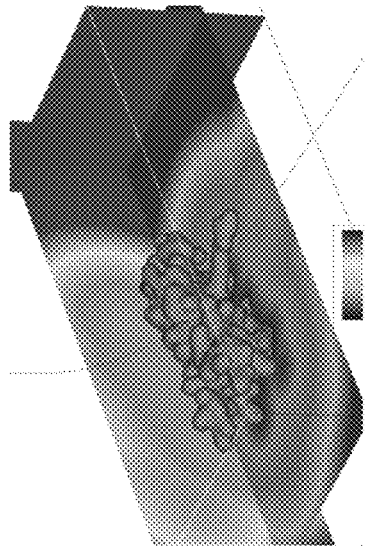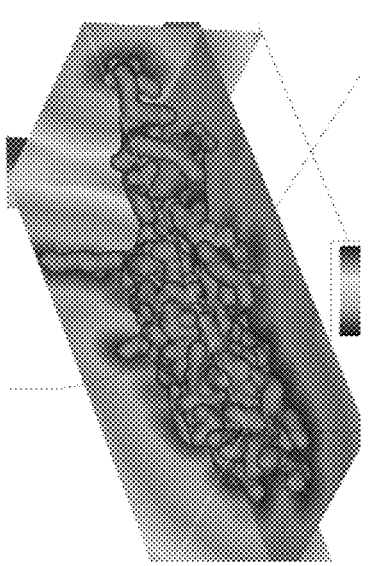
FIG. 11

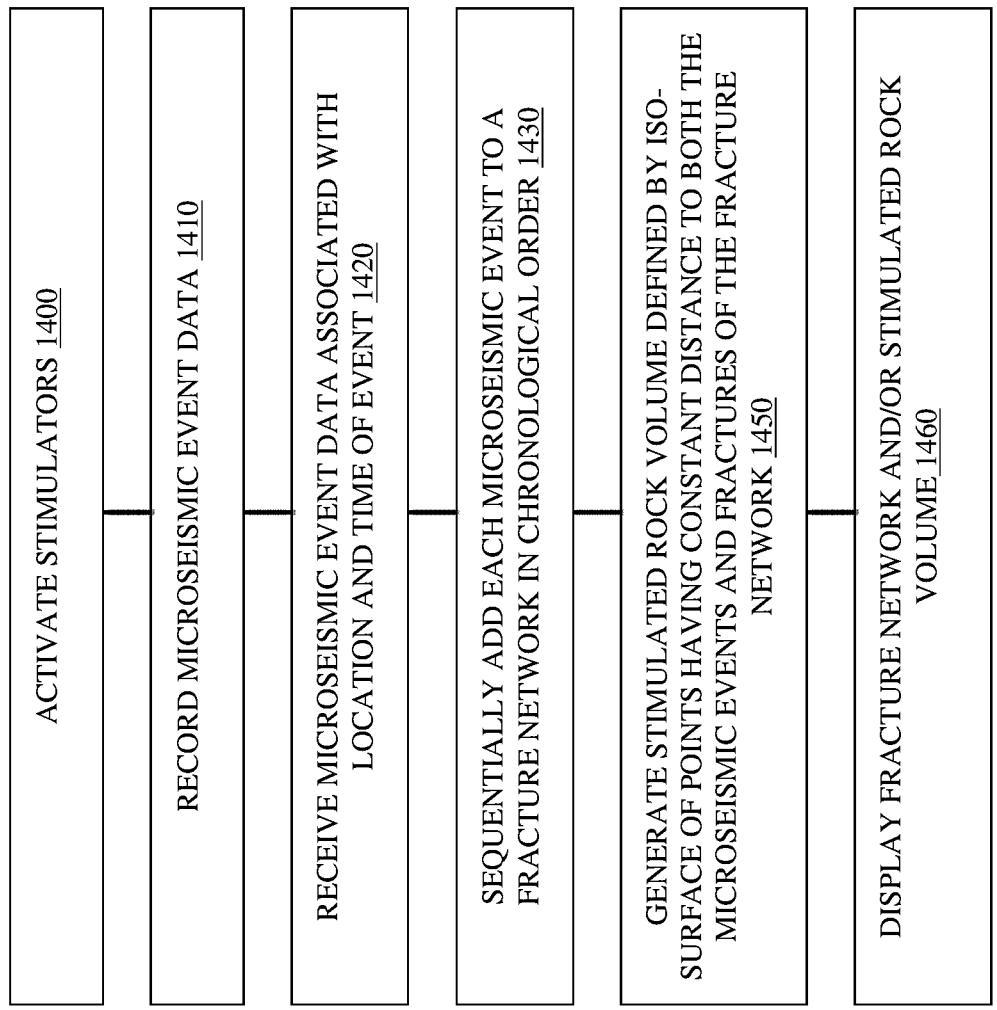

US 10,422,923 B2

SYSTEMS AND METHODS FOR MODELING FRACTURE NETWORKS IN RESERVOIR VOLUMES FROM MICROSEISMIC EVENTS

CROSS REFERENCE TO RELATED APPLICATIONS

This application claims benefit of U.S. Provisional Patent Application No. 61/971,648 filed on Mar. 28, 2014, which is incorporated herein by reference in its entirety.

FIELD OF THE PRESENT INVENTION

Embodiments of the invention may relate to modeling geological data. In particular, embodiments of the invention may relate to modeling fracture or pipe networks resulting from hydraulic fracturing.

BACKGROUND OF THE INVENTION

Hydraulic fracturing may be used to enhance the permeability of rock by injecting water or other fluids into wells at high pressure permeating the surrounding rock to erode or expand existing fractures and/or create new fractures extending from the well. The propagation of the fluids may create a fracture network. The fracture network or pipe network may then be drained to deliver or extract natural resources such as oil or gas into the well. The fracture network extending from each well may be modeled e.g. as a Stimulated Rock Volume (SRV) to predict the reach of each well's drainage to determine where to position other wells to drain a maximal amount of resources.

The flow of liquid through rock may be measured, for example, by geophones or accelerometers, placed at a plurality of discrete positions referred to as "sensor locations" to measure "microseismic events" (e.g. events 1-7 are shown in FIG. 1A). Microseismic events may include man-made explosions or blasts produced by stimulating geological structures e.g. by hydraulic fracturing. Man-made events are generally smaller or "micro" compared to naturally occurring seismic events. The resulting microseismic even data e.g. (x,y,z,t) produced may be recorded by the geophones.

The path of liquid between these spaced-apart events may be extrapolated from the event measurements to model the overall fracture network or SRV. Current systems extrapolate the flow of liquid between events using a homogenous model, assuming that liquid flows isotropically or omni-directionally through rock in all directions with equal probability. However, in reality, rock is typically heterogeneous and liquid tends to flow along certain preferred directions e.g. along the paths of the fracture network.

Accordingly, there is a need in the art and it would be highly useful to provide a system and method to model a fracture network taking into account the heterogeneous properties of fractured rock.

SUMMARY OF THE INVENTION

Embodiments of the invention may model or visualize a fracture network or pipe network based on microseismic events and/or perforated intervals of wells. The fracture network model may take into account the heterogeneous properties of fractured rock by modeling the flow of liquid along the paths of fracture lines. A time-dependent fracture network may be modelled based on the location and timing of microseismic events using a discrete fracture network approach which defines connections between microseismic events and a network that includes previous microseismic events. Each microseismic event, which is recorded at a specific time, may be added to the network in chronological order to iteratively expand the network until all recorded events are modeled. Each new event may be connected to the network by an "event-to-event" fracture, an "event-to-network" fracture, or an "anisotropic" fracture, discussed in more detail below.

According to an embodiment of the invention, data may be received associated with a set of microseismic events and a fracture network, where the data associated with each microseismic event includes a location where, and a time when, the microseismic event was recorded by one or more sensors e.g. geophones. Each microseismic event in the set may be sequentially added to a fracture network in chronological order of the time when the microseismic event was recorded. Each microseismic event may be added to the fracture network by connecting the event to the fracture network by a fracture according to a connection criterion. A stimulated rock volume may be generated that is defined by an iso-surface of points having a constant distance or fracture aperture to the fracture network, wherein the fracture network includes a plurality of microseismic events in the set and a plurality of fractures connecting the plurality of microseismic events according to the connection criterion. The fracture network and/or the stimulated rock volume may be displayed. In one example, the connection criterion may be an "event-to-event" connection criterion, in which each sequentially added event is connected to a previously added event associated with an earlier time. In another example, the connection criterion may be an "event-to-network" connection criterion, in which each sequentially added event is connected to a previously added event or fracture of the fracture network. In other examples, the connection criterion may be a connection criterion for a fracture attribute, such as, an anisotropism attribute defining the orientation of the fractures connecting events to the fracture network.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIGS. 2A to 2I are schematic illustrations of a time-dependent fracture network of microseismic events connected by "event-to-event" fractures, according to embodiments of the invention;

FIGS. 3A to 3H are schematic illustrations of a time-dependent fracture network of microseismic events connected by "event-to-network" fractures, according to embodiments of the invention;

FIGS. 4A to 4H are schematic illustrations of a time-dependent fracture network of microseismic events connected by (e.g. "anisotropic") fractures in accordance with a connection attribute (e.g. an "anisotropism" attribute), according to embodiments of the invention;

FIG. 5 is a schematic illustration of a compilation of time-dependent fracture networks modeled using "event-to-event" fractures (as described in reference to FIGS. 2A-2I), "event-to-network" fractures (as described in reference to FIGS. 3A-3H), and "anisotropic path" fractures (as described in reference to FIGS. 4A-4H), according to embodiments of the invention;

FIGS. 7A to 11 illustrate different visualizations of time-dependent fracture networks and associated gridded volumes and SRVs, according to embodiments of the invention;

FIG. 14 is a flowchart of a method according to embodiments of the invention.

Figure 1A:
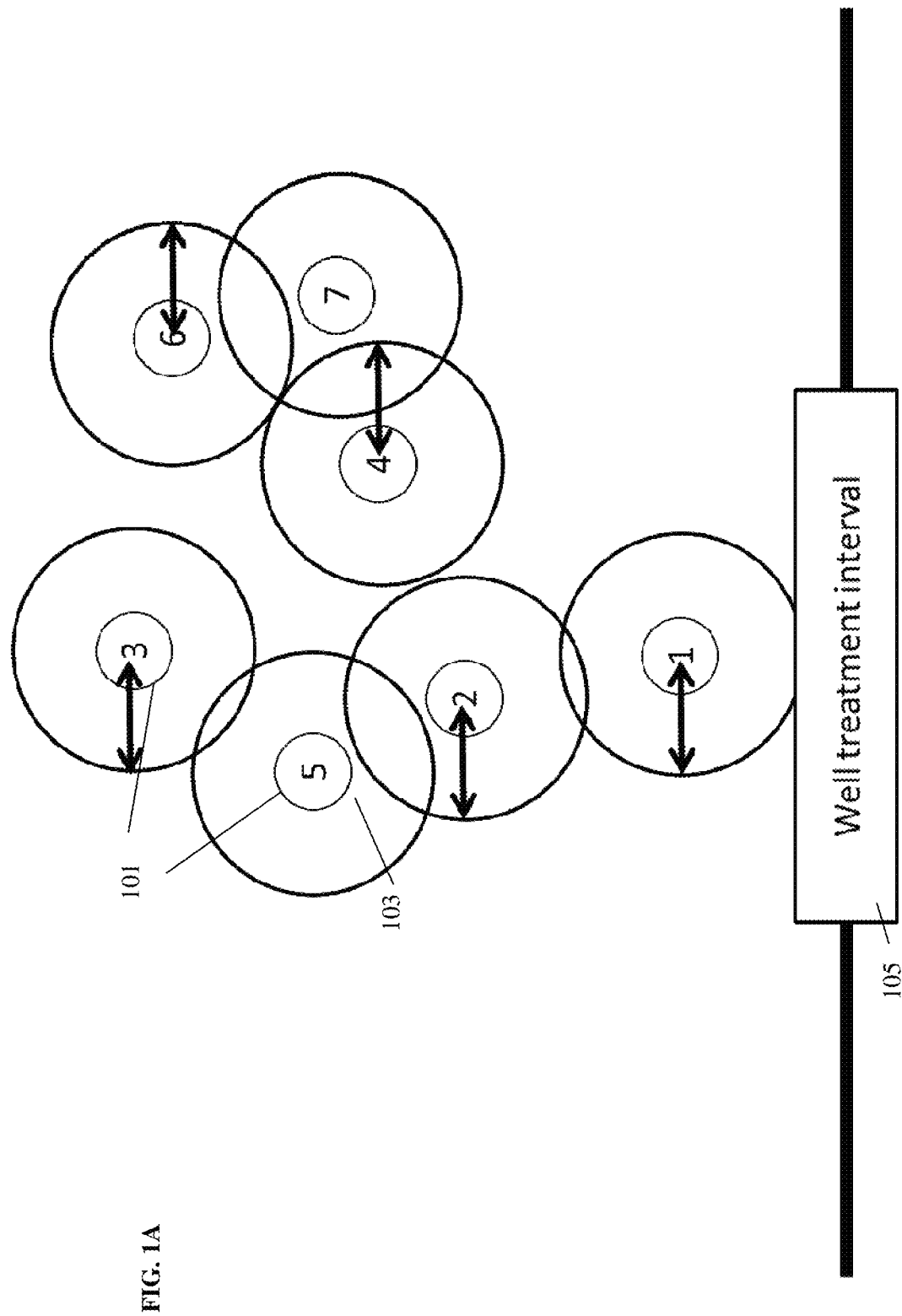
FIGS. 1A and 1B are schematic illustrations of microseismic events and a Stimulated Rock Volume generated from the microseismic events according to a prior art method.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

According to embodiments of the invention, hydraulic fracturing or other types of blasts may cause liquid or other material to expand from the blast source to permeate outward expanding through the subsurface. The blast, recorded at a plurality of sensor locations, may hit or cause a "microseismic event" to occur at different spatial locations (x,y,z,) at different respective times (t). Accordingly, a time-dependent set of events P(x,y,z,t) are recorded, for example, ordered from earlier to later times, and/or from closer to farther distances from the blast source.

Figure 1B:
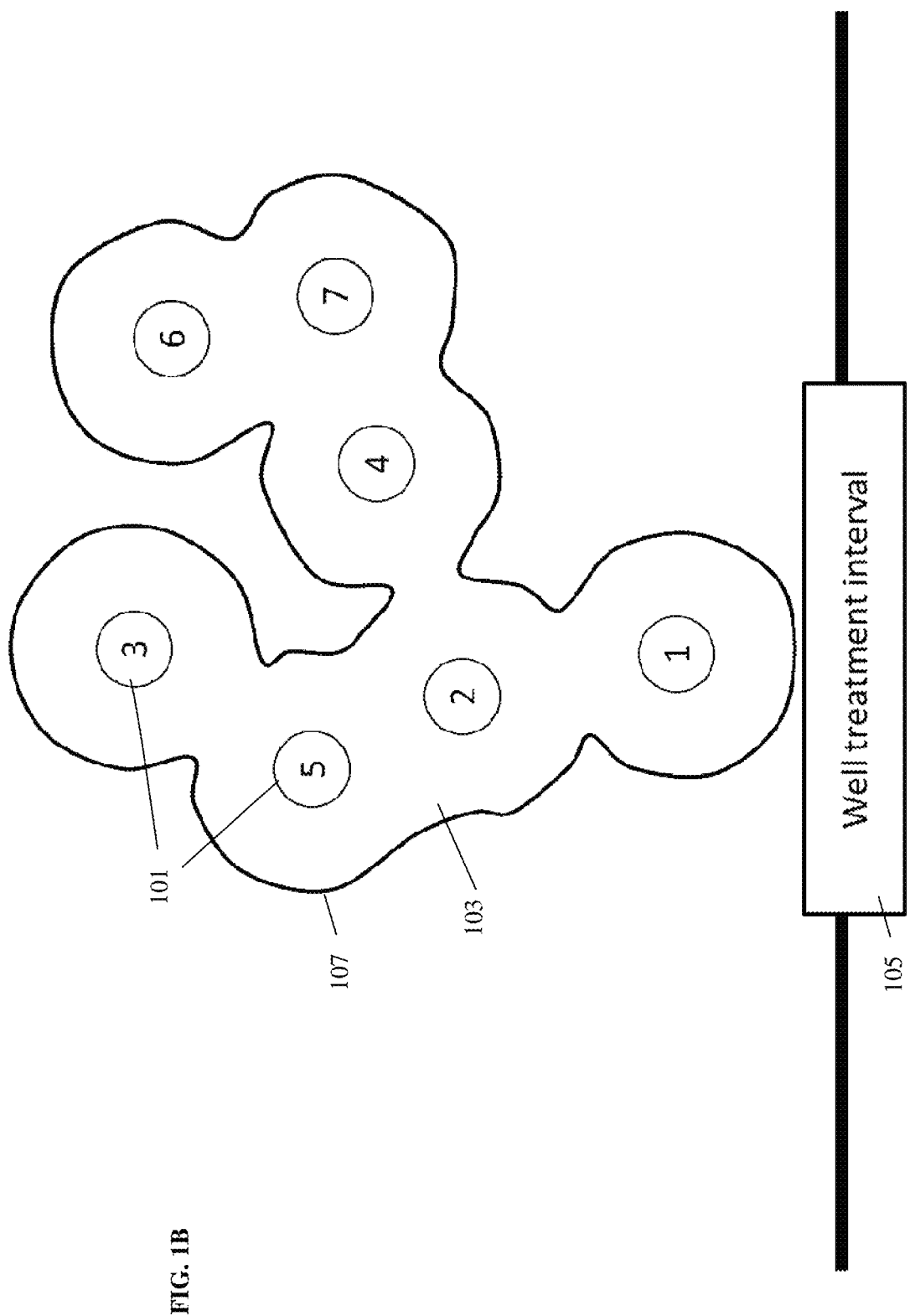

Reference is made to FIGS. 1A and 1B, illustrating a prior art method for determining a fault network or SRV based on a set of microseismic events 101 e.g. P1-P7. Microseismic events 101 may result from water being pumped from a well treatment interval 105 through the surrounding rock to create a fault or fracture network from which oil may be later pumped or extracted.

Conventional methods model the surrounding rock as a homogeneous material through which liquid flows with an equal probability in all directions. This isotropic or omni-directionally motion is modeled for each microseismic event 101 in FIG. 1A by a concentric circle surrounding the event expanding in time representing the propagation of liquid to and from each microseismic event. In homogeneous models, because liquid has an equal probability of flowing in all directions, these circles represent an uncertainty in the fracture network and the propagation path of the liquid therethrough.

In FIG. 1B, an envelope or boundary 107 is created that surrounds the circles and thus encompasses the possible or uncertain paths. Envelope 107 defines the boundary of a SRV 103 generated based on the group of microseismic events 101. As explained above, since microseismic events 101 are interconnected by a fracture network, the intervening rock is heterogeneous and liquid will typically flow along those fractures, not homogeneously as shown in FIG. 1B.

Instead, to model the heterogeneous motion of liquid through the cracks of a fracture network, embodiments of the invention may use a discrete fracture network approach. Neighboring microseismic events may be connected by an explicit fracture network. The fracture network between two subsequent microseismic events may be constructed using local rock material properties, a poisson-based process (e.g., a process that considers the number of microseismic events that have occurred and the time between consecutive events), and percolation-type theory (e.g., examining the flow of a fluid through a group of connected clusters or microseismic events).

Embodiments of the invention provide methods for building and visualizing time-dependent fracture networks (e.g., pipe networks or fracture skeletons) based on micro-seismic events and perforated intervals of wells. Once a discrete fracture network is constructed using these methods, the information may be used to calculate fracture intensity, modify secondary permeability fields inside the flow simulation grids for input to a reservoir simulator, for example, to estimate future production volumes of hydrocarbons. Based on visualizing these fracture networks, new fracture network attributes, such as, a distance to perforated intervals of wells, may be determined. The fracture networks and their attributes may be transferred to a visualization of gridded volumes. An evolution through time of a fracture network propagating from a well interval through a reservoir volume may also be visualized.

The construction of time-dependent fracture networks may be based on the location and time of micro-seismic events and perforated intervals of wells or other sources representing or affecting a fracture skeleton.

A set of M micro-seismic events P(x, y, z, t) (e.g., measured or recorded by geophones) may be defined where (x,y,z) is the spatial location and (t) is the time at which the event occurs or is recorded. Microseismic events may have additional attributes (properties) denoted by a_i. The steps for building the fracture network of connected polylines may be for example as follows (other steps, combinations of steps, or ordering of steps may be possible):

1. Order the microseismic event candidates P by increasing time t in the set M.

2. Define source (seed) points of the network N. When the set M includes well perforations information, the treatment intervals (densified or not), or perforation clusters may be used to define the initial source points. These source points have an associated time t corresponding to the time at which the blast, treatment or perforation operation was started. If the set M does not include well treatment information, the microseismic events occurring first in time may be used to define the initial source points. An attribute defining the distance to the source points may be set to 0 for each of the source points.
3. Define a connection criterion d(P,N) between microseismic candidate event P and network N.
   i. An "event-to-event" connection criterion may be the shortest distance between the microseismic event candidate and each of a plurality of other events in the fracture network at time t. With the "event-to-event" criterion, the fracture paths or pipes of the network may connect events to events (e.g. as shown in FIGS. 2A to 2I). Thus, the flow of liquid is predicted to flow through the fault network from event to event.
   ii. An "event-to-network" connection criterion may be the shortest distance between the microseismic event candidate and the fracture network at time t. With the "event-to-network" criterion, events may connect to the fracture paths themselves between events (e.g. as shown in FIGS. 3A to 3H). Thus, the flow of liquid is not limited to flow in a straight line from event to event, but can split from one path to another path between events.
   iii. An "anistropism" connection criterion may require the connection path between events to be anisotropic (oriented in a specific direction) at one or more of the events. With the "anistropism" criterion, events may connect to fracture paths oriented in a specific direction (e.g. as shown in FIGS. 4A to 4H).
   iv. Other connection criterions may include a combination of the event candidate and fracture network attributes (e.g. fracture segment length, stress, magnitude, etc.) or larger global scale attributes, like natural fractures sets orientations in addition to or instead of anistropism
   v. Non connection criterions (filters) may be included as well, based on a combination of the event candidate and fracture networks attributes (maximum distance, minimum elapsed time, geological facies or stratigraphic units, etc.)
4. Using ith microseismic event P(x,y,z,ti) in the set M, determine or compute criterion d(P,N) to find connection point c based on network N.
5. Create a pipe or fracture path between c and p.
6. Compute the distance to the source or seed points to be the distance from the microseismic event candidate P to c+distance from c to the source points.
7. Compute the branch index of microseismic events and/or fractures. The branch index may be initialized e.g. to zero, at the source point. Each branch or fork in the fracture path, in which one path splits into two or more, causes the branch index to increment e.g. by one or more.
8. Compute attributes ti and a_i, e.g. by interpolation if needed, at connection point c and on fracture. Attribute ti (time) may be used, for example, to display fractures which are recorded within a sub-interval of time of the sampling time interval. Other attributes a_i may be used for further filtering or display. Additional attributes, such as, distance to source point may be used to compute a pseudo-volume of a branch (e.g. given a fracture height and aperture).
9. Remove event P from the candidate set M and add the event P to the network set N as defining the fracture network at time ti of candidate point P.
10. Increment i to i+1 and repeat step 4-10 until there are no more candidate events P in the set M.

The above process may be performed in real time when each new microseismic event Pi is recorded or processed since the above process inputs only the location (x,y,z) and time (ti) of each event.

Reference is made to FIGS. 2A to 2I, which are schematic illustrations of a time-dependent fracture network N of microseismic events 202 (e.g. P1-P7) connected by "event-to-event" fractures, according to embodiments of the invention.

Since a blast is typically initiated at a well, network N may be initiated as N(0) including an initial well event P0 205 that occurred at initial time t0. Network N may grow by adding successive events P1-P7 202 in chronological order of when the events were recorded at t1-t7, respectively. Each successive event Pi recorded at time ti may be added to a previous existing network N(i−1) to generate an expanded network N(i). A path or fracture may also be added connecting each new event Pi to the network N. FIGS. 2A to 2I show "event-to-event" fractures, e.g., defined by a connection criterion (3i), in which each new event Pi is connected to another network event Pj recorded at an earlier time tj<ti. For example, each ith microseismic event Pi may be connected to one of the subgroup of previously recorded events Pj (including the initial well event P0 205). Once ith event Pi and fracture path are added, the network N(i−1) is expanded to N(i).

In FIG. 2A, Network N(0) may initially include well treatment interval P0 205 recorded at time t0. Events P1 through P7 may be ordered in a set of events M according to the time that they were recorded or measured at t1-t7, respectively. For example, P1 202a recorded at time t1 may be ordered before P2 202b recorded at t2, P2 202b recorded at time t2 may be ordered before P3 202c recorded at t3, etc. As shown in FIG. 2A, each microseismic event Pi may occur at a particular location (x,y,z) away from a well treatment interval P0 205.

Figure 2B:
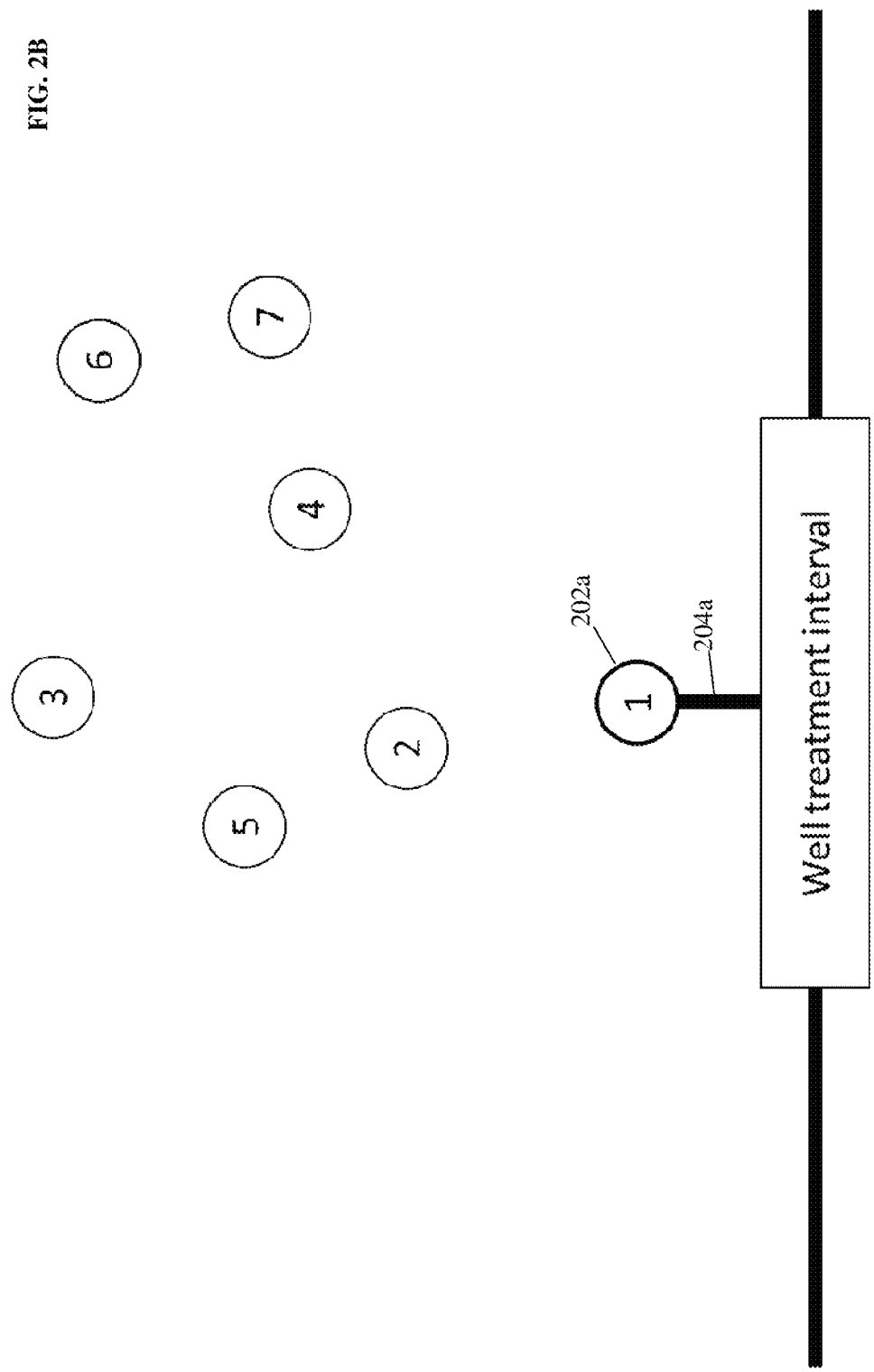

In FIG. 2B, a first microseismic event P1 202a recorded at time t1 may be added to the existing network N(0). Since well treatment interval P0 205 is the only event in the existing network N(0) of events which occurred previous to event P1, a fracture or pipe 204a may be created, e.g., as a straight line or flat (vertical or tilted) surface along the shortest path, between P1 202a and the well treatment interval P0 205. P1 may be added to the network set N(1) (including P1 202a, fracture 204a and well treatment interval P0 205) and removed from set of candidate events M.

In FIG. 2C, subsequently recorded event P2 202b may be added to the network N. Using an event-to-event connection criterion, event P2 202b recorded at time t2 may be connected to earlier recorded events in the existing network N(1), which includes event P1 202a recorded at time t1 or well treatment interval P0 205 occurring or recorded at time t0. Based on the connection criterion, the earlier recorded event is selected that is closest to the new event P2 202b. In the example shown in FIG. 2C, event P1 202a is closer to P2 202b than is well treatment interval P0 205. A fracture 204b defining the "event-to-event" connection may be added to the network N to connect new event P2 202b to the closest existing network event recorded at a previous time, e.g. P1

202a in the example shown in FIG. 2C. Once event P2 is added to network set N (and removed from candidate set M), network N(1) is expanded to network N(2), which includes P1 202a, P2 202b, and their respective connecting fractures 204a and 204b.

In FIG. 2D, event P3 202c recorded at the next subsequent time t3 may be added to the network N to generate N(3) in a manner similar to the process described in reference to FIG. 2C. Event P3 202c may be connected via fracture 204c to the closest event P2 in the previous existing network N(2). If two events are recorded at approximately the same time (ti=tj), they may be ordered arbitrarily, ordered based on spatial closeness to the well or to a closest or most-recently added point, or both points may both be evaluated in parallel, independently, so that they are connected only to previously added events and not to each other.

In FIG. 2E, event P4 202d recorded at the next subsequent time t4 may be added to the network N to generate network N(4). The "event-to-event" connection criterion requires that an ith microseismic event Pi be connected to the closest one of the previously recorded events P0, . . . , P(i−1) in the existing network N(i−1). In the example shown in reference to FIG. 2E, the closest previously recorded event to P4 202d is P2 202b (since P3 202c is farther away from P4 202d). As shown, the set of events Pi chronologically ordered in time may be connected in a non-chronological (out of time) order, such that, each successive event may be connected, not to an immediately preceding and immediately succeeding time event, but may skip events in time to connect to an event recorded further in the past and/or further in the future.

Figure 2F:
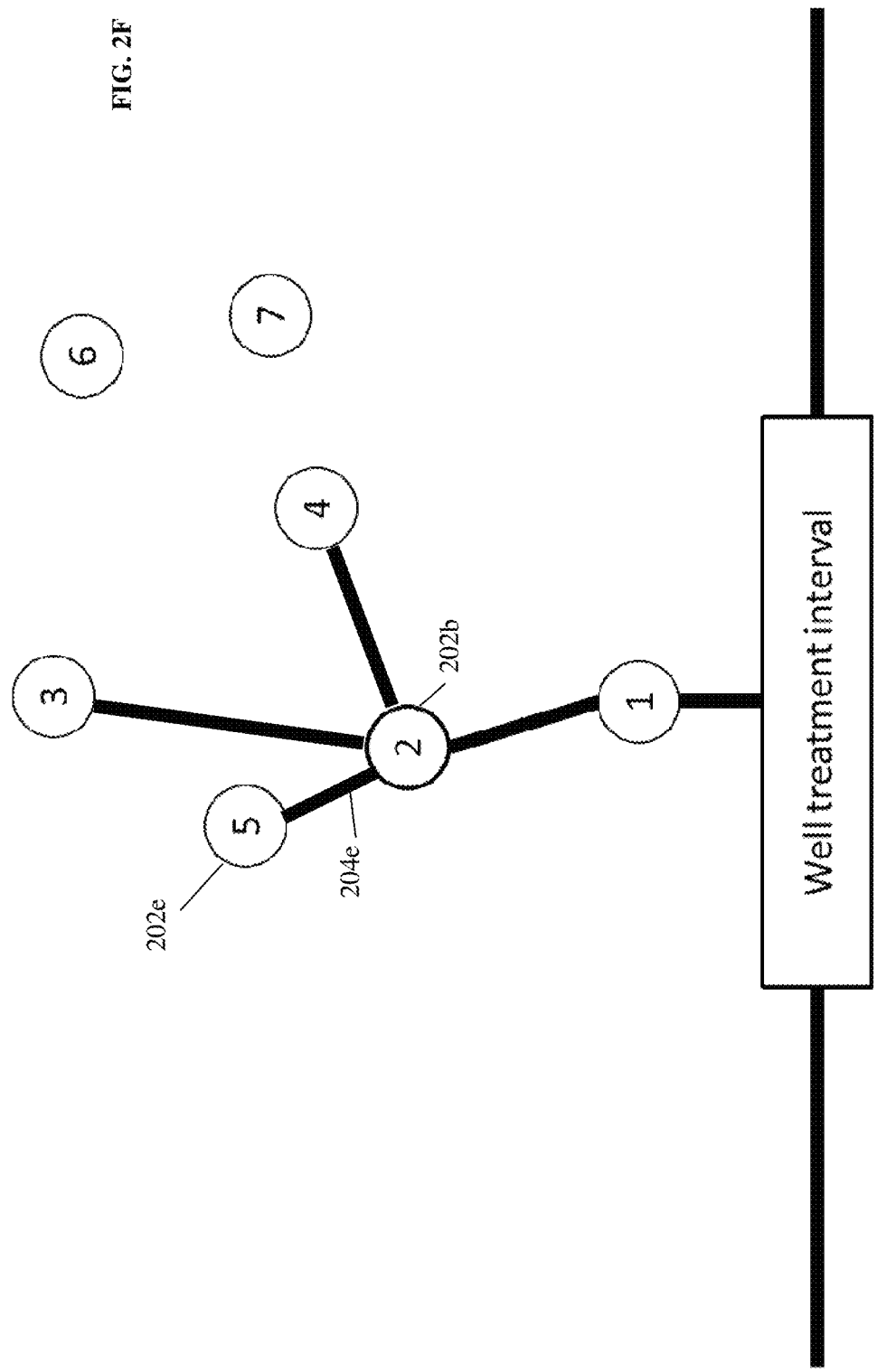

In FIG. 2F, event P5 202e recorded at the next subsequent time t5 may be added to the network N to generate network N(5). The previously recorded event in existing network N(4) closest to new event P5 202e (based on the connection criterion) is event P2 202b. Thus, the network may be expanded to N(5) by adding event P5 202e connected to P2 202b via fracture 204e.

Figure 2G:
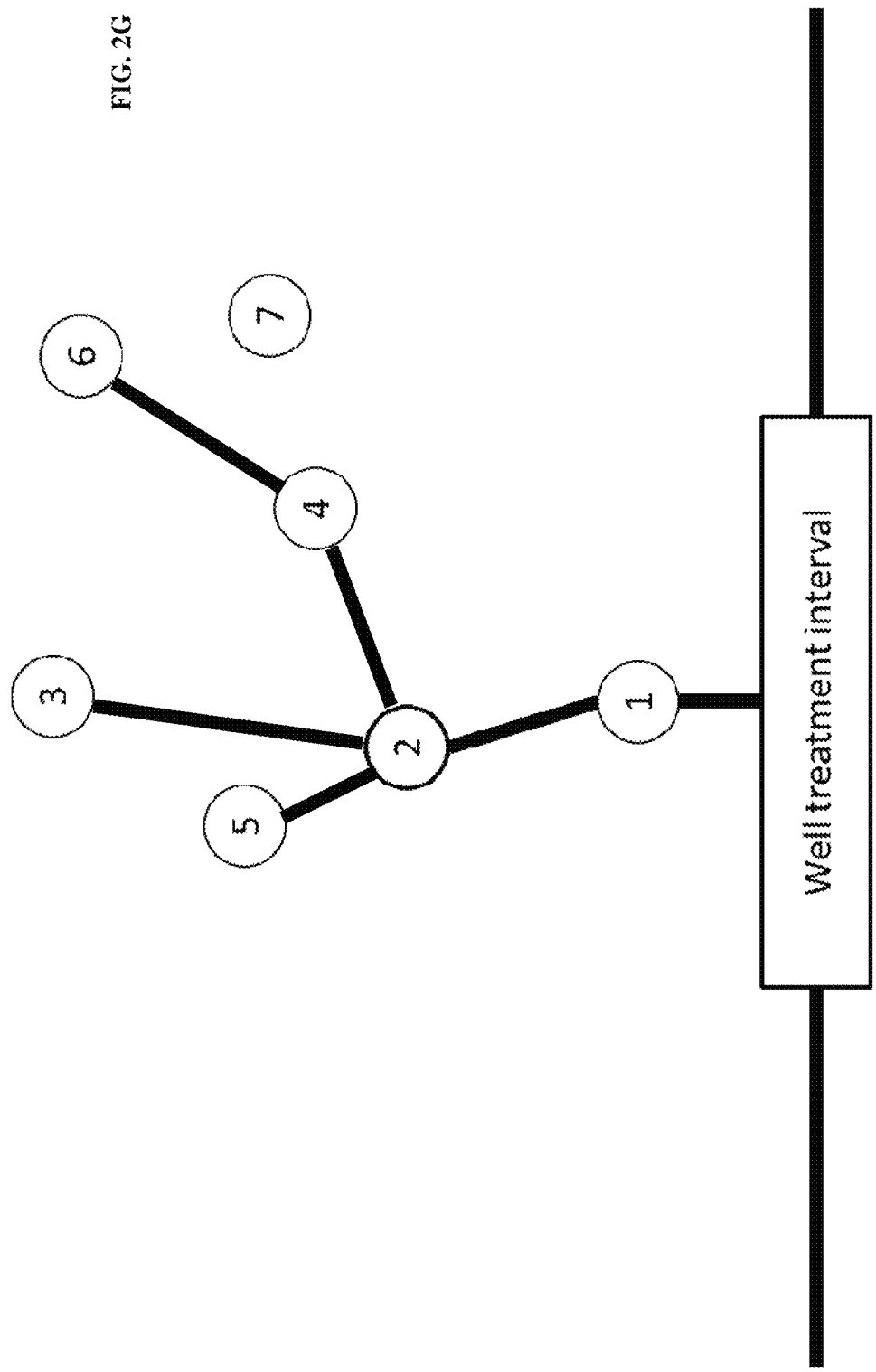
Figure 2H:
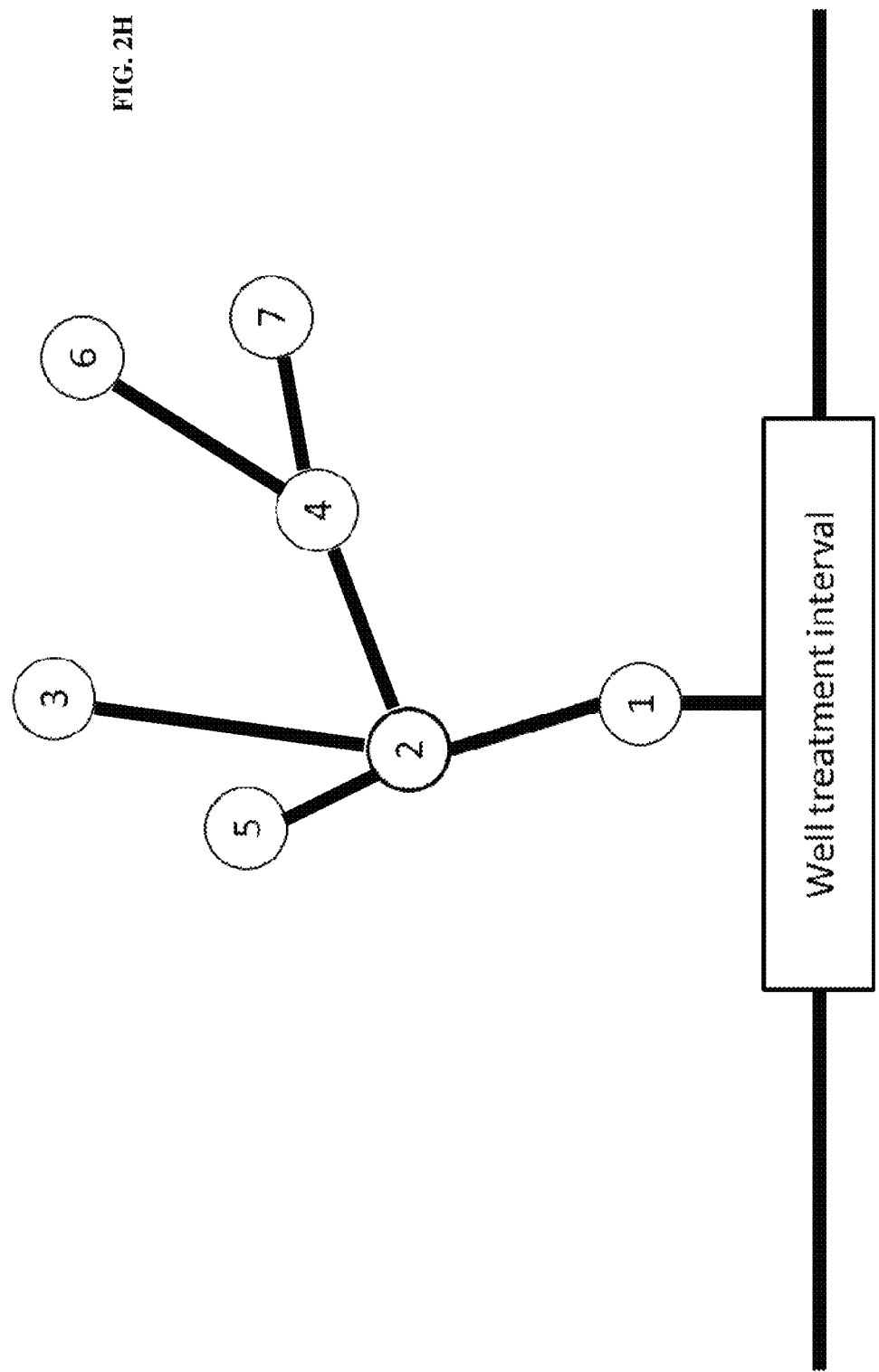

In FIGS. 2G and 2H, events P6 and P7 may be sequentially added to the network N, according to the "event-to-event" connection criterion, in the manner described above.

Figure 2I:
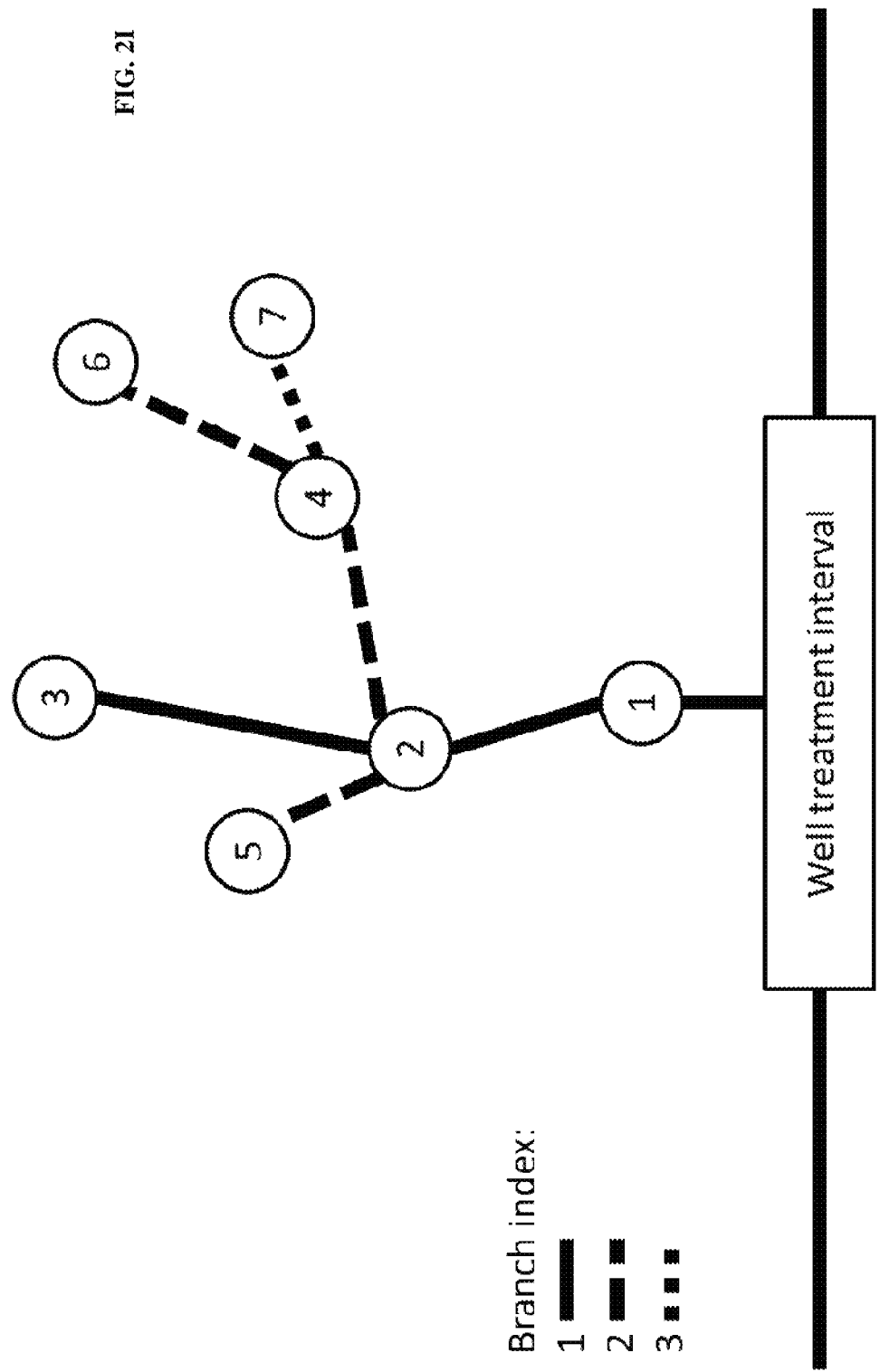

In FIG. 2I, a branch index of network N may be determined. The branch index of the initial branch joining the first event P1 to well treatment interval P0 205 is initialized e.g. to zero. Any fractures or events along a single path have the same branch index (i). However, when a path splits at a fork into two or more branches, the branch index of each split path or branch is incremented by one (i+1) greater than the branch index (i) of the parent path or branch.

Reference is made to FIGS. 3A to 3H, which schematically illustrate a time-dependent fracture network N of microseismic events (e.g. P1-P7) connected by "event-to-network" fractures, according to embodiments of the invention. "Event-to-network" connections, e.g., defined by a connection criterion (3ii), connects each new ith event Pi to any closest point of the entire previous existing network N(i−1), including both events as well as connection pipes or fractures.

Figure 3A:
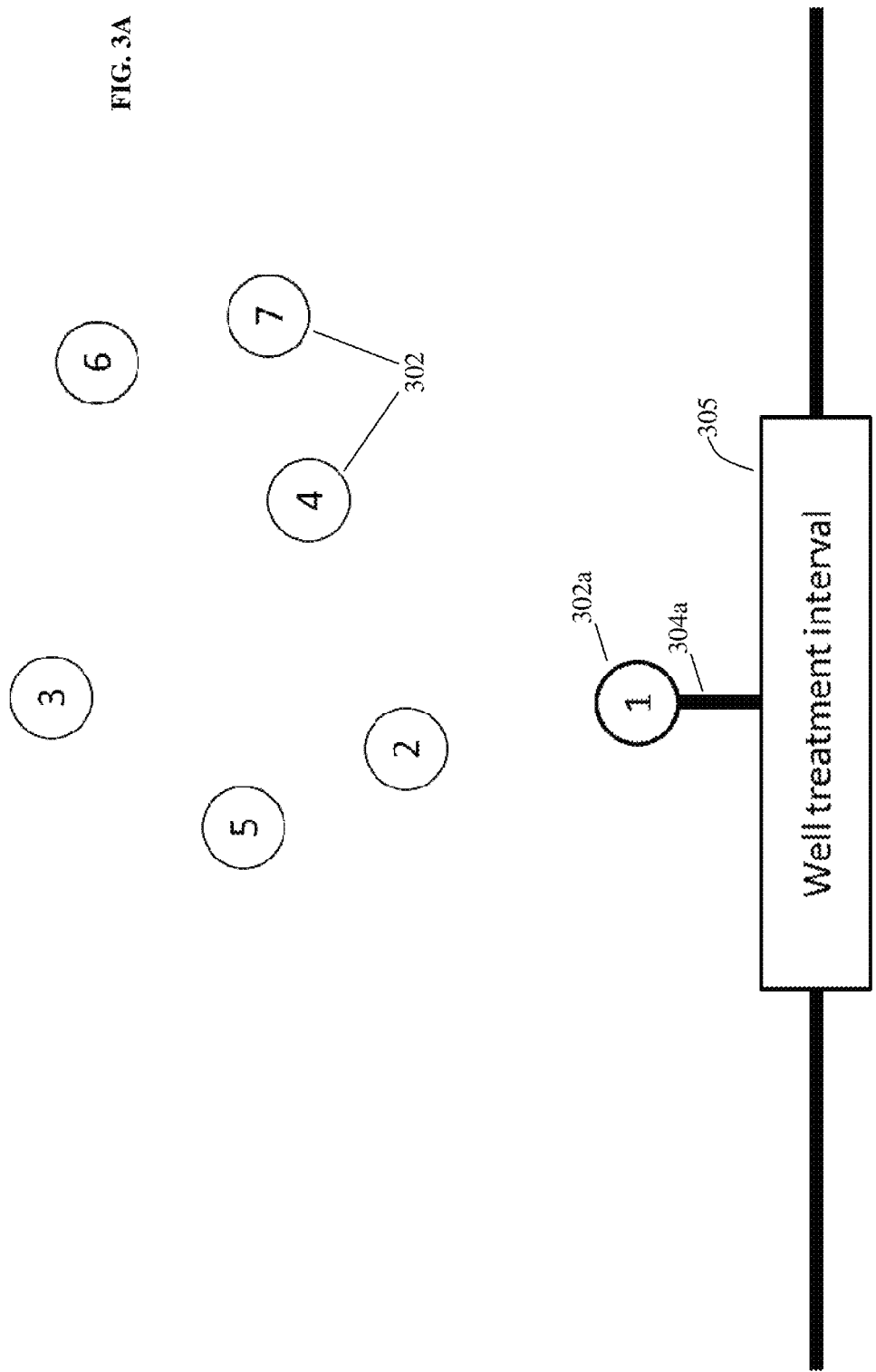

In FIG. 3A, the initial network N(0) may initially be set to include only well treatment interval P0 305 or another source point. The first microseismic candidate P1 302a may be added to the network N, connected by fracture 304a, to the only (and closest) event in the existing network N(0), the well treatment interval P0 305.

Figure 3B:
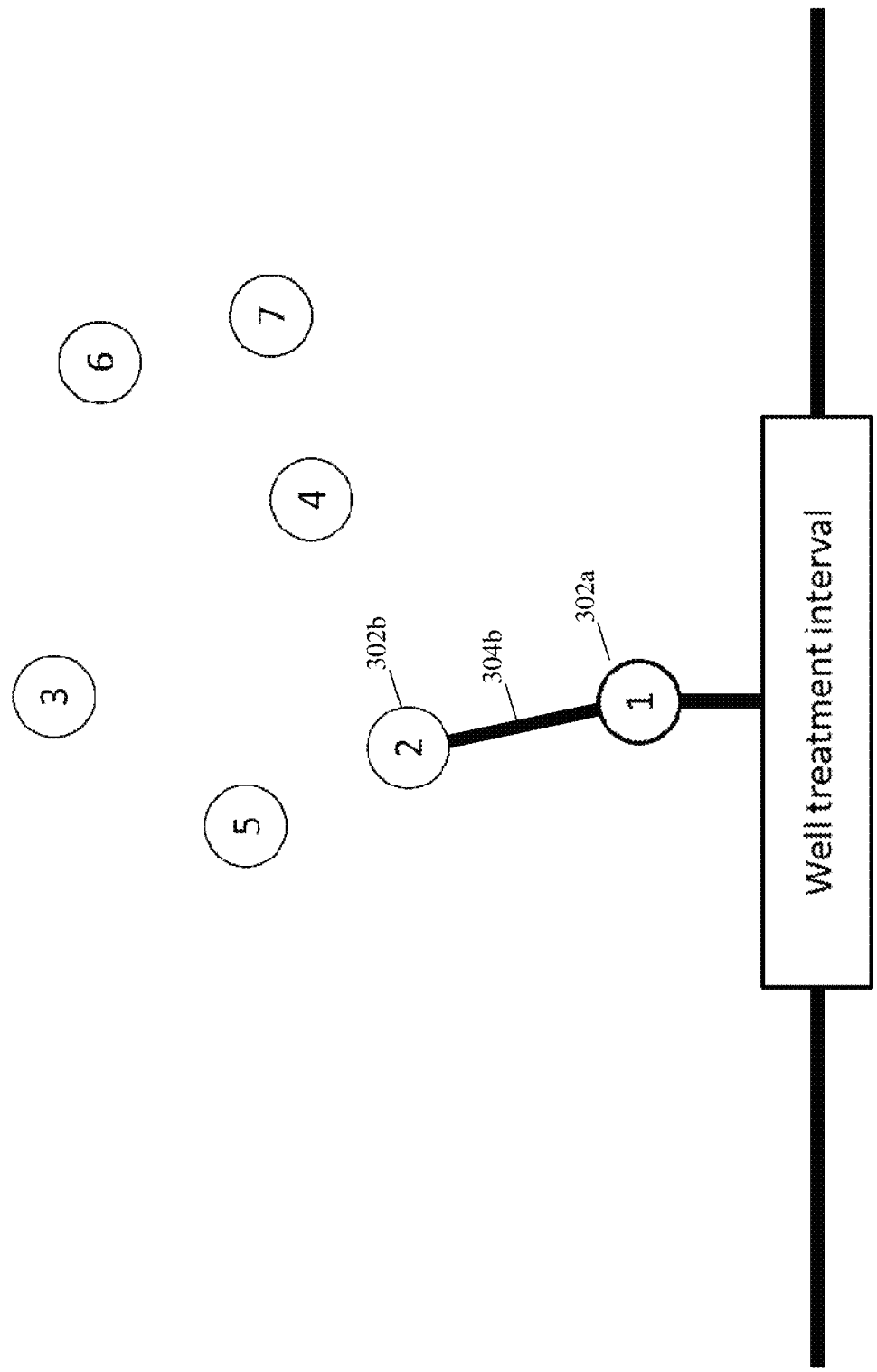

FIGS. 3B and 3C illustrate the generation of networks N(1) and N(2), respectively. In FIG. 3B, event P2 302b is added to the network by connection 304b to event P1 and in FIG. 3C, event P3 302c is added to the network by connection 304c to event P2. In the example shown in these figures, since events P2 and P3 are both closest to other events (not fracture pipes), the "event-to-network" connections (304b and 304c of FIGS. 3B and 3C) are equivalent to the "event-to-event" connections (204b and 204c of FIGS. 2C and 2D). However, "event-to-network" connections differ from "event-to-event" connections in other cases e.g. as shown in FIGS. 3D, 3E and 3G.

In FIG. 3D, network N(4) is generated by adding event P4 302d recorded at the next subsequent time t4. The closest connection between microseismic event P4 302d and the existing network N(3) is, in the example shown in FIG. 3D, a fracture 304d that is perpendicular to the existing fracture 304c and connected to P4 302d.

Figure 3E:
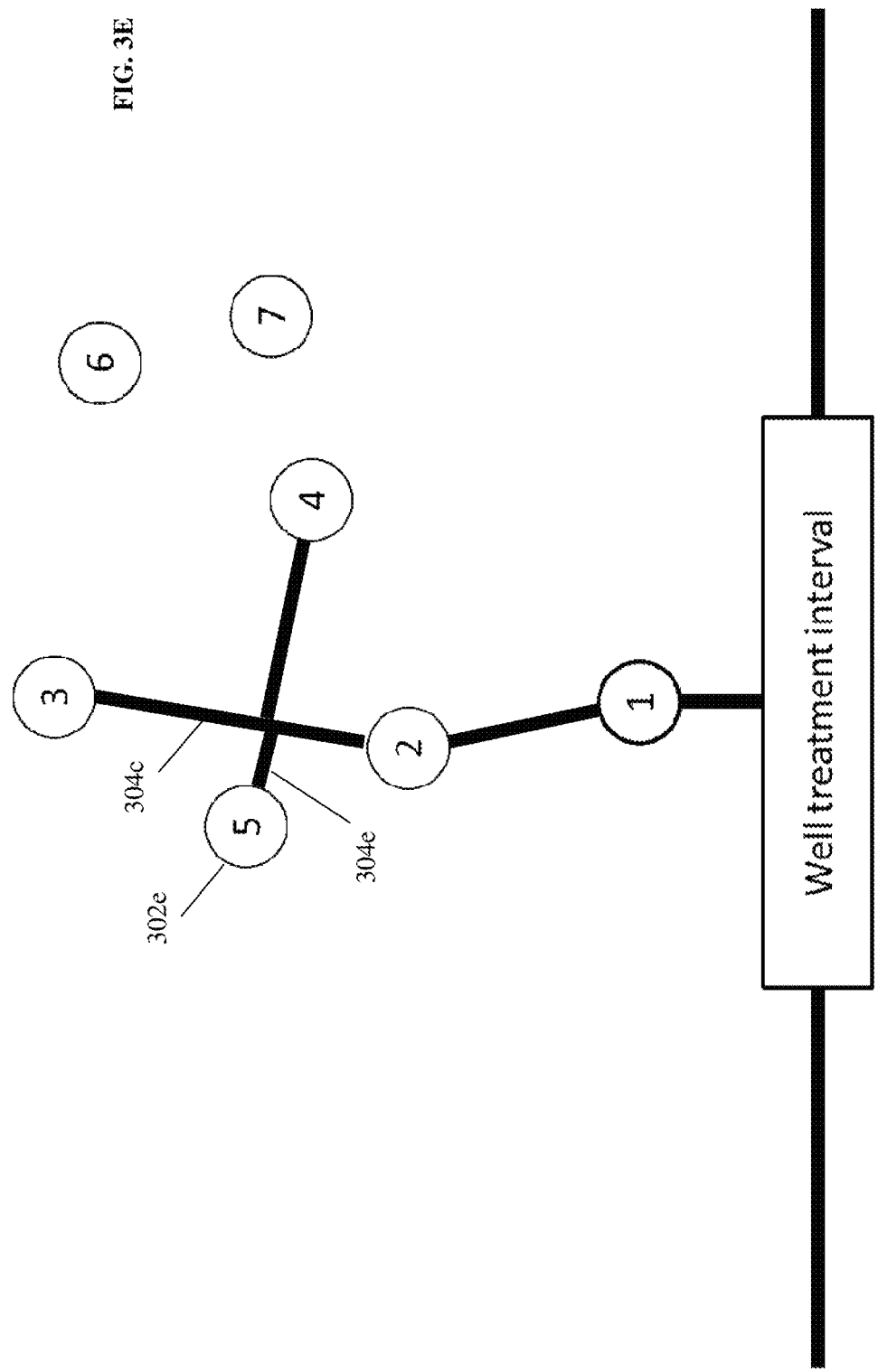

In FIG. 3E, event P5 302e recorded at the next subsequent time t5 may be added to the network to generate network N(5). The closest connection between event P5 302e and the existing network N(4) is, in the example shown in FIG. 3E, a fracture 304e that is perpendicular to the existing fracture 304c and connected to event P5 302e.

Figure 3G:
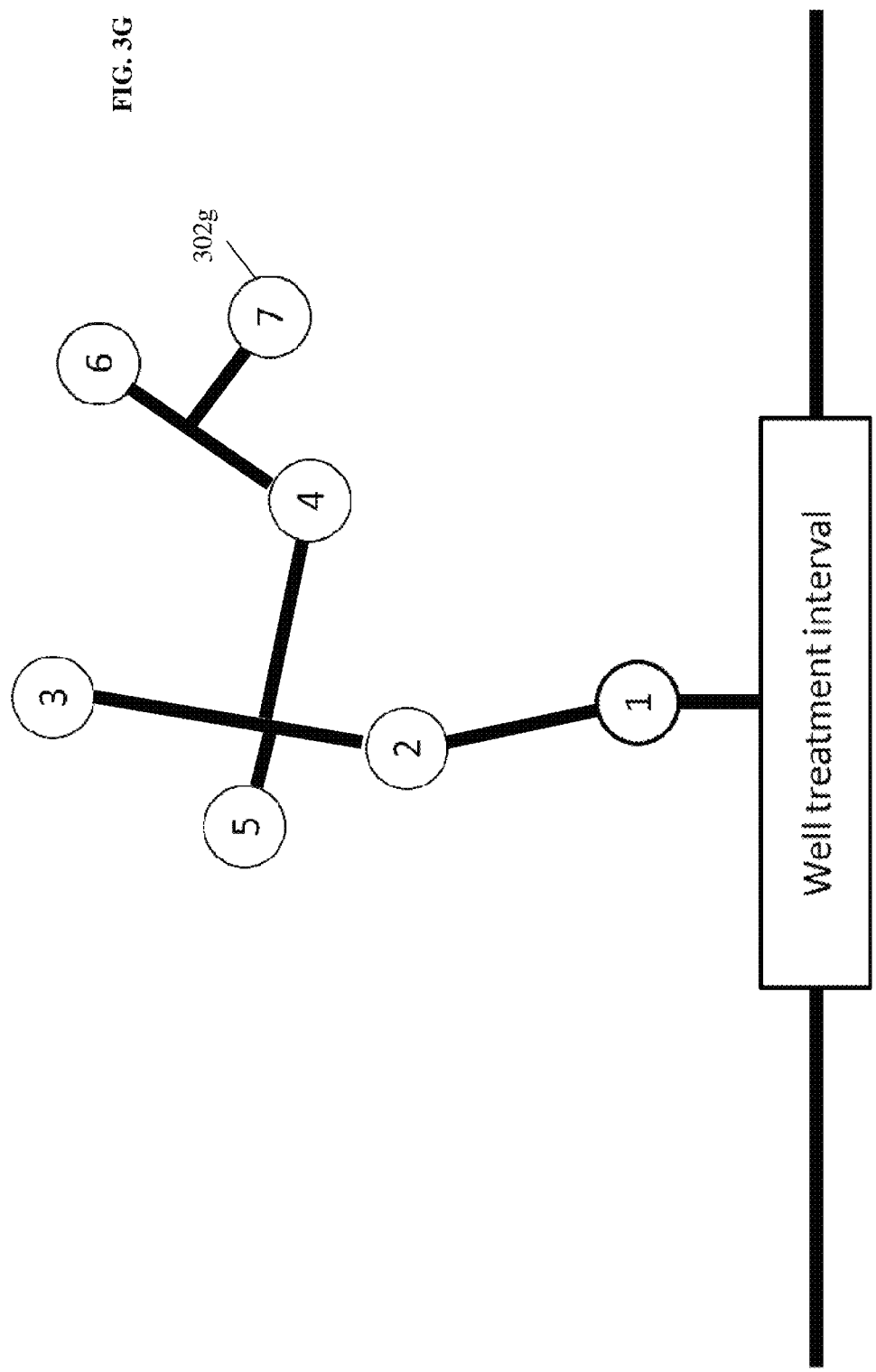

FIGS. 3F and 3G respectively illustrate the addition of event P6 302f to generate N(6) and event P7 302g to generate N(7).

In FIG. 3H, a branch index of network N may be determined.

Reference is made to FIGS. 4A to 4H, which schematically illustrate a time-dependent fracture network of microseismic events connected by (e.g. "anisotropic") fractures in accordance with a connection attribute (e.g. an "anisotropism" attribute), according to embodiments of the invention. The example of anisotropic fractures shown in FIGS. 4A to 4H are of the "event-to-network" connection type, although this discussion of connection attributes also relates to the "event-to-event" connection type.

Each microseismic event P may be associated with a connection attribute (a) defining the connection or fracture between events and the network. In one example, the attribute is an anisotropism attribute that defines the orientation of anisotropic fracture connections. These attributes may affect the shape, orientation or other characteristics of fracture paths created in the fracture network. Other attributes may include magnitude of the microseismic event, e.g. measured according to the Richter scale, or physical rock properties.

Figure 4A:
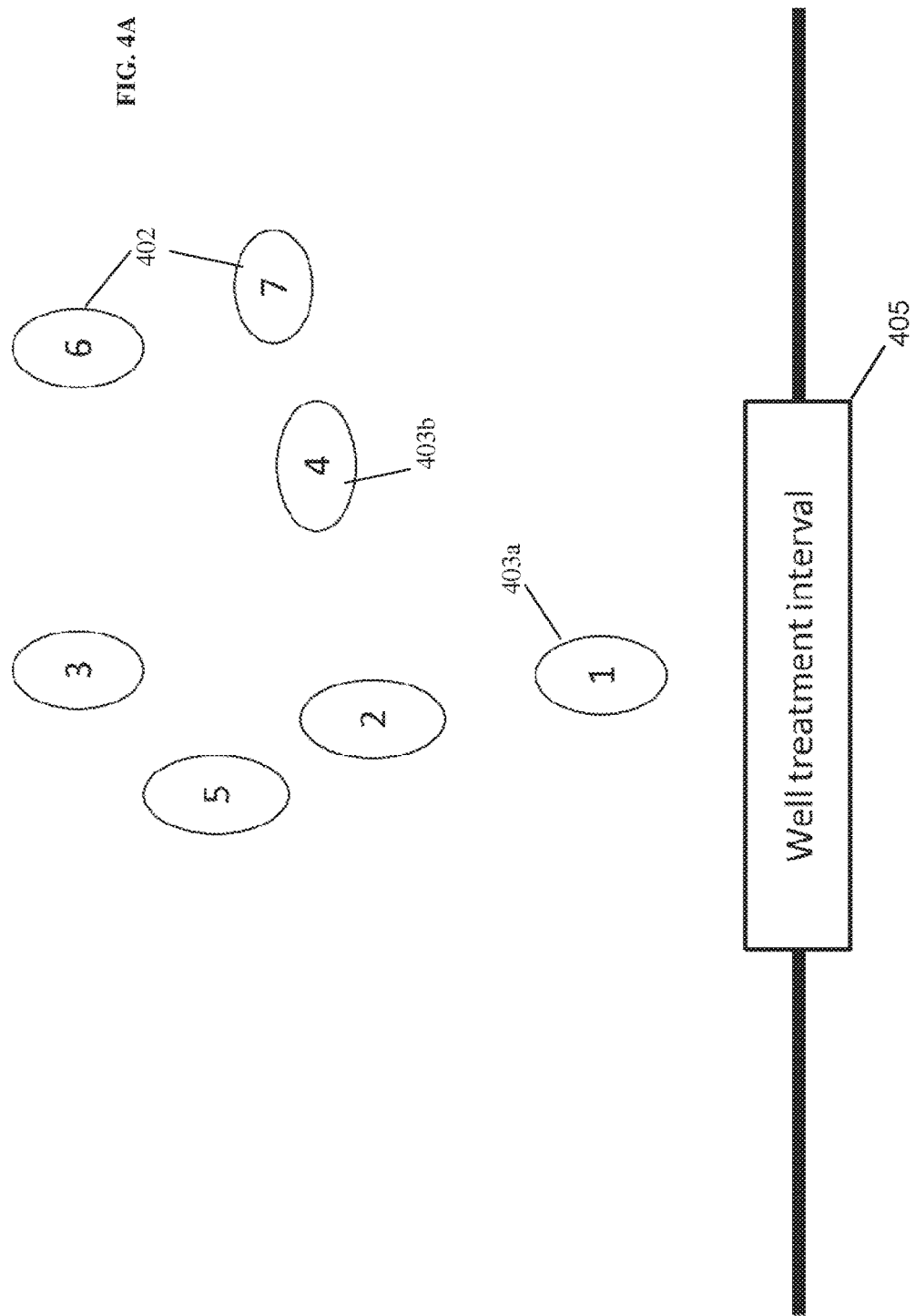

In FIG. 4A, network N(0) may be initialized to include well treatment interval P0 405. Microseismic events P1-P7 may be associated with anisotropic connection attributes defining the orientations of connections to the events, for example, as in a vertical direction 403a or horizontal direction 403b.

In FIG. 4B, microseismic event P1 402a recorded at time t1 may be added to generate network N(1). Event P1 402a may connect to the network by a vertical fracture 404a that follows the vertical anisotropy of the attribute associated with connecting event P1 402a.

Figure 4C:
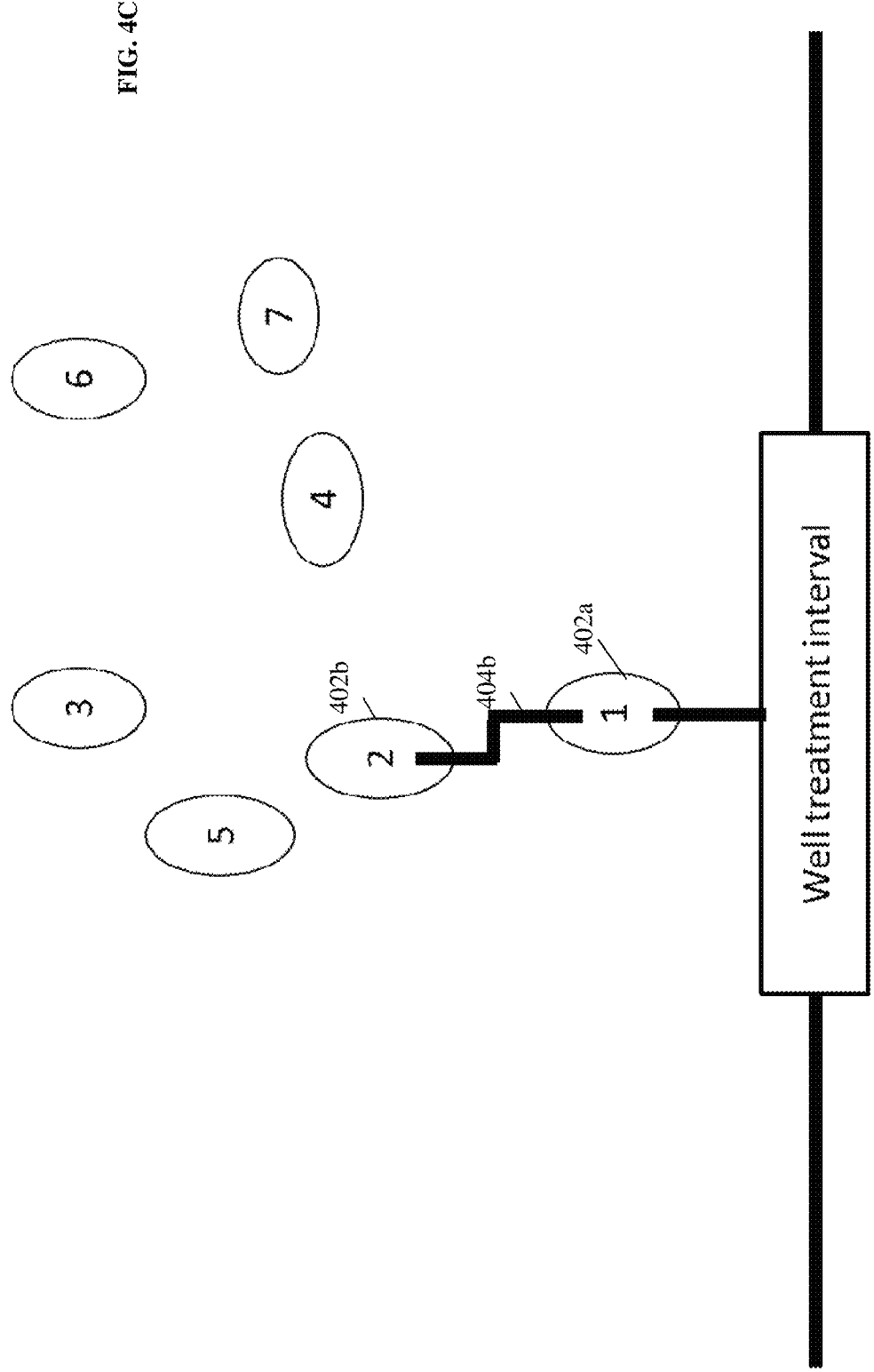

In FIG. 4C, microseismic event P2 402b recorded at time t2 may be added to generate network N(2). Event P2 402b may connect to the network by a fracture 404b that follows or aligns with the vertical anisotropy of events P1 402a and P2 402b. Since P1 402a and P2 402b may be slightly offset from each other horizontally (as shown in FIG. 4C), fracture 404a may connect horizontally at a point between P1 402a and P2 402b. In other examples, fracture 404a may connect diagonally between P1 402 and P2 402b, depending on a defined connection criterion or microseismic event attribute, or both.

Figure 4D:
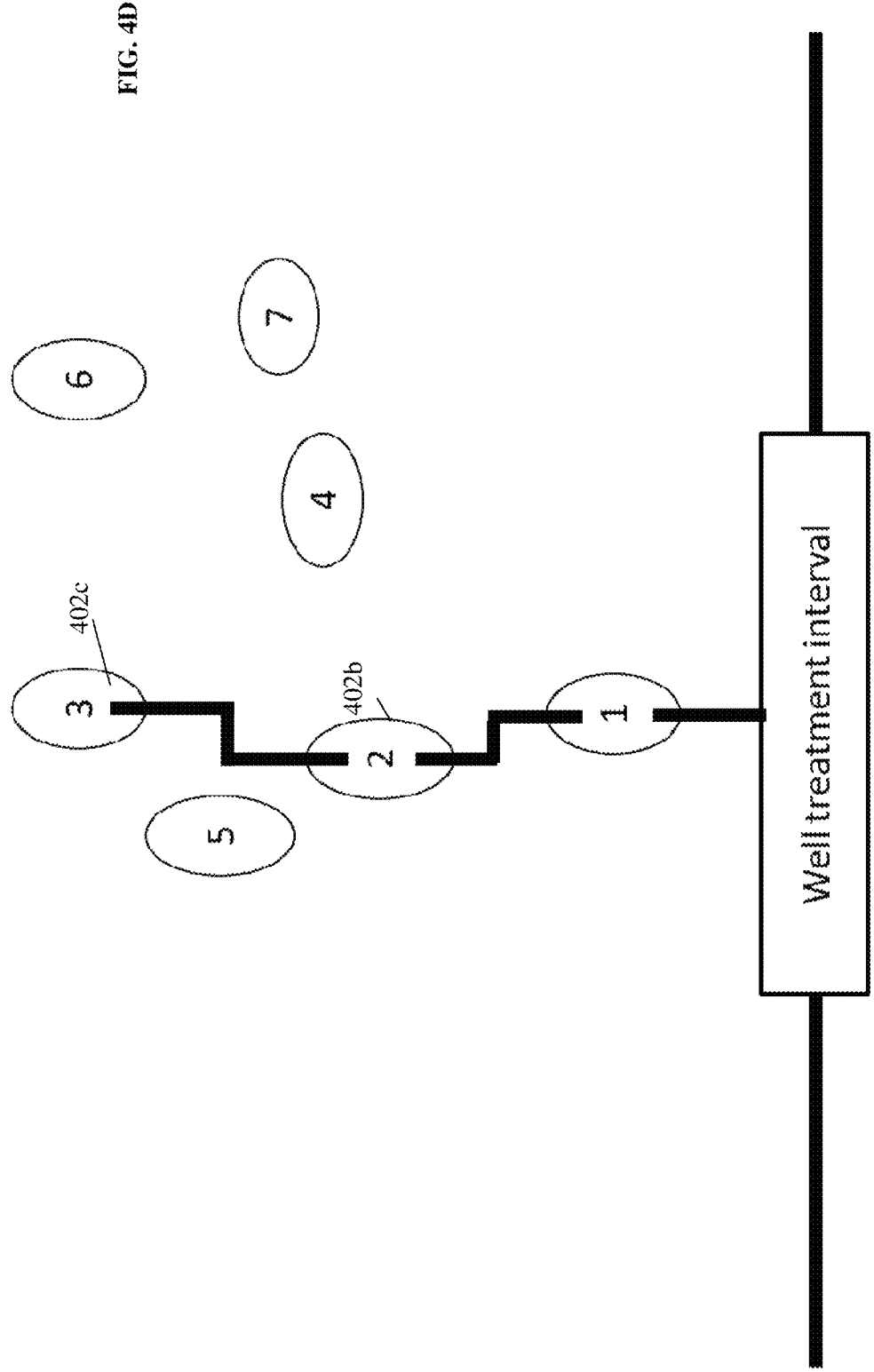

In FIG. 4D, microseismic event P3 402c recorded at time t3 may be added to generate network N(3), e.g. in a manner similar to the process described in reference to FIG. 4C.

Figure 4E:
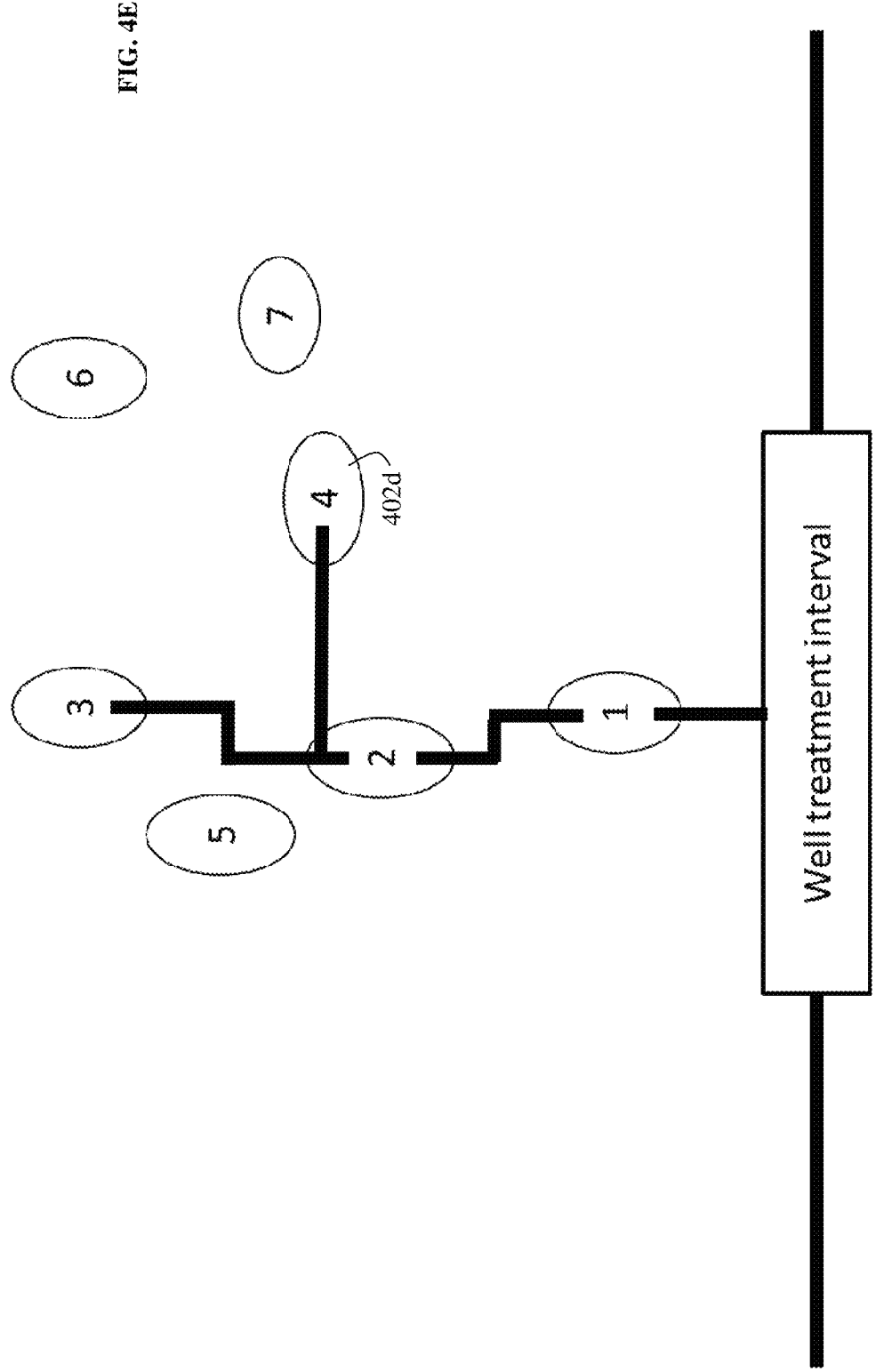

In FIG. 4E, microseismic event P4 402d may have an attribute describing a horizontal anisotropy. Based on this attribute and the connection criterion that requires a shortest connection between a microseismic event candidate and a fracture network, fracture may horizontally connect event P4 402d to the existing network.

Figure 4F:
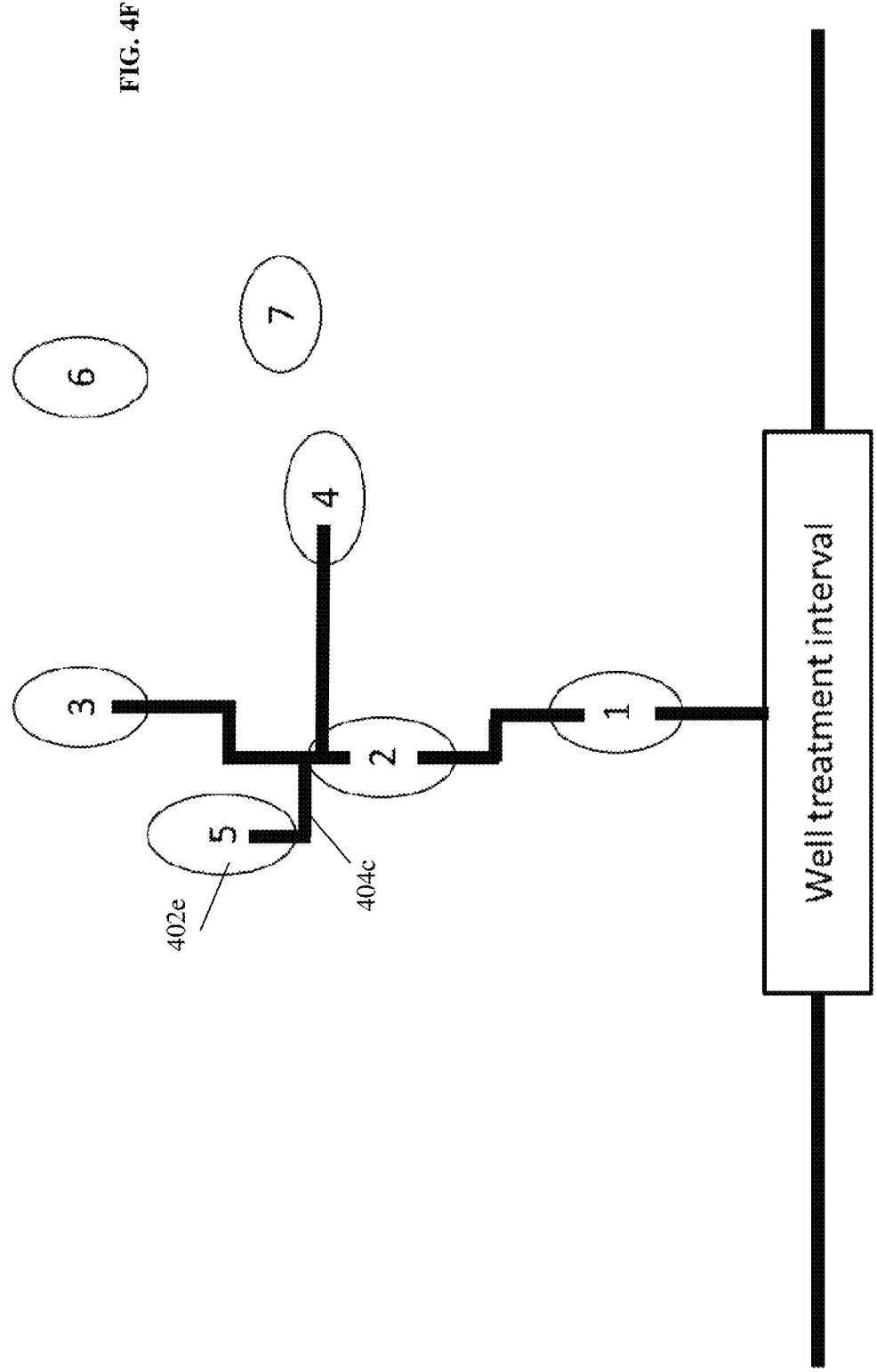

In FIG. 4F, microseismic event P5 402e may have an attribute describing a vertical anisotropy. As shown in the figure, the shortest connection path from event P5 402e to the existing network N(4) may be vertical in the vicinity of P5 402e with a horizontal fracture 404c connecting it to the network.

Figure 4G:
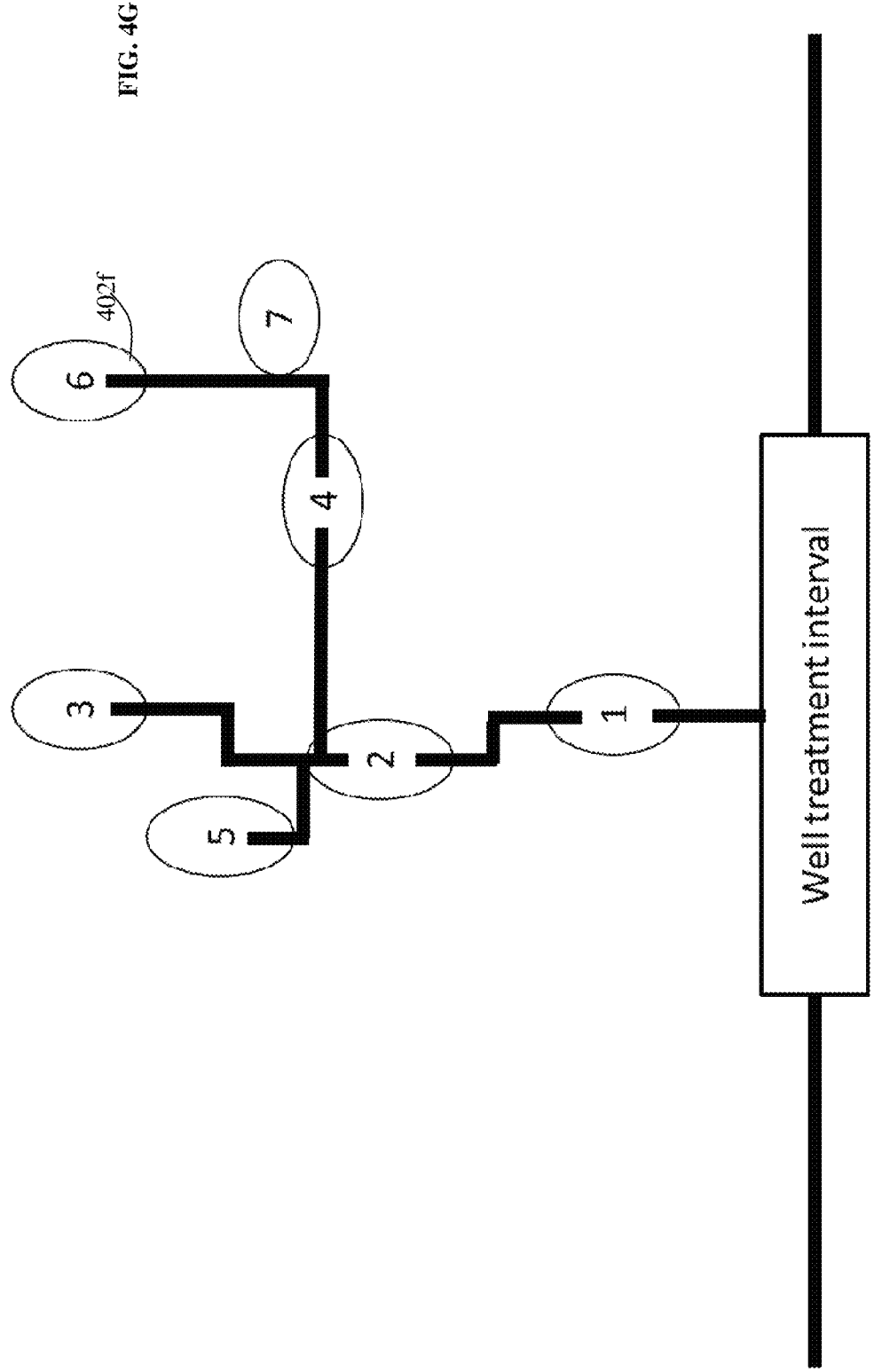
Figure 4H:
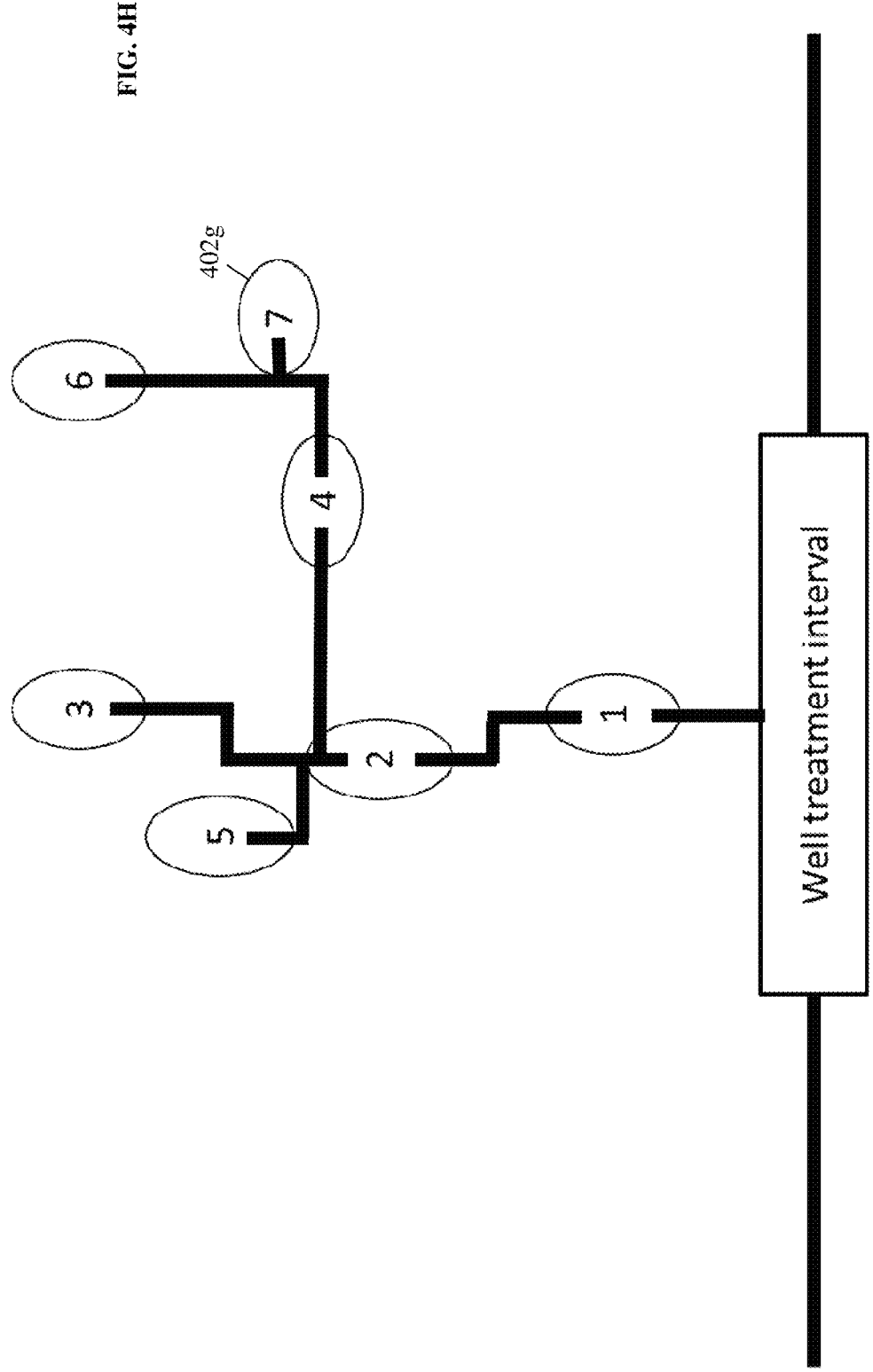

FIGS. 4G and 4H respectively illustrate the addition of event P6 402f to generate network N(6) and event P7 402g to generate network N(7).

Reference is made to FIG. 5, which is a compilation of time-dependent fracture networks modeled using "event-to-event" fractures (as described in reference to FIGS. 2A-2I), "event-to-network" fractures (as described in reference to FIGS. 3A-3H), and "anisotropic path" fractures (as described in reference to FIGS. 4A-4H), according to embodiments of the invention. These different fracture networks generated based on the three kinds of connection criterions or attributes may be combined and compared.

Figure 6A:
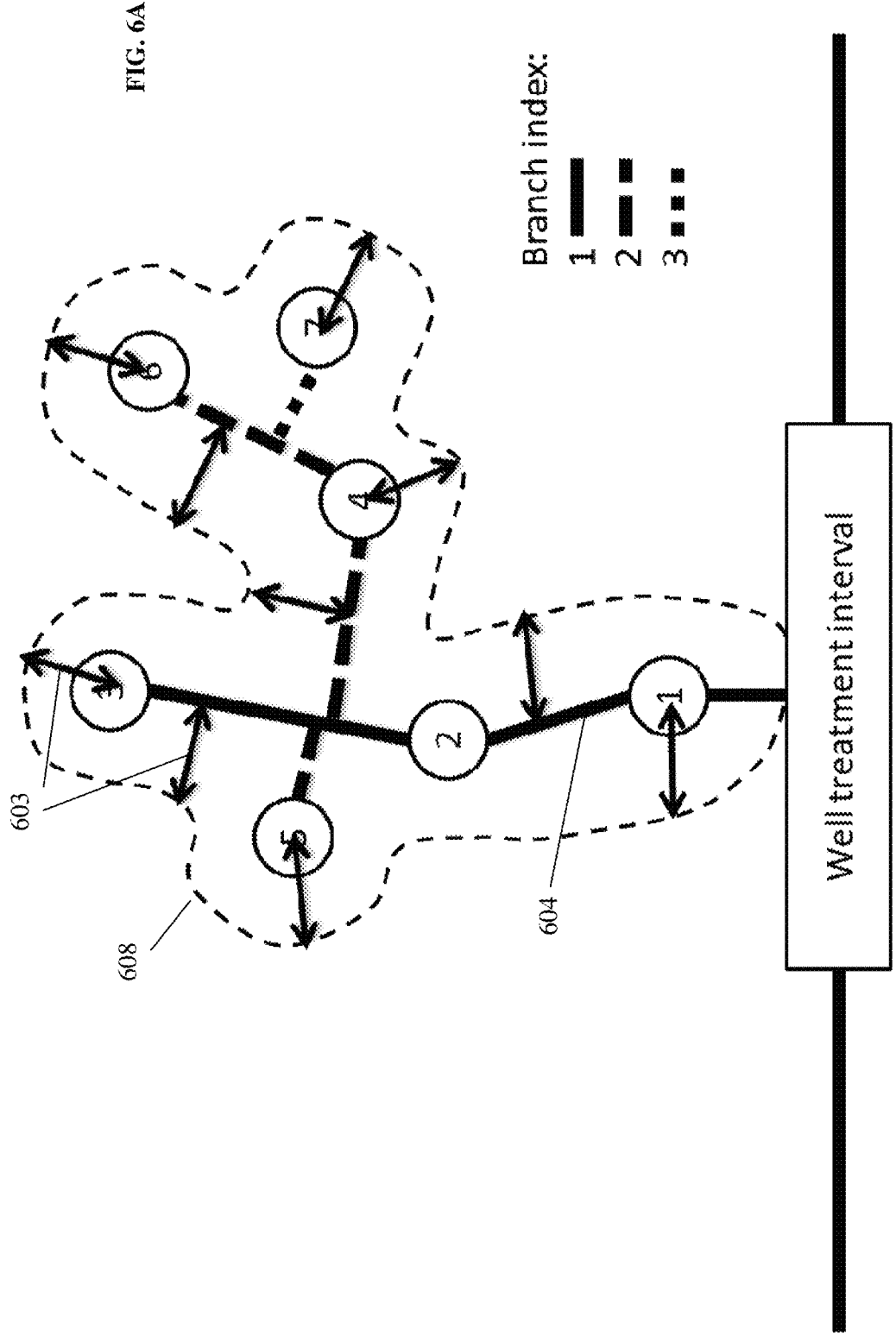
FIG. 6A is a schematic illustration of a Stimulated Rock Volume generated from the time-dependent fracture network, according to embodiments of the invention.

Reference is made to FIG. 6A, which is a schematic illustration of a Stimulated Rock Volume generated from a time-dependent fracture network, according to embodiments of the invention. A SRV may be created by generating points of equal distance 603 from a fracture network 604. The shape connecting the points may be the SRV 608 of fracture network 604. The time-dependent fracture network used in the example shown in FIG. 6A is the "event-to-network" model from FIG. 3H, although the "event-to-event" or "anisotropic" models from FIG. 2I or 4H, respectively, may also be used.

Figure 6B:
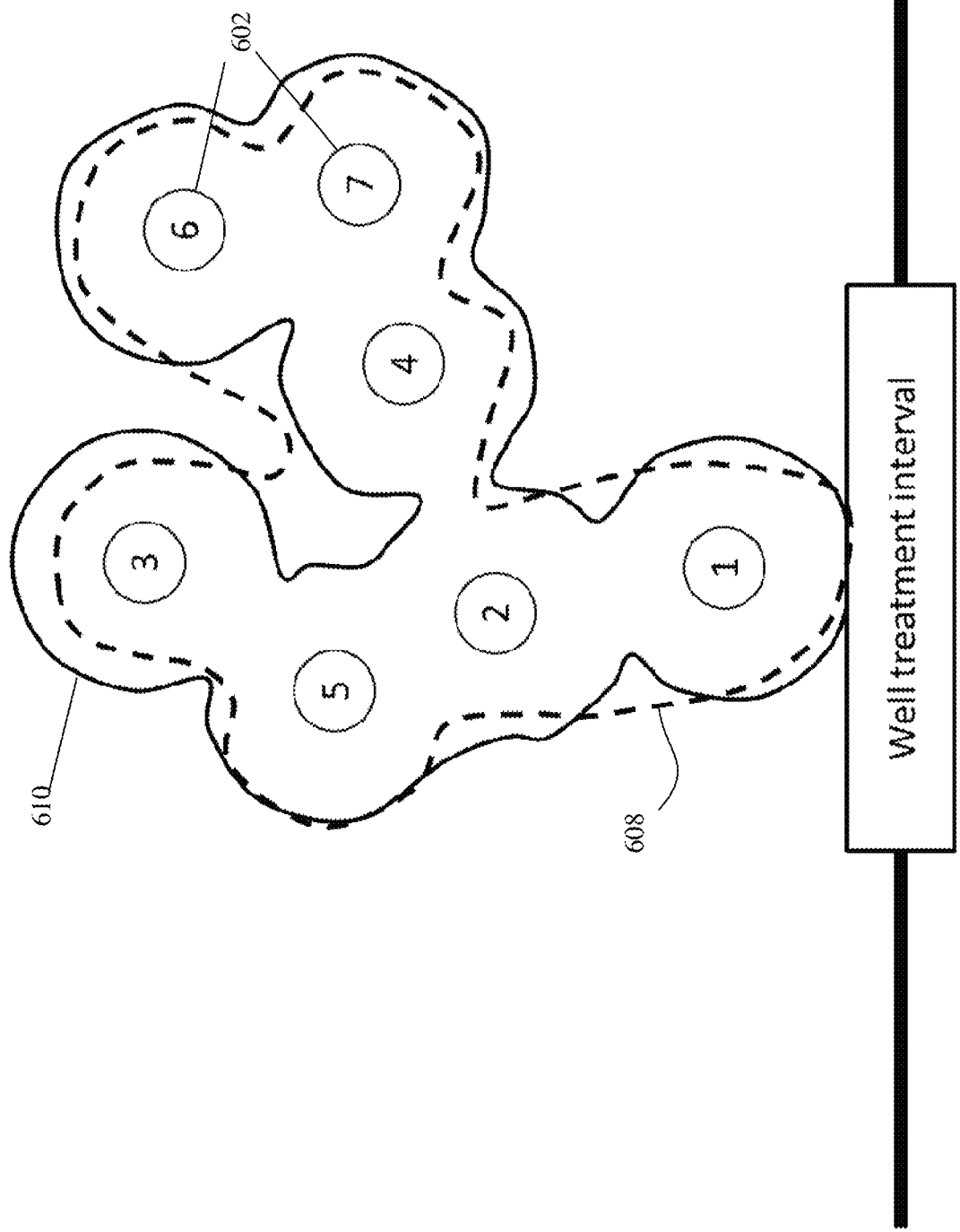
FIG. 6B is a schematic illustration of a comparison between the Stimulated Rock Volume generated according to embodiments of the invention of FIG. 6A and the Stimulated Rock Volume generated according to prior art methods of FIG. 1B.

FIG. 6B is a schematic illustration of a comparison between the Stimulated Rock Volume generated according to embodiments of the invention in FIG. 6A (illustrated by the dashed boundary 608) and the Stimulated Rock Volume generated according to prior art methods from FIG. 1B (illustrated by the solid boundary 610).

FIG. 6B illustrates how SRVs generated from the same microseismic events 602 P1-P7, yet based on a homogeneous model in FIG. 1B or a heterogeneous model in FIG. 6A, may be different. SRV 608 generated as shown in FIG. 6A is an "iso-surface," in which each point on the surface has a specific and constant distance 603 ("iso"=same) from the fracture network 604. SRV 610 generated as shown in FIG. 1B is a surface forming an equally spaced envelope around microseismic events 602. Whereas SRV 608 is generated based on its distance from the entire network including both events and fractures, conventional SRV 610 is generated based only on events but not on any connections or fractures.

SRV 608 generated based on the fracture network according to embodiments of the invention may have advantages over SRV 610 generated based only on the events according to prior art methods. For example, accounting for fractures more accurately represents the realistic path of liquid through the subsurface and thus the drainage of the connected well. Further, SRV 608 generated based on the fracture network may be more conservatively sized (e.g. in some cases, smaller) than conventional isotropic SRV 610, thus avoiding overestimating the reach of each well forming "blind-spot" or missing regions of rock that will not be drained. Further overestimation may occur when using a convex hull to generate an envelope around the set of events, forming an SRV 610 including regions with no drainage to the well. In addition to overestimating, SRV 608 may also avoid underestimating drainage as compared to SRV 610, which may occur, for example, when smaller circles are used to generate SRV 610 forming disconnected or discrete volumes.

Fracture network displays may indicate the time or time range at which each event and/or fracture occurred, for example, to visualize the well drainage through the network including areas of fast drainage and areas of slow or poor drainage. The events and fractures may be displayed using color, shading, dimming, and/or scaling to indicate the time at which each event was recorded and/or the predicted time of each fracture interpolated therefrom and/or other attributes. For example, the time at which each event in the fracture network was recorded may be visualized by adding a microseismic event recorded at a time (ti), iterated over all the times of the microseismic events (t1-tn). A subset of fractures and/or events in the network may be displayed, e.g., including events associated with a specific time step (e.g. every one hour) or time interval (a sub-interval ti of the full recorded time tn, ti<tn), e.g. one hour. Network subsets may be displayed separately or together. The time interval displayed may have a fixed or variable duration that may be adjusted e.g. by sliding a tab on a graphical user interface. A network subset may be displayed including a specified number of active fractures that are a subset of the total number of fractures in the fracture network (e.g. the first or last 100 fractures modelled). Attributes may be computed such as dip lines and azimuth. These attributes may be used for the simulation of the fracture network, which is then used to run a flow simulation and generate an SRV.

Figure 7A:
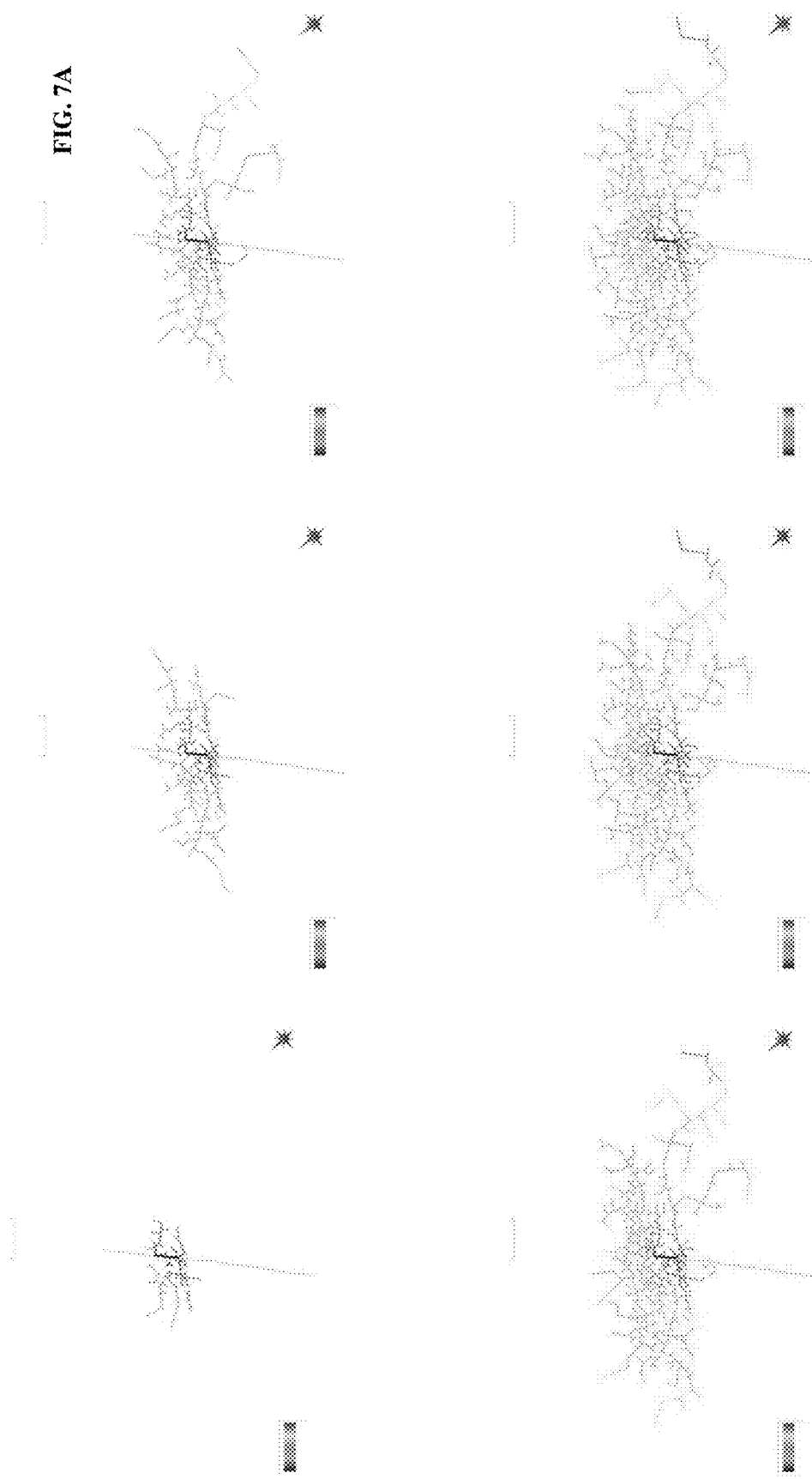

Reference is made to FIG. 7A, which includes six images of a time dependent fracture network in which color or shading indicates a distance from/to a source points, e.g. the well perforation interval, as measured along a fracture path, according to embodiments of the invention. Each of the six images represents the growth of the fracture network after the passage of a subsequent time interval (e.g. 30 minutes) illustrating the fracture growth every periodic interval of time (e.g. 30 minutes). Colors or shading may indicate a distance traveled from/to the source points. Further processing may be done by filtering the network based on attributes values (e.g., magnitude or rock types in the vicinity of microseismic events). Visualization of the time dependency may provide geoscientists with a better understanding of fracture propagation through the subsurface.

Figure 7C:
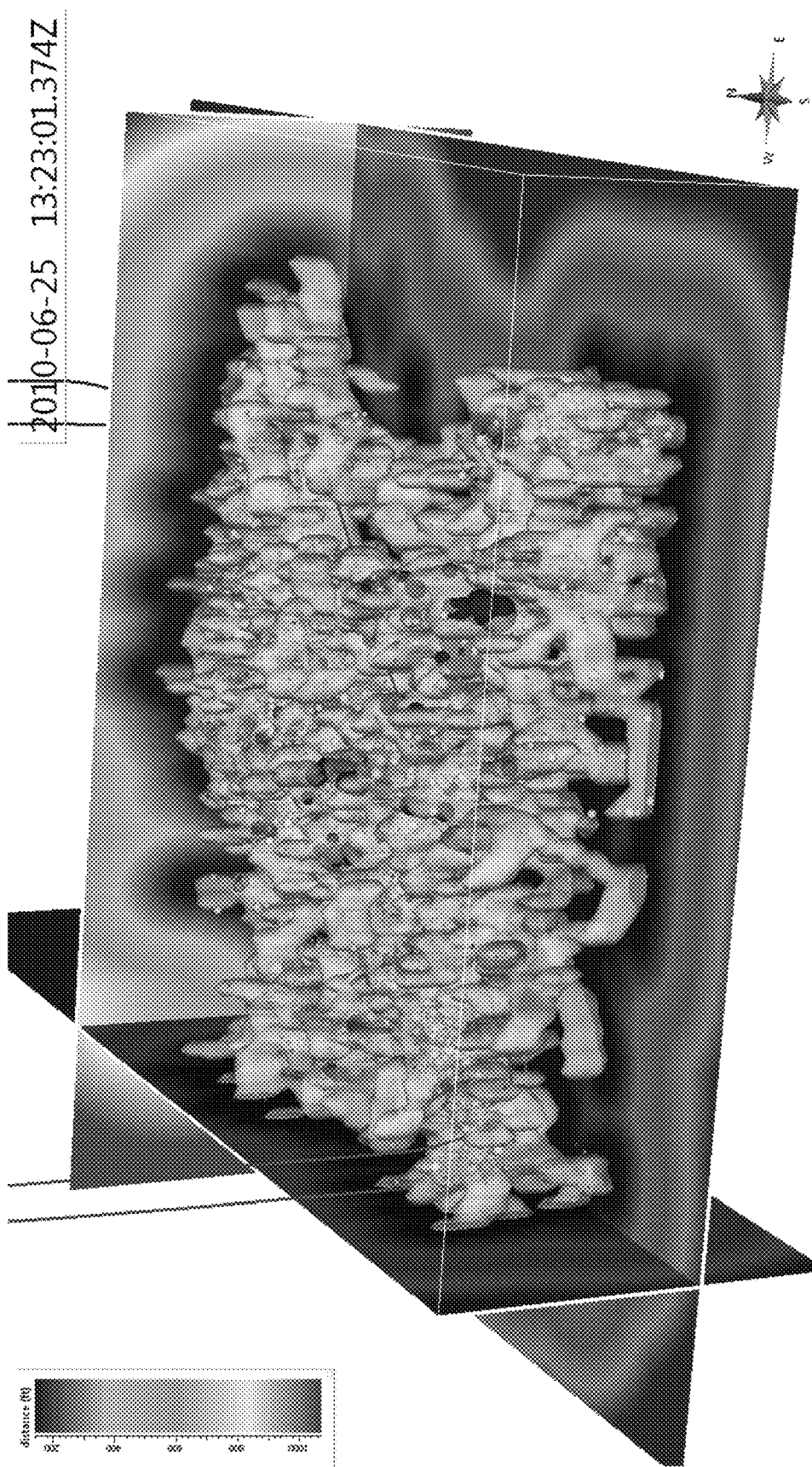

Reference is made to FIG. 7B, which schematically illustrates a fracture network in three-dimensions and FIG. 7C, which schematically illustrates microseismic events, a distance field and an associated stimulated rock volume computed as an iso-surface from the fracture network of FIG. 7B.

Figure 8:
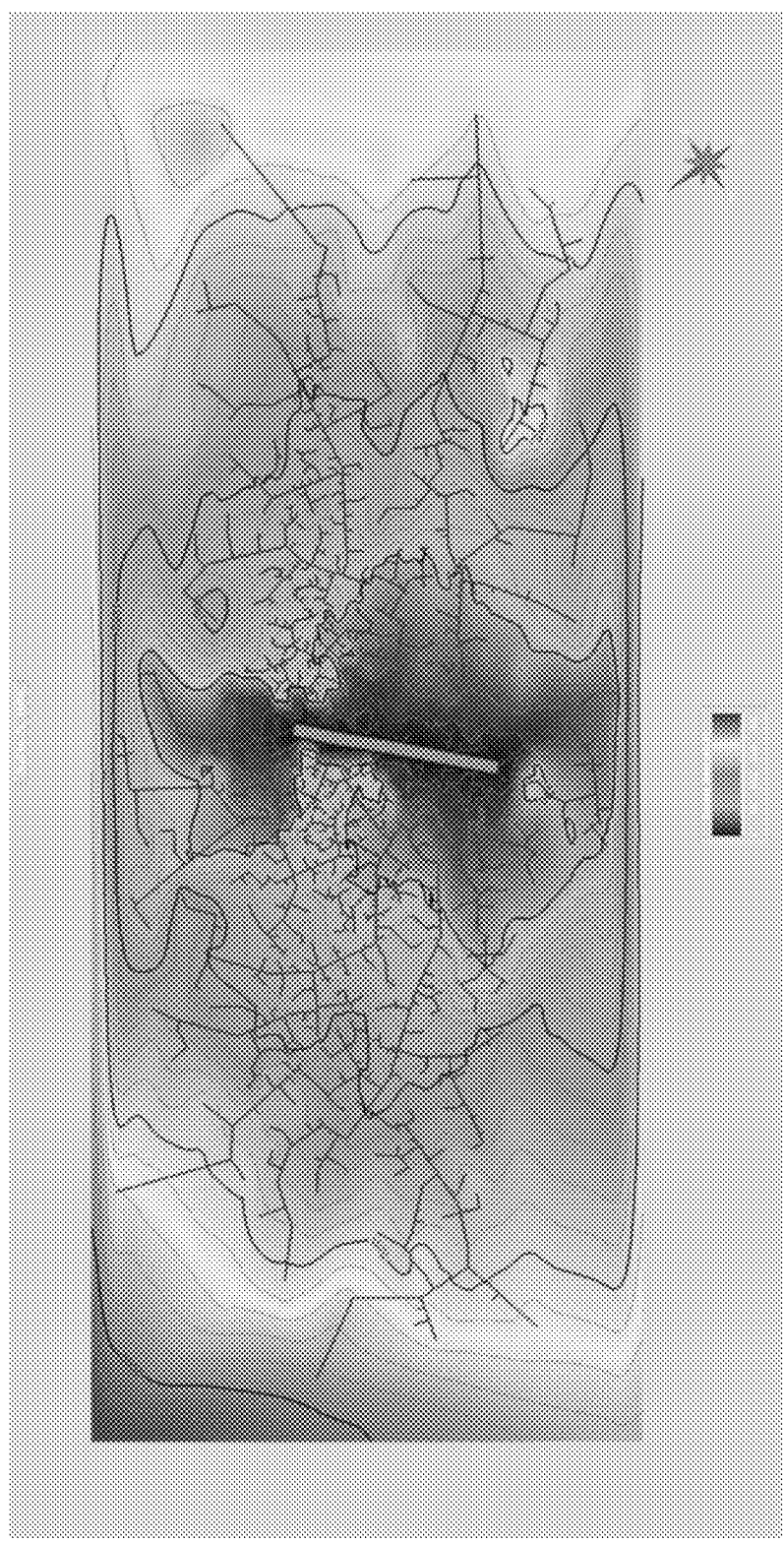

Reference is made to FIG. 8, which schematically illustrates a fracture network having a "distance to well perforation" attribute map, for example, to better visualize the effect of hydraulic stimulation. This "distance to well perforation" attribute may be correlated to an "energy of the stimulation" attribute, which may indicate a percentage of the blast or stimulation left undetected (e.g. if there is more energy input into the stimulation than output as detected by the geophones). The "distance to well perforation" or "energy of the stimulation" attributes may be measured at the events and interpolated there between to generate a continuous attribute model.

A fracture network (also referred to as a "fracture skeleton") and its attributes (e.g. fracture length, stress, magnitude, anistropism, time, branch rank, distance to seed, event density per cell, number of fractures per cell, etc.) may be transferred to a gridded volume or mesh. The gridded volume may be built based on a set of microseismic events M or, in real-time, as each microseismic event in M is recorded, received or analyzed. The resolution of the gridded volume (e.g., a number of cells per volume) may be selected, e.g., to provide sufficient precision to achieve the desired volume computations. Attributes of each cell of a gridded volume may be initialized to 0. As a fracture network is generated, grid cells intersected by fractures may be marked as "stimulated" (part of the stimulated rock volume). Attributes of the fractures may be transferred to the gridded volume. A gridded volume with marked cells may include a time attribute field that corresponds to the time of the event or stimulation. The subset of marked cells may be a cell-based volume encompassing the fracture network at the grid resolution. The gridded volume may be visualized in real-time (highlighting each cell as a fault therein is stimulated) or after the entire model is built e.g. by selecting different sub-network N(i) associated with a selected time ti of stimulation.

Figure 9B:
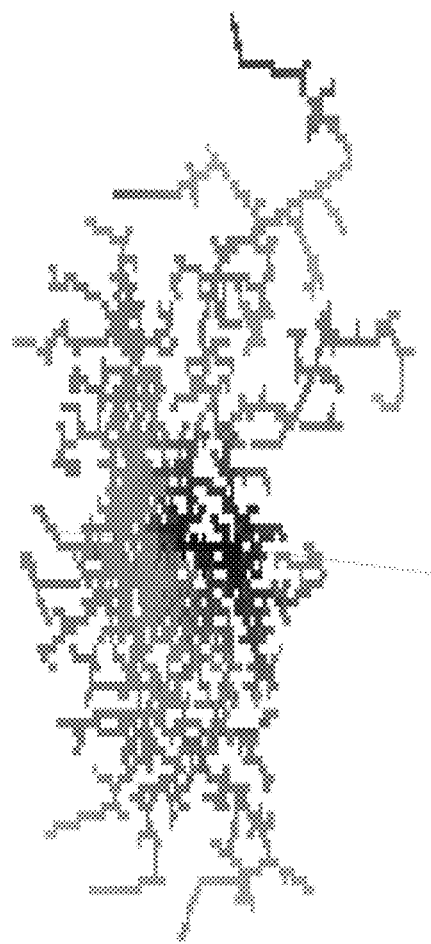

Reference is made to FIG. 9A, which schematically illustrates a time-dependent gridded volume of a fracture network, according to embodiments of the invention. Reference is made to FIG. 9B, which schematically illustrates a time-dependent fracture network at the resolution of the gridded volume, according to embodiments of the invention. The fracture network is shaded based on its distance from a source point, such as, a well or perforation interval, as measured along the fracture path.

Figure 10A:
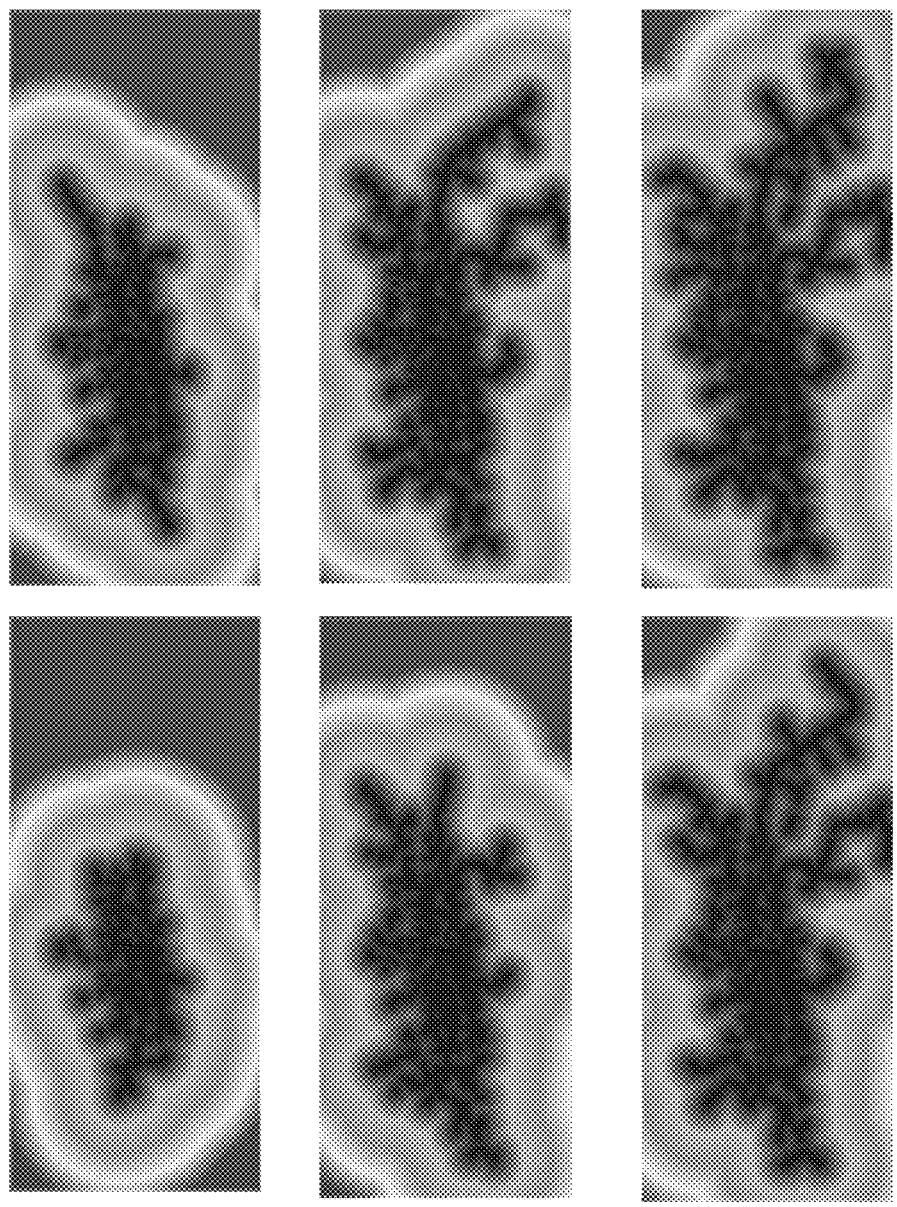

Reference is made to FIG. 10A, which schematically illustrates a time dependent distance field of a fracture network, according to embodiments of the invention. Reference is made to FIG. 10B, which schematically illustrates the distance field of FIG. 10A along with the fracture network, according to embodiments of the invention. Distance fields and volumes associated with the fracture network may be generated which characterize the connected fractures volume and may indicate where potential hydrocarbon recovery may occur. The distance field may be computed using Euclidian distance to measure the distance from each point of the model to the closest point of the fracture network. These values may be computed and stored for every time step ti.

Reference is made to FIG. 11, which schematically illustrates three dimensional images of a SRV expanding with an incrementally growing fracture network, according to embodiments of the invention. The SRV may be an iso-surface, e.g. a surface where each point on the surface has a specific and constant distance from the closest event or fracture in the fracture network. The iso-surfaces of the network may be determined based on a distance field, which is computed as the Euclidean distance between every point in space and the nearest point on the fracture network. The distance field may be colored or shaded, where each color or shade is associated with a particular distance from the fracture network. Once the distance field is determined for every point in space, iso-surfaces (surfaces of equal distance) may be determined and displayed based on points in the distance field having the same distance from the fracture network. The iso-surfaces may evolve as a function of time, showing the evolution of the Stimulated Rock Volume as the network expands as a function of time. In some embodiments, the volume inside the iso-surfaces may also be computed as a function of time.

Figure 12:
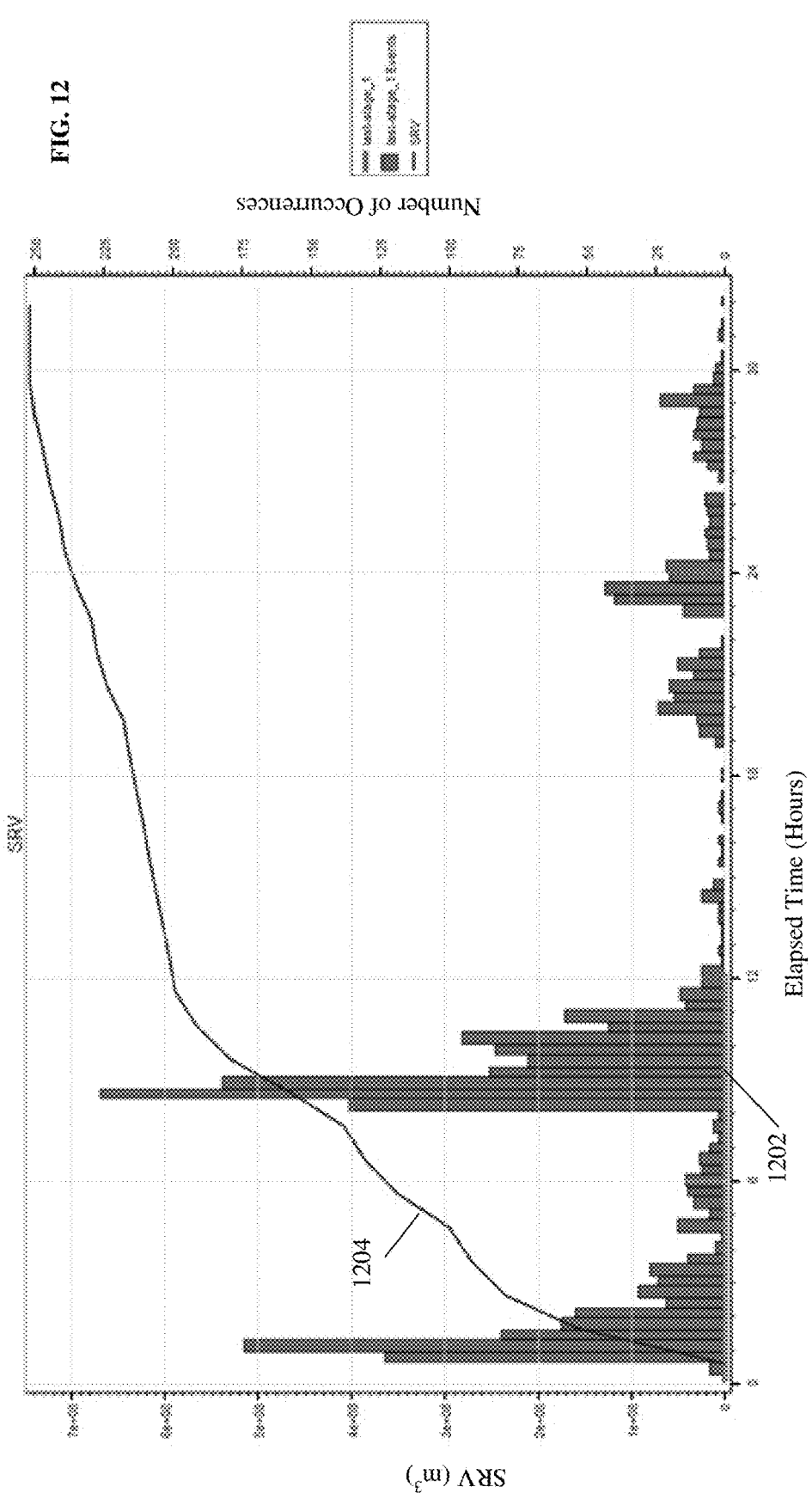
FIG. 12 is a histogram of microseismic events as a function of time (x-axis) and volume of the SRV (y-axis), according to embodiments of the invention.

Reference is made to FIG. 12, which is a histogram of events 1202 as a function of time (x-axis) and the volume of the SRV (y-axis), according to embodiments of the invention. FIG. 12 shows a total number of events 1204 recorded over time. Once the SRV is generated from the fracture network, and an SRV iso-surface is correlated to every stage or group of microseismic events (from the origin of the fracture network segment), the histograms of the SRV may be plotted as a function of the microseismic event stages.

Figure 13:
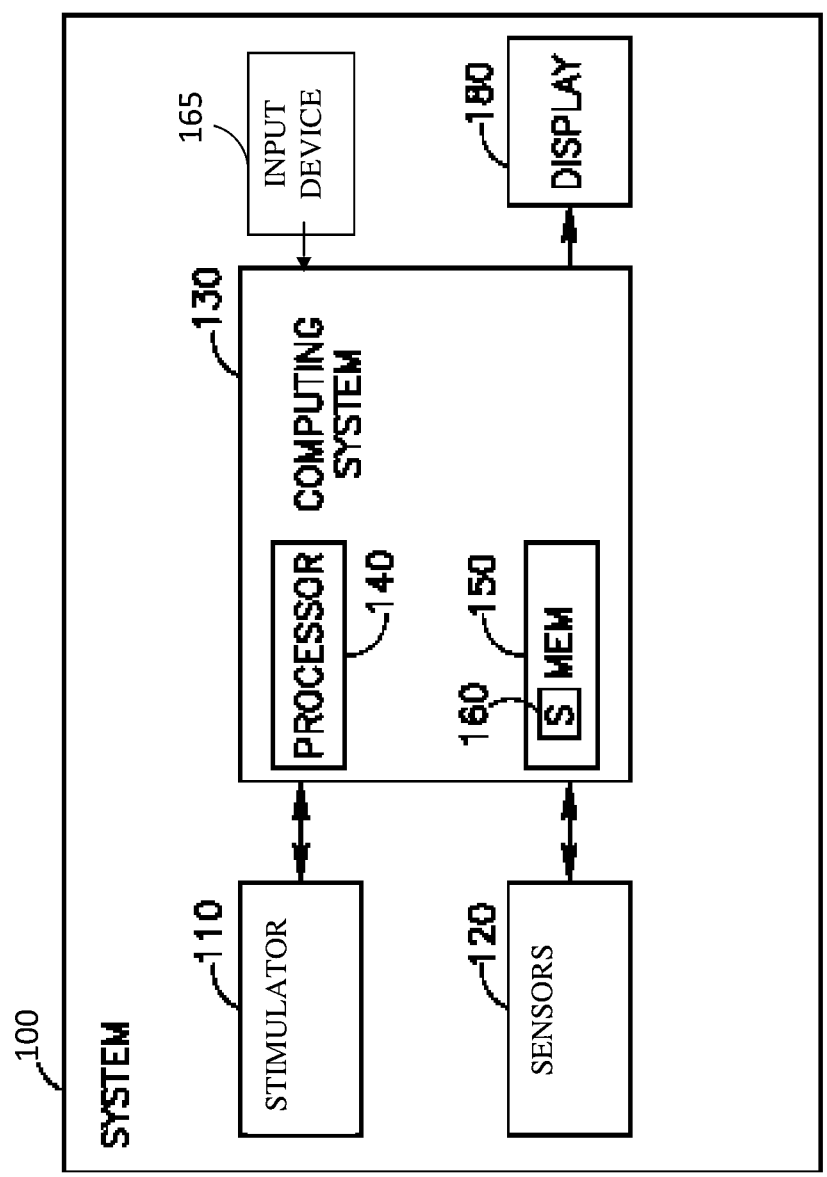
FIG. 13 is a schematic illustration of a system according to embodiments of the invention.

Reference is made to FIG. 13, which schematically illustrates a system 100 in accordance with an embodiment of the present invention.

System 100 may include hydraulic fracturing devices, such as, a stimulator 110 and a network of sensors 120, as well as a computing system 130 and a display 180.

Stimulator 110 may be a device to stimulate the subsurface, for example, by hydraulic fracturing in which water or other liquids or gasses are pressurized or blasted in one or more wells to erode and expand the surrounding rock layer. A stimulator 110 may be placed at each of a plurality of wells or other subsurface locations.

A network of sensors 120, such as, geophones or accelerometers, may be placed at a plurality of discrete positions throughout the subsurface referred to as "sensor locations" to measure "microseismic events" at those locations. Sensors 120 may record event data including, for example, the location (x,y,z) and/or time (t) of each microseismic event. Sensors 120 may be connected to computing system 130, e.g. via wired or wireless connections, and may transfer the event data. The event data may be stored in sensors 120 as for example digital information and transferred to computing system 130 by uploading, copying or transmitting the digital information. The event data transfer may occur "on-the-fly," in real-time (e.g. as the data is being recorded, within a predetermined time interval, or before the final event is recorded), or after the stimulation (after all event are recorded at sensors 120).

Computing system 130 may process the received event data to generate a fault network according to embodiments of the invention described herein. Computing system 130 may include, for example, any suitable processing system, computing system, computing device, processing device, computer, processor, or the like, and may be implemented using any suitable combination of hardware and/or software. Computing system 130 may include for example one or more processor(s) 140, memory 150 and software 160. Processor 140 may communicate with computing system 130 via wired or wireless command and execution signals. Computing system 130 or processor(s) 140 may be configured to carry out embodiments of the present invention by, for example being connected to memory 150 and executing instructions or software stored in memory 150

Memory 150 may include cache memory, long term memory such as a hard drive or disk, and/or external memory external to processor 140, for example, including random access memory (RAM), read only memory (ROM), dynamic RAM (DRAM), synchronous DRAM (SD-RAM), flash memory, volatile memory, non-volatile memory, cache memory, buffer, short term memory unit, long term memory unit, or other suitable memory units or storage units. Memory 150 may store instructions (e.g., software 160) which when executed perform embodiments of the invention, and event data. Memory may store data associated with a set of microseismic events and/or a fracture network, where the data associated with each microseismic event may include a location where, and a time when, the microseismic event was recorded by sensors 120. Event data may include, for example, raw recorded data collected by sensors 120, instructions for building or visualizing a SRV and/or gridded model, instructions for generating a fracture network based on the microseismic events, or other instructions or data. When discussed herein, manipulating geological data, such as the operations for calculating, forming, refining, aligning, etc., fracture networks, may involve the manipulation of data stored in a memory which represents the corresponding geological structures, locations and timing of microseismic events, physical rock properties, or connection criterions.

Processor 140 may include a local or internal memory, such as a cache memory, for relatively fast access to data, e.g., as compared to memory 150.

Input device(s) 165 may include a keyboard, pointing device (e.g., mouse, trackball, pen, touch screen), or cursor direction keys, for communicating information and command selections to processor 140. Input device 165 may communicate user direction information and command selections to processor 140. For example, a user may use input device 165 to set or select a connection criterion for the generation of a fracture network, set or select a number of attributes to filter or apply to a set of microseismic events, select a button (e.g., manipulate a pointing device such as a mouse to select an on-screen display of a button or other user interface item) to increment the fracture expansion process one event or time interval (e.g. 30 minutes) at a time to view the model at each iteration e.g. until the user is satisfied with the result, edit, perform geometrical computations, highlight models, etc. In another example, a final resolution of a grid or mesh may be achieved after a number of iterations selected by a user. A display or monitor 180 may output a visualization or model image of the fracture network, SRVs or gridded models generated according to the user-commanded operations executed by processor 140.

Display 180 may display data from stimulators 110, sensors 120 or computing system 130. For example, display 180 may display visualizations of a time field of fracture networks, a distance field of fracture networks, or a histogram of microseismic events.

Reference is made to FIG. 14, which is a flowchart of a method in accordance with an embodiment of the present invention. The method of FIG. 14 may be executed, in some embodiments, using the system or components described in reference to FIG. 13, although other system or components may be used.

In operation 1400, one or more stimulators (e.g. stimulator 110 of FIG. 13) placed at one or more source locations (e.g. in a well treatment interval 205 of FIG. 2A) may be activated (or are capable of being activated) to stimulate the subsurface.

In operation 1410, a plurality of sensors (e.g. sensors 120 of FIG. 13) placed at a plurality of sampling points throughout a subsurface region may detect and record the microseismic event data (e.g. event points P1-P7 of FIGS. 2A-2I) including, for example, the location (x,y,z) and/or time (t) of a microseismic event.

In operation 1420, a processor (e.g. processor 140 of FIG. 13) may receive the (filtered or raw) recorded data associated with a set of microseismic events and an existing fracture network, where the data associated with each microseismic event includes a location where, and a time when, the microseismic event was recorded by the sensors. The data may be received, for example, in real-time or after all of the microseismic event associated with a blast or event are recorded.

In operation 1430, the processor may sequentially add each microseismic event in the set to a fracture network in chronological order of the time when the microseismic event was recorded, wherein each microseismic event is added by connecting the event to the existing fracture network by a fracture according to a connection criterion. The connection criterion may be selected from the group consisting of an "event-to-event" connection criterion where each sequentially added event is connected to a previously added event associated with an earlier time, an "event-to-network" connection criterion where each sequentially added event is connected to a previously added event or fracture of the fracture network, and a fracture attribute connection criterion such as an anisotropism connection criterion defining an orientation of the fractures connecting events to the fracture network.

In operation 1450, the processor may generate a stimulated rock volume (e.g. SRV 608 of FIG. 6) defined by an iso-surface of points having a constant distance to the fracture network including both microseismic events and fractures connecting the microseismic events according to the connection criterion.

In operation 1460, a display (e.g. display 180 of FIG. 13) may display the fracture network and/or the stimulated rock volume. In some embodiments, the display may visualize the fracture network and/or the stimulated rock volume restricted to include a subset of microseismic events associated with a sub-interval of time within the total sampled time interval, e.g., a predefined number of seconds, minutes and/or hours specified by a user. In some embodiments, the display may visualize the stimulated rock volume to include a distance field of the fracture network that visualizes the distance of points within the stimulate rock volume to the source point(s). In some embodiments, the display may visualize the fracture network to include a branch index for each fracture or event, where each fracture or event along a single path of the fracture network has the same branch index (i) and each fracture or event split from another fracture or event is incremented by one (i+1) greater than the branch index (i) of the fracture or event from which it is split. Other visualizations or displays may be used, for example, as shown in FIGS. 7-12.

Embodiments of the invention may include an article such as a computer or processor readable transitory or non-transitory storage medium, such as for example a memory, a disk drive, or a USB flash memory device encoding, including or storing instructions, e.g., computer-executable instructions, which when executed by a processor or controller, cause the processor or controller to carry out methods disclosed herein. Embodiment of the present invention may be implemented as a computer implemented method, for example, executed using a processor on a computer.

Different embodiments are disclosed herein. Features of certain embodiments may be combined with features of other embodiments; thus certain embodiments may be combinations of features of multiple embodiments.

The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

The invention claimed is:

1. A method, comprising:
receiving data associated with a set of microseismic events and a fracture network, the data associated with each microseismic event including a location where, and a time when, the microseismic event was recorded by one or more sensors;
adding each microseismic event in the set to the fracture network in chronological order of the time when the microseismic event was recorded, wherein each microseismic event is added by connecting the event to the fracture network by a fracture according to a connection criterion;
generating a stimulated rock volume defined by an iso-surface of points having a constant distance to the fracture network forming an equally spaced envelope around the fracture network, wherein the fracture network includes a plurality of microseismic events in the set and a plurality of fractures connecting the plurality of microseismic events according to the connection criterion; and
displaying the stimulated rock volume including the iso-surface of points having the constant distance to the fracture network.

2. The method of claim 1, wherein the connection criterion is an "event-to-event" connection criterion, in which each added event is connected to a previously added event associated with an earlier time.

3. The method of claim 1, wherein the connection criterion is an "event-to-network" connection criterion, in which each added event is connected to a previously added event or fracture of the fracture network.

4. The method of claim 1, wherein the connection criterion is a fracture attribute connection criterion.

5. The method of claim 4, wherein the fracture attribute is an anisotropism attribute and the connection criterion defines an orientation of the fractures connecting events to the fracture network.

6. The method of claim 1, wherein one or more of the microseismic events are connected in a non-chronological order in the fracture network.

7. The method of claim 1 comprising displaying the fracture network within the stimulated rock volume.

8. The method of claim 1 comprising generating a distance field of the fracture network to visualize the distance of points within the stimulated rock volume to a source microseismic event in the fracture network.

9. The method of claim 1, wherein the stimulated rock volume is restricted to include microseismic events associated with a sub-interval of time within a sampled time interval.

10. The method of claim 1 comprising generating a branch index for each fracture or event, wherein each fracture or event along a single path of the fracture network has the same branch index (i) and each fracture or event split from another fracture or event is incremented by one (i+1) greater than the branch index (i) of the fracture or event from which it is split.

11. A system, comprising:
a memory that stores data associated with a set of microseismic events and a fracture network, the data associated with each microseismic event including a location where, and a time when, the microseismic event was recorded by one or more sensors;
a processor that:
receives the data;
adds each microseismic event in the set to a fracture network in chronological order of the time when the microseismic event was recorded, wherein the processor adds each microseismic event by connecting the event to the fracture network by a fracture according to a connection criterion; and
generates a stimulated rock volume defined by an iso-surface of points having a constant distance to the fracture network forming an equally spaced envelope around the fracture network, wherein the fracture network includes a plurality of microseismic events in the set and a plurality of fractures connecting the plurality of microseismic events according to the connection criterion; and
a display that visualizes the stimulated rock volume including the iso-surface of points having the constant distance to the fracture network.

12. The system of claim 11, wherein the connection criterion is an "event-to-event" connection criterion, in which each added event is connected to a previously added event associated with an earlier time.

13. The system of claim 11, wherein the connection criterion is an "event-to-network" connection criterion, in which each added event is connected to a previously added event or fracture of the fracture network.

14. The system of claim 11, wherein the connection criterion is a fracture attribute connection criterion.

15. The system of claim 14, wherein the fracture attribute is an anisotropism attribute and the connection criterion defines an orientation of the fractures connecting events to the fracture network.

16. The system of claim 11, wherein the processor is configured to connect one or more of the microseismic events in a non-chronological order in the fracture network.

17. The system of claim 11, wherein the display is to visualize the fracture network within the stimulated rock volume.

18. The system of claim 11, wherein the processor is configured to generate and the display is configured to display a distance field of the fracture network visualizing the distance of points within the stimulate rock volume to a source microseismic event in the fracture network.

19. The system of claim 11, wherein the processor is configured to generate the stimulated rock volume restricted to include microseismic events associated with a sub-interval of time within a sampled time interval.

20. The system of claim 11, wherein the processor is configured to generate a branch index for each fracture or event, wherein each fracture or event along a single path of the fracture network has the same branch index (i) and each fracture or event split from another fracture or event is incremented by one (i+1) greater than the branch index (i) of the fracture or event from which it is split.

21. A non-transitory computer readable storage medium storing instructions thereon, which when executed, cause a processor to:
receive data associated with a set of microseismic events and a fracture network, the data associated with each microseismic event including a location where, and a time when, the microseismic event was recorded by one or more sensors;
add each microseismic event in the set to a fracture network in chronological order of the time when the microseismic event was recorded, wherein each microseismic event is added by connecting the event to the fracture network by a fracture according to a connection criterion;

generate a stimulated rock volume defined by an iso-surface of points having a constant distance to the fracture network forming an equally spaced envelope around the fracture network, wherein the fracture network includes a plurality of microseismic events in the set and a plurality of fractures connecting the plurality of microseismic events according to the connection criterion; and display the stimulated rock volume including the iso-surface of points having the constant distance to the fracture network.

22. The non-transitory computer readable storage medium of claim 21, wherein the instructions, when executed, further cause the processor to use a connection criterion that is selected from the group consisting of an "event-to-event" connection criterion where each added event is connected to a previously added event associated with an earlier time, an "event-to-network" connection criterion where each added event is connected to a previously added event or fracture of the fracture network, and an anisotropism fracture attribute connection criterion defining an orientation of the fractures connecting events to the fracture network.

23. The method of claim 1 comprising determining multiple iso-surfaces which evolve as a function of time to show the evolution of the stimulated rock volume as the network expands as a function of time.

* * * * *